(12) United States Patent
Hozumi

(10) Patent No.: US 9,294,185 B2
(45) Date of Patent: Mar. 22, 2016

(54) DEVICE, METHOD, AND SYSTEM OF COMMUNICATING VIA RELAY DEVICE, AND RECORDING MEDIUM STORING COMMUNICATION CONTROL PROGRAM

(75) Inventor: Hiroshi Hozumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 459 days.

(21) Appl. No.: 13/606,328

(22) Filed: Sep. 7, 2012

(65) Prior Publication Data

US 2013/0070780 A1 Mar. 21, 2013

(30) Foreign Application Priority Data

Sep. 19, 2011 (JP) ................................ 2011-203984

(51) Int. Cl.
*H04J 3/16* (2006.01)
*H04B 7/155* (2006.01)

(52) U.S. Cl.
CPC .................................. *H04B 7/15542* (2013.01)

(58) Field of Classification Search
None
See application file for complete search history.

(56) References Cited

U.S. PATENT DOCUMENTS

| 7,916,737 | B2* | 3/2011 | Akahane | 370/400 |
| 2001/0018328 | A1* | 8/2001 | Ohkura et al. | 455/15 |
| 2009/0070468 | A1* | 3/2009 | Ohta | 709/226 |
| 2009/0190600 | A1* | 7/2009 | Akahane | 370/400 |
| 2010/0027458 | A1* | 2/2010 | Wu et al. | 370/315 |
| 2010/0159832 | A1* | 6/2010 | Lagrange et al. | 455/41.2 |
| 2010/0197295 | A1* | 8/2010 | Horangic | 455/422.1 |
| 2011/0208857 | A1* | 8/2011 | Gentile et al. | 709/224 |

FOREIGN PATENT DOCUMENTS

| JP | 9-319689 A | 12/1997 |
| JP | 2003-323360 | 11/2003 |
| JP | 2004-005418 | 1/2004 |
| JP | 2006-235837 A | 9/2006 |
| WO | WO 03/084273 A1 | 10/2003 |

OTHER PUBLICATIONS

U.S. Appl. No. 13/415,256, filed Mar. 8, 2012, Hiroshi Hozumi.
Office Action issued Jun. 30, 2015 in Japanese Patent Application No. 2011-203984.

* cited by examiner

*Primary Examiner* — Willie J Daniel, Jr.

(74) *Attorney, Agent, or Firm* — Oblon, McClelland, Maier & Neustadt, L.L.P.

(57) ABSTRACT

In a communication system, one of a plurality of relay devices is assigned to a communication device that communicates with a counterpart communication device. When an instruction for selecting a communication method is received, one of the plurality of relay devices capable of communicating with the communication device using the selected communication method is assigned to the communication device.

16 Claims, 33 Drawing Sheets

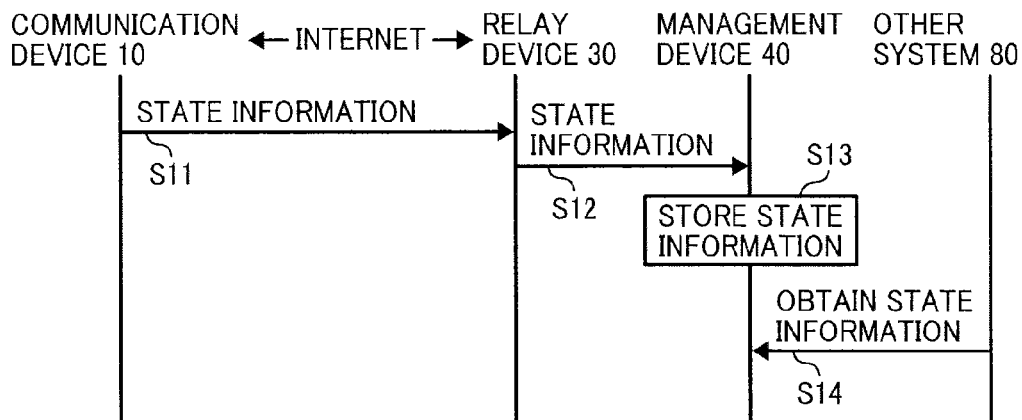
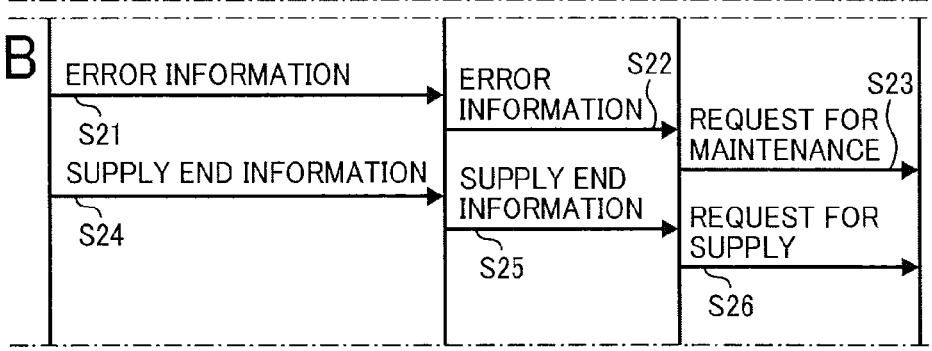
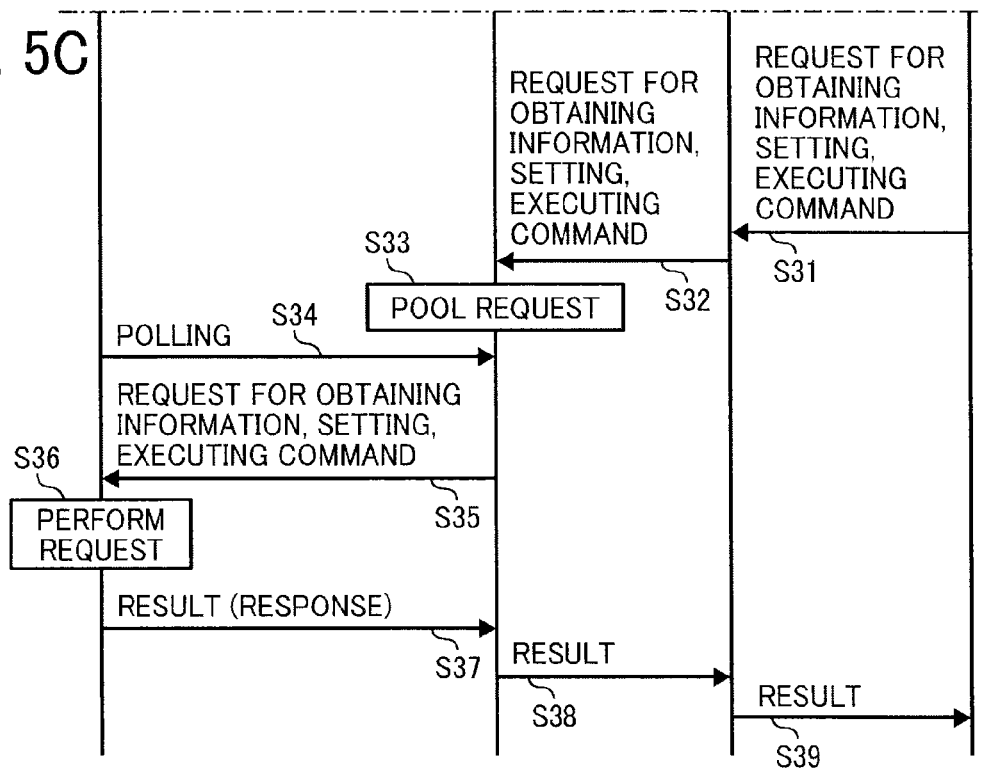

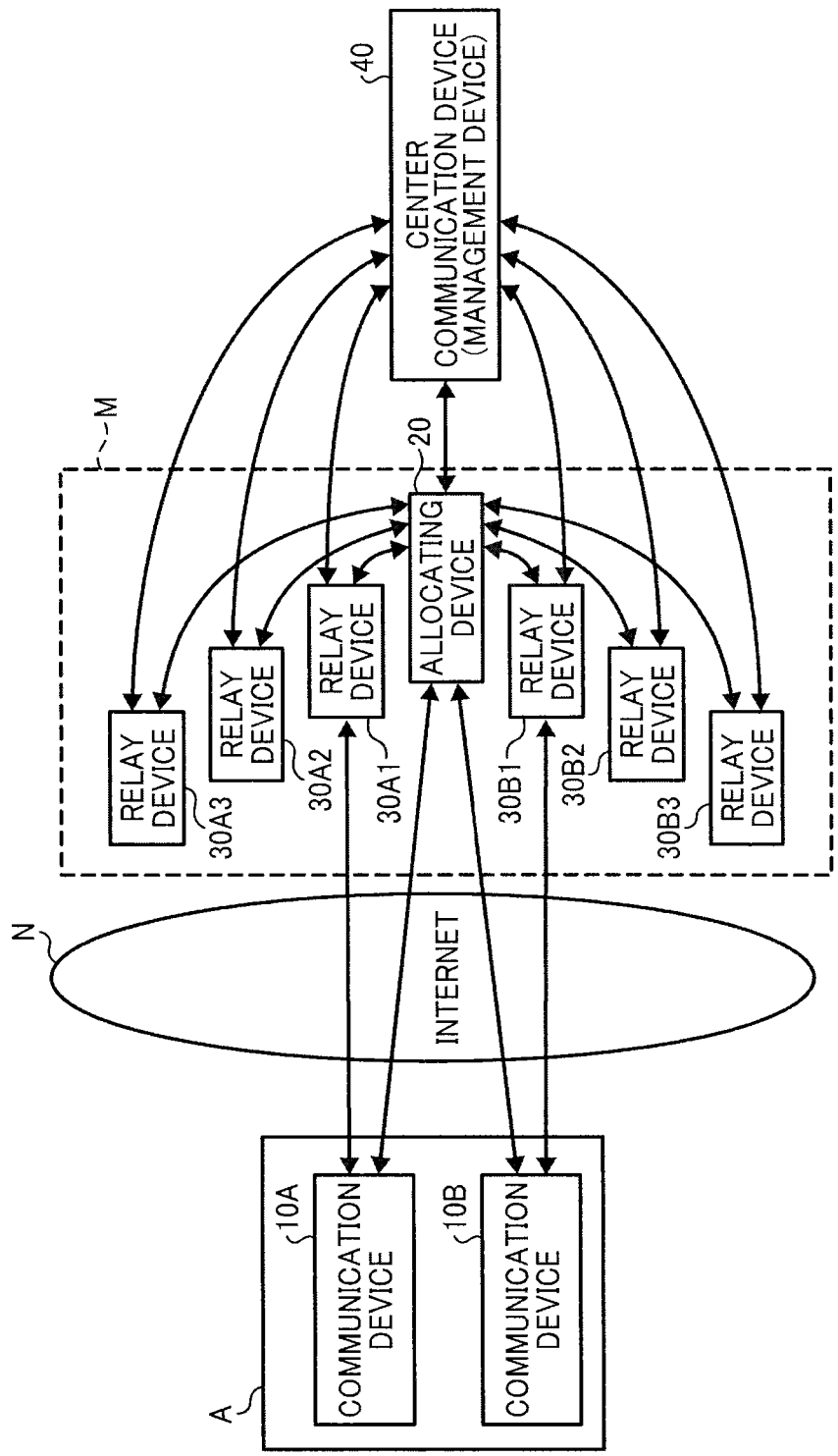

DEVICE, METHOD, AND SYSTEM OF COMMUNICATING VIA RELAY DEVICE, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application No. 2011-203984, filed on Sep. 19, 2011, in the Japan Patent Office, the entire disclosure of which is hereby incorporated herein by reference.

BACKGROUND

1. Field

The present invention generally relates to a device, system, and method of communicating via one of a plurality of relay devices that is allocated to a communication device, and a recording medium storing a control program that causes a processor to communicate via one of the plurality of relay devices that is allocated to the communication device.

2. Background

Japanese Patent Application Publication No. 2003-323360A describes a remote management system in which a plurality of image forming devices at a user site communicates with a management device at a services provider site through the Internet. In order to allow the image forming device to communicate with the management device, a relay device is provided at the user site such that the relay device relays communications between the image forming device and the management device.

However, it has been cumbersome for the services provider to manage the relay device, which should be set at the user site. For example, in order to set the relay device at the user site, the services provider needs to send the relay device to the user site or send a service technician to the user site to set up the relay device. Further, a number of relay devices or a function of the relay device may need to be changed as a configuration of a communication system at the user site changes, for example, when a new image forming device is introduced. In case of upgrading firmware of the relay device, the services provider is not able to transfer the latest version of firmware to the relay device unless there is an access by the relay device.

In view of the above, it is more convenient to set the relay device at a site that can be easily managed by the services provider, such as the services provider site. For example, the relay function or the relay device providing the relay function may be provided in the cloud. In such case, the management device sends a request addressed to a communication device such as the image forming device, to the relay device in the cloud to cause the relay device to pool the request at least temporarily. The communication device to be managed by the management device is caused to periodically access the relay device in the cloud to obtain the request transmitted from the management device that is pooled at the relay device.

SUMMARY

While the above-described technique allows the communication device and the management device to communicate with each other through the relay device, the communication device needs to access the relay device, which is provided outside the user site. Depending on the user environments such as a security policy, the communication device at the user site may be permitted to use a limited number of communication methods when accessing the outside system. Further, unless a communication method being used by the relay device is compatible with the communication device, the communication device is not able to access the relay device. Further, even when the communication method of the relay device is compatible with the communication device, selecting such communication method may not be recommendable if such communication method increases the workload on the communication system.

In view of the above, one aspect of the present invention is to provide a technique of allocating one of a plurality of relay devices as a relay device that relays communications between a communication device and a counterpart communication device through a network in a manner such that communications between the communication device and the counterpart communication device are performed more smoothly.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A is a data sequence diagram illustrating operation of sending state information from the communication device to the management device, performed by the communication system of FIG. 1, according to an example embodiment of the present invention;

FIG. 5B is a data sequence diagram illustrating operation of sending error information or maintenance information from the communication device to the management device, performed by the communication system of FIG. 1, according to an example embodiment of the present invention;

FIG. 5C is a data sequence diagram illustrating operation of sending a request from the management device to the communication device, performed by the communication system of FIG. 1, according to an example embodiment of the present invention;

FIG. 26 is a schematic block diagram illustrating a communication system including a plurality of relay devices, a plurality of communication devices including a device functioning as a management device, and a plurality of allocating devices, according to an example embodiment of the present invention.

Figure 1:
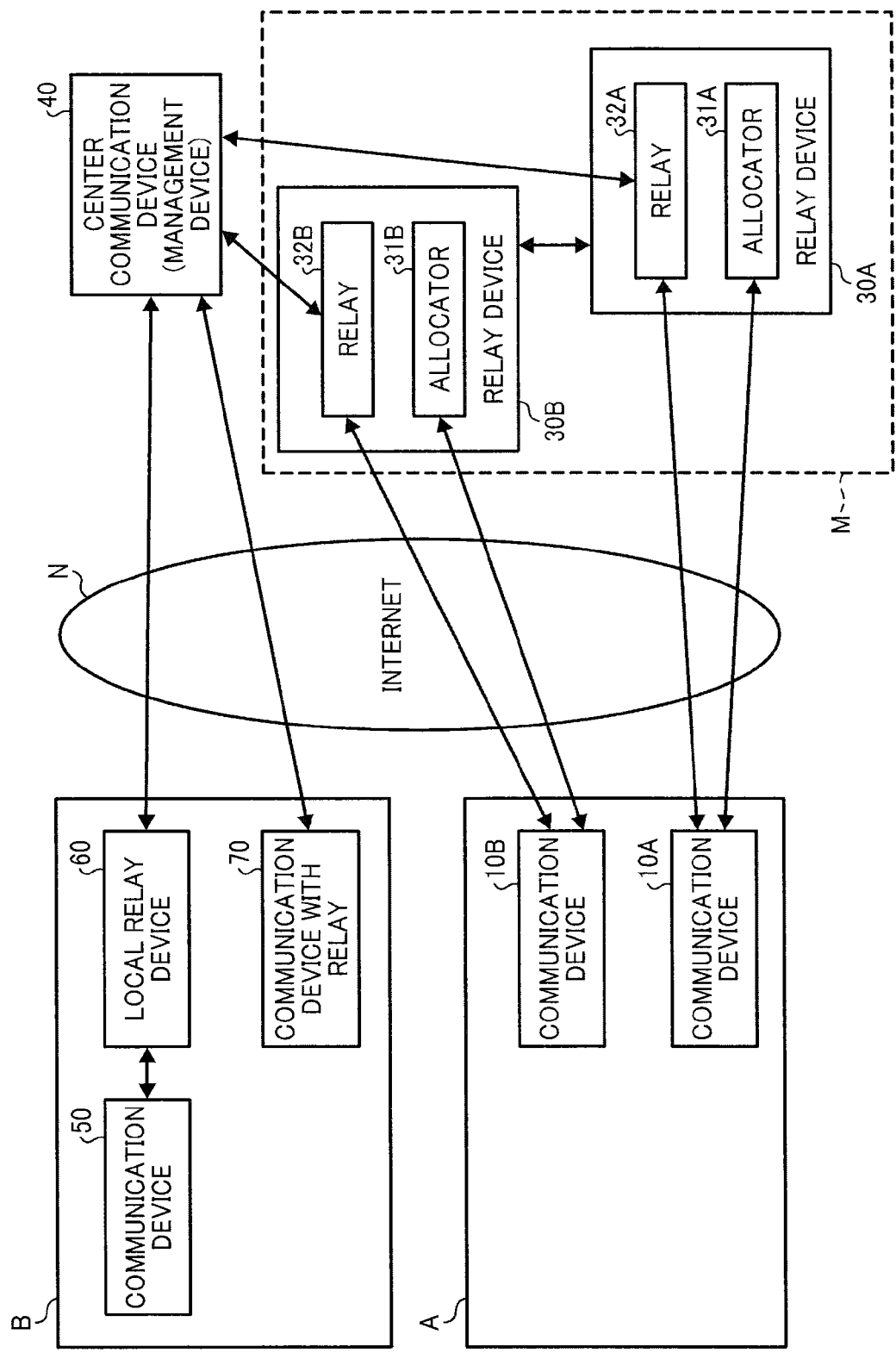
FIG. 1 is a schematic block diagram illustrating a communication system including a plurality of relay devices, and a plurality of communication devices including a device functioning as a management device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 17, a device, system, method, and control program, each of which assigns a relay device to a communication device is explained according to an example embodiment of the present invention.

FIG. 1 illustrates a configuration of a communication system according to an example embodiment of the present invention. The communication system of FIG. 1 includes a plurality of communication devices 10A and 10B (collectively referred to as the "communication device 10") each provided on a local area network (LAN) A, a center communication device 40 that is provided at a site remote from the LAN A, and a relay system M that relays data between the communication device 10 and the center communication device 40. The communication system of FIG. 1 further includes a communication device 50, a local relay device 60, and a communication device 70 provided with a relay function on a local area network (LAN) B.

In this example, the communication system of FIG. 1 functions as a remote management system that manages a plurality of communication devices using the center communication device 40. The center communication device 40 is provided at a services provider site, which is remotely located from any one of the user sites of LAN A and LAN B. More specifically, the center communication device 40 functions as a management device that remotely manages the plurality of communication devices 10, 50, and 70 provided on the user sites via the Internet N. The communication device 10 is not provided with the relay function such that, in order to communicate with the center communication device 40, the communication device 10 needs to access one of the relay devices 30.

The relay system M includes a plurality of relay devices 30A and 30B (collectively referred to as the "relay device 30"). The relay device 30 relays data between the communication device 10 and the center communication device 40 to allow communication between the communication device 10 and the center communication device 40. The relay device 30A includes an allocator 31A and a relay 32A. The relay device 30B includes an allocator 31B and a relay 32B. The allocators 31A and 31B (collectively referred to as the allocator 31) are each provided with the function of allocating the relay device 30 to the communication device 10 to allow the communication device 10 to communicate with the center communication device 40. The relay 32A and the relay 32B (collectively referred to as the relay 32) are each provided with the function of relaying communication between the communication device 10 and the center communication device 40.

In this example illustrated in FIGS. 1 to 17, it is assumed that the allocator 31 assigns the relay device 30 to which the allocator 31 belongs, to at least one of the communication devices 10 in the system. Alternatively, the allocator 31 of the relay device 30 may assign the other relay device 30 to the communication system 10 in a substantially similar manner as described below referring to the example case of an allocating device 20 of FIG. 18.

The communication device 10 communicates with the relay device 30 through the Internet N to cause the relay device 30 to relay communication between the communication device 10 and the center communication device 40. In such case, the communication device 10 accesses the relay device 30, and transmits data to be transmitted to the center communication device 40, such as notice, command, or execution result of command, to the relay device 30. The relay device 30 transfers the data received from the communication device 10 to the center communication device 40. The relay device 30 may pool a plurality of commands for a predetermined time period, or until the accumulated number of commands reaches a predetermined number, and transfer the accumulated commands to the center communication device 40 as one batch.

The LAN A is provided with a firewall such that the relay device 30 is not able to directly access the communication device 10. The relay device 30 pools any data to be transmitted from the center communication device 40 to the communication device 10 at least temporarily. When the communication device 10 periodically accesses the relay device 30, which may be referred to as polling, the relay device 30 obtains data that is addressed to and pooled for the communication device 10 that accesses. Alternatively, the communication device 10 may obtain data that is addressed to the communication device 10 from the relay device 30, when the communication device 10 accesses the relay device 30 to transmit data to the center communication device 40.

The communication device 10 accesses the allocator 31 of the relay device 30 to request for allocation of the relay device 30, when the communication device 10 is made communicable with the center communication device 40. Examples of such case include, but not limited to, the time when an communication application program providing the function of communicating with the center communication device 40 is installed onto the communication device 10, the time when the communication application program is executed while the communication device 10 is being connected to the Internet N, and the time when the communication application program is executed and the communication device 10 is connected to the Internet N.

The communication device 10 accesses the allocator 31 to request for allocation of the relay device 30, using information that is required for accessing the allocator 31 of the relay device 30. For example, the communication device 10 is previously stored with first address information such as an address of the relay device 30 that may be expressed in uniform resource locator (URL) address or an IP address, an ID of the relay device 30, or a password that is associated with the ID, and accesses the relay device 30 using the first address information. For the descriptive purposes, any information that can be used for accessing the relay device 30 is collectively referred to as the address information of the relay device 30, such that the address information is not limited to the address of the relay device 30. As described above, the address information of the relay device 30 may include identification information that uniquely identifies the relay device 30.

As described below, the communication device 10 may be provided with a plurality of communication interfaces that respectively communicate with the outside device using different communication methods. The first address information of the relay device 30 differs depending on a communication method such that the first address information to be used for accessing the relay device 30 is stored in association with information indicating the communication method. Alternatively, at least a part of the first address information may be commonly used among different communication methods. For example, when the relay device 30A and the relay device 30B are provided on the same network, the address information of the relay devices 30A and 30B may be partly the same.

The allocator 31 of the relay device 30, which is accessed by the communication device 10, sends second address information that is required for accessing a relay device 30 that relays data for the communication device 10. The second address information may include an address of the relay device 30 that may be expressed in a URL address or an IP address, an ID of the relay device 30, or a password that is associated with the ID. The communication device 10 accesses the relay 32 of the relay device 30 that is assigned using the second address information.

In FIG. 1, the communication device 10A and the communication device 10B are assigned with the relay device 30B and the relay device 30A, respectively. Alternatively, one relay device 30 may be assigned with a plurality of communication devices 10. The allocator 31 stores allocation information regarding allocation of the relay device 30 to the communication device 10, and sends notification based on the allocation information to the center communication device 40. The relay 32 may obtain allocation information regarding the communication device 10 to which the relay device 30 is assigned, based on notification from the allocator 31 or access from the communication device 10.

The center communication device 40 also manages allocation information indicating the association between the communication device 10 and the relay device 30 that relays data for the communication device 10, for each one of the communication devices 10 to be managed. Using this allocation information, the center communication device 40 identifies the relay device 30, which is assigned to a specific communication device 10 to which the center communication device 40 desires to send data. The center communication device 40 transmits data addressed to the communication device 10, to the identified relay device 30 to cause the relay device 30 to pool such data.

The center communication device 40 may manage the allocation information based on the allocation information transmitted from the relay device 30. More preferably, the center communication device 40 constantly updates the allocation information for each of the communication devices 10, by checking identification information of a specific relay device 30 that transmits data received from the communication device 10 to the center communication device 40. The updating of the allocation information is preferable since the association between the communication device 10 and the relay device 30 is constantly changed, as described below.

Further, in this example, before starting communication with the center communication device 40 through the relay device 30, the communication device 10 requests the center communication device 40 to be registered itself as a communication device to be managed by the center communication device 40. The communication device 10 may request the center communication device 40 to delete itself from a list of devices subject for management, for example, before making the function of communicating with the center communication device 40 to be invalid.

In one example, the above-described function of communicating with the center communication device 40 may be previously embedded in the communication device 10 as the communication application program. More preferably, the function of communicating with the center communication device 40 may be provided as a software development kit (SDK) application, which is developed using the SDK and operates on an operating system (OS) platform of the communication device 10. Through the SDK application, any communication device 10, which may be provided by a provider other than the services provider of the center communication device 40 and the relay device 30, is able to communicate with the center communication device 40 as a device subjected for management by the center communication device 40.

The communication device 50 communicates with the center communication device 40 via the local relay device 60.

The communication device 70 communicates with the center communication device 40 using the relay function that is provided in the communication device 70. Assuming that a firewall is provided in the LAN B to prohibit access from the outside, the local relay device 60 periodically accesses the center communication device 40 to obtain a request addressed to the communication device 50, and transfers the request to the communication device 50 to cause the communication device 50 to execute the request and return a response to the center communication device 40. In a substantially similar manner, the communication device 70 with relay function periodically accesses the center communication device 40 to obtain a request addressed to the communication device 70, and returns a response including an executing result of the request to the center communication device 40.

Figure 2:
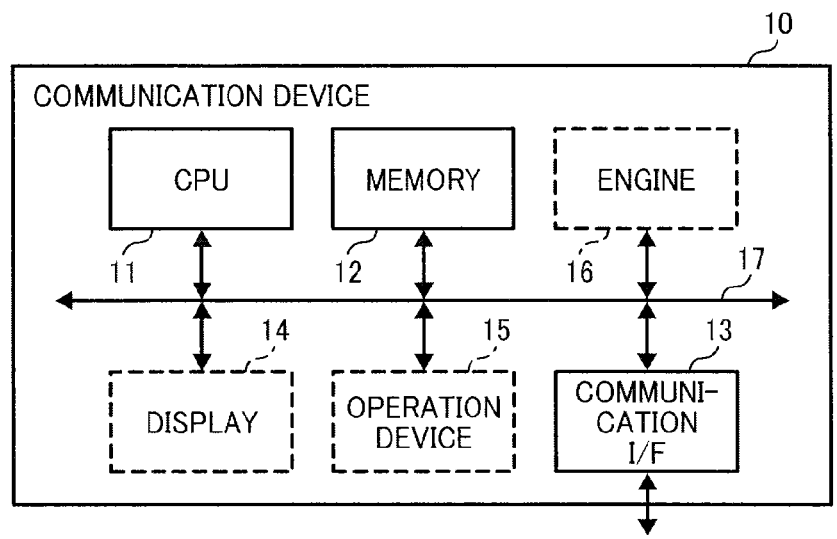
FIG. 2 is a schematic block diagram illustrating a hardware structure of any one of the communication device and the relay device of the communication system of FIG. 1, the communication device, allocating device, and relay device of FIGS. 18 and 26.

Referring now to FIG. 2, a hardware structure of the communication device 10 is explained according to an example embodiment of the present invention. As illustrated in FIG. 2, the communication device 10 includes a central processing unit (CPU) 11, a memory 12, and a communication interface (I/F) 13, which are connected through a system bus 17.

The CPU 11 controls entire operation of the communication device 10. For example, the CPU 11 executes various programs stored in the memory 12 to perform various operations. In this example, the memory 12 includes a nonvolatile memory, a volatile memory, and a rewritable nonvolatile memory, etc. The nonvolatile memory, such as a read only memory (ROM), stores therein various programs for execution by the CPU 11 or various parameters. The volatile memory, such as a random access memory (RAM), temporarily stores various data or functions as a work memory of the CPU 11. The rewritable nonvolatile memory, such as a flash memory or a hard disk drive (HDD), stores data such as parameters. The data stored in the nonvolatile memory is not deleted even after the power of the communication device 10 is turned off.

The communication I/F 13 is an interface that allows the communication device 10 to connect to the network. For example, the communication I/F 13 may be implemented by a network interface in compliance with the Ethernet. Alternatively, any desired communication route or protocol may be used, based on wired or wireless network. To improve the security, the communication route may be preferably provided with the function of encrypting or authenticating. More specifically, as described below, the communication I/F 13 communicates with the outside apparatus using a specific communication protocol available to the communication device 10, depending on communication control programs stored in the memory 12.

The communication device 10 may further include a display 14, an operation device 15, and an engine 16.

The display 14 may be implemented by a display that displays a message or a graphical user interface (GUI) to the user to notify the user of an operation state of the communication device 10. In alternative to implementing the display 14 as a liquid crystal display (LCD), the function of the display 14 may be implemented by a lamp, which is lighted up to indicate warning to the user. The operation device 15 may be implemented by a switch, touch panel, keyboard, or pointing device, which allows the user to input a user instruction to the communication device 10.

The engine 16 causes the communication device 10 to output data to the outside or input data from the outside. For example, if the communication device 10 is implemented by a laser printer, the engine 16 corresponds to a print engine that forms an image on a recording sheet using an electrophotographic method. If the communication device 10 is implemented by a scanner, the engine 16 corresponds to a scanner engine that reads an original image into scanned image data.

In this example, the relay device 30 and the center communication device 40 each have a hardware structure that is substantially similar to the hardware structure illustrated in FIG. 2. More specifically, the relay device 30 is implemented by one or more general-purpose computers provided with a server function such that the relay device 30 at least includes the CPU 11, the memory 12, and the communication I/F 13. The relay device 30 executes a relay control program to perform various operations such as operation of relaying communications. The center communication device 40 may be implemented by any desired image forming apparatus, one or more computers functioning as a server, etc.

Figure 3:
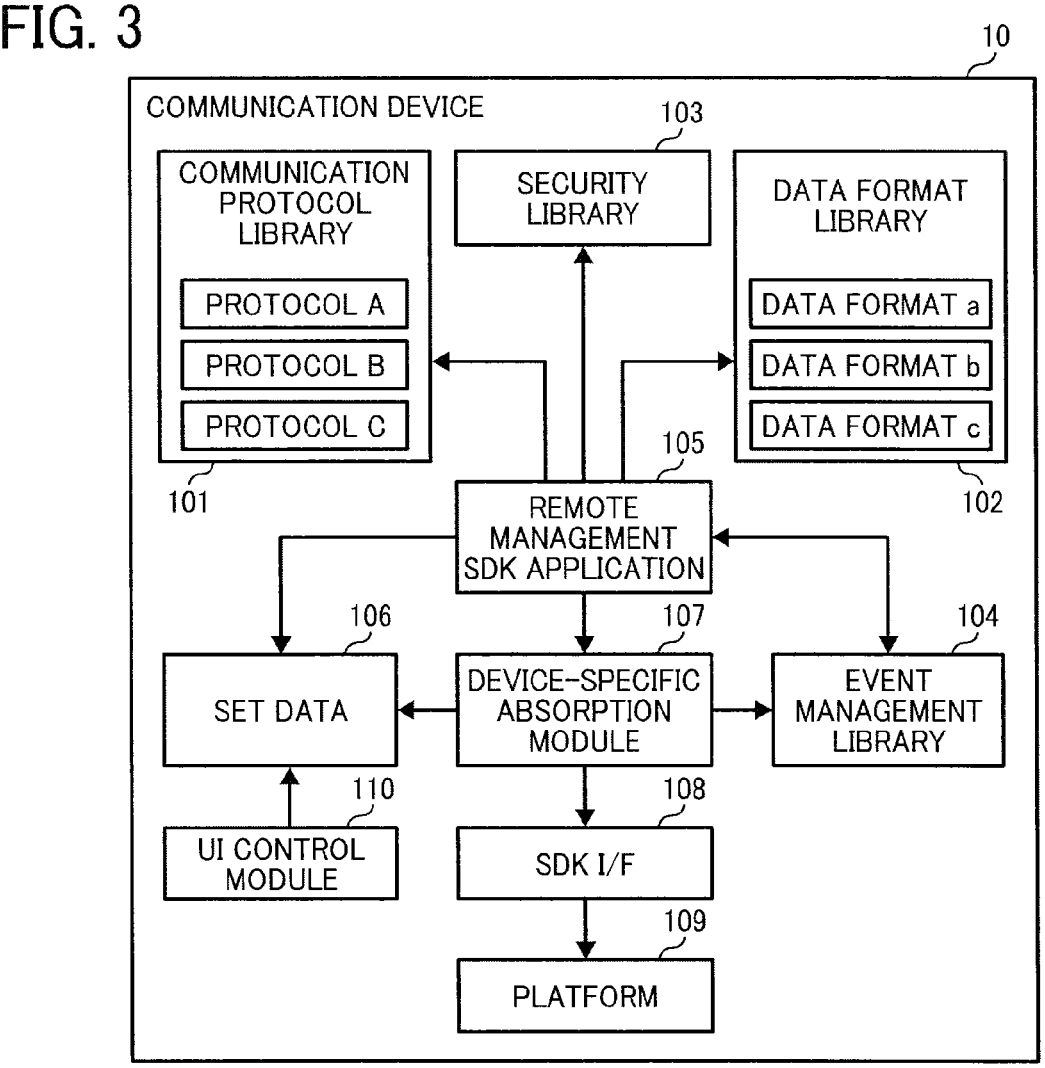
FIG. 3 is a schematic block diagram illustrating a functional structure of the communication device of the communication system of FIG. 1.

Referring now to FIG. 3, a software structure of the communication device 10 is explained according to an example embodiment of the present invention. As described above referring to FIG. 1, when the SDK application providing the function of communicating with the center communication device 40 is installed and executed by the CPU 11, the communication device 10 is caused to have a software or functional structure as illustrated in FIG. 3. Referring to FIG. 3, the communication device 10 includes a communication protocol library 101, a data format library 102, a security library 103, an event management library 104, a remote management SDK application 105, a set data 106, a device-specific absorption module 107, a SDK I/F 108, a platform 109, and a user interface (UI) control module 110.

The communication protocol library 101 is a library, which collects various programs to cause the communication device 10 to perform the function of communicating through the network such as the Internet N.

In FIG. 3, the control programs for executing the communication functions based on protocols A, B, and C are registered to the communication protocol library 101. By installing an arbitrary number of communication control programs, the communication device 10 is able to communicate with the outside apparatus using various communication protocols. The communication control programs may be deleted from the communication protocol library 101 at any desired time. Examples of communication protocol include, but not limited to, HTTP over SSL/TLS (HTTPS) and a protocol designed for email ("email protocol").

The data format library 102 is a library, which collects various programs to cause the communication device 10 to perform the function of describing or interpreting data to be transmitted to a counterpart device through the network such as the Internet N. In FIG. 3, the data format library 102 is registered with control programs for describing or interpreting data in data formats a, b, and c. By installing an arbitrary number of description or interpretation control programs, the communication device 10 is able to describe or interpret various data formats. The description or interpretation control programs may be deleted from the data format library 102 at any desired time. Examples of data format include, but not limited to, SOAP, Extensible Markup Language (XML), and text.

The communication device 10 may use any desired combination of the registered protocols and the registered data formats to communicate with the outside device. For example, in order to send data in SOAP, XML, or text, any one of HTTPS and email protocols may be used to send the data.

The communication device 10 selects one protocol from the communication protocol library 101 and one data format from the data format library 102 to determine a combination of protocol and data format to be used for communicating with the relay device 30. This combination, which may be referred to as the communication method, may be selected according to a user instruction received through the communication device 10. Alternatively, the communication method may be selected by the services provide site such as by the relay device 30 or the center communication device 40, while taking into account the user preference. Unless the other combination of protocol and data format is selected, the selected communication method is used for communicating with the relay device 30.

The security library 103 is a library, which collects various programs to cause the communication device 10 to perform the function of authenticating a device or a user at the device, or the function related to encrypted communications.

The event management library 104 is a library, which collects various programs to cause the communication device 10 to perform the function of managing an event issued by the communication device 10, or an event relating to a command received from the outside or notification received from the outside.

The remote management SDK application 105 is an application, which causes the communication device 10 to be remotely managed by the center communication device 40, for example, by sending an event issued at the communication device 10 to the center communication device 40, or executing an operation at the communication device 10 according to a command received from the center communication device 40. More specifically, the remote management SDK application 105 causes the communication device 10 to communicate with the center communication device 40 through the relay device 30 as described above referring to FIG. 1, using any one of the communication library 101, the data format library 102, the security library 103, and the event management library 104.

The set data 106 corresponds to one or more parameters to be used by the remote management SDK application 105 when communicating with the center communication device 40. The set data 105 includes address information such as an address of the relay device 30 to be accessed, and a cycle of polling. In one example, the set data 105 may be previously stored in a memory of the communication device 10 such as the rewritable nonvolatile memory.

Alternatively, upon execution of the remote management SDK application 105, the communication device 10 may access the relay device 30 to download the set data 105 from the relay device 30. Unless the remote management SDK application 105 is executed, the communication device 10 does not have to provide a memory space for storing the set data to be used by the remote management SDK application 105. This helps the communication device 10 to treat the function of communicating with the center communication device 40 for remote management to be independent from the other functions of the communication device 10. The address information such as the address of the allocator 31 of the relay device 30, which is used for accessing the relay device 30, is previously written in a program of the remote management SDK application 105 or stored as a part of the parameters to be used by the communication device 10. The remote management SDK application 105 obtains the address of the relay device 30 when the remote management SDK application 105 is executed.

The device-specific absorption module 107, which may be referred to as a wrapper, is a module that absorbs the change in data formats or parameter items, which may be caused when a type of the communication device 10 is changed, so as to allow the remote management SDK application 105 to operate on various types of the communication device 10. For example, notification to be sent from the remote management SDK application 105 to the center communication device 40 includes a fixed part and a variable part. When a parameter name or a parameter value provided by the SDK I/F 108 differs, the device-specific absorption module 107 may change a parameter name or a parameter value according to a request received from the remote management SDK application 105.

The platform 109 functions as an environment where the communication device 10 is controlled. The platform 109 may be implemented by the operating system (OS) of the communication device 10. The SDK I/F 108 is an application program interface (API), which may be used for developing software that accesses the platform 109.

The UI control module 110 is provided with a function of controlling a UI, which allows a user to request an instruction or input with settings data. The set data 106 is updated according to a user instruction received through the UI. For example, the set data 106 may reflect a user instruction for selecting a communication method to be used for communicating with the outside device such as the relay device 30.

Figure 4:
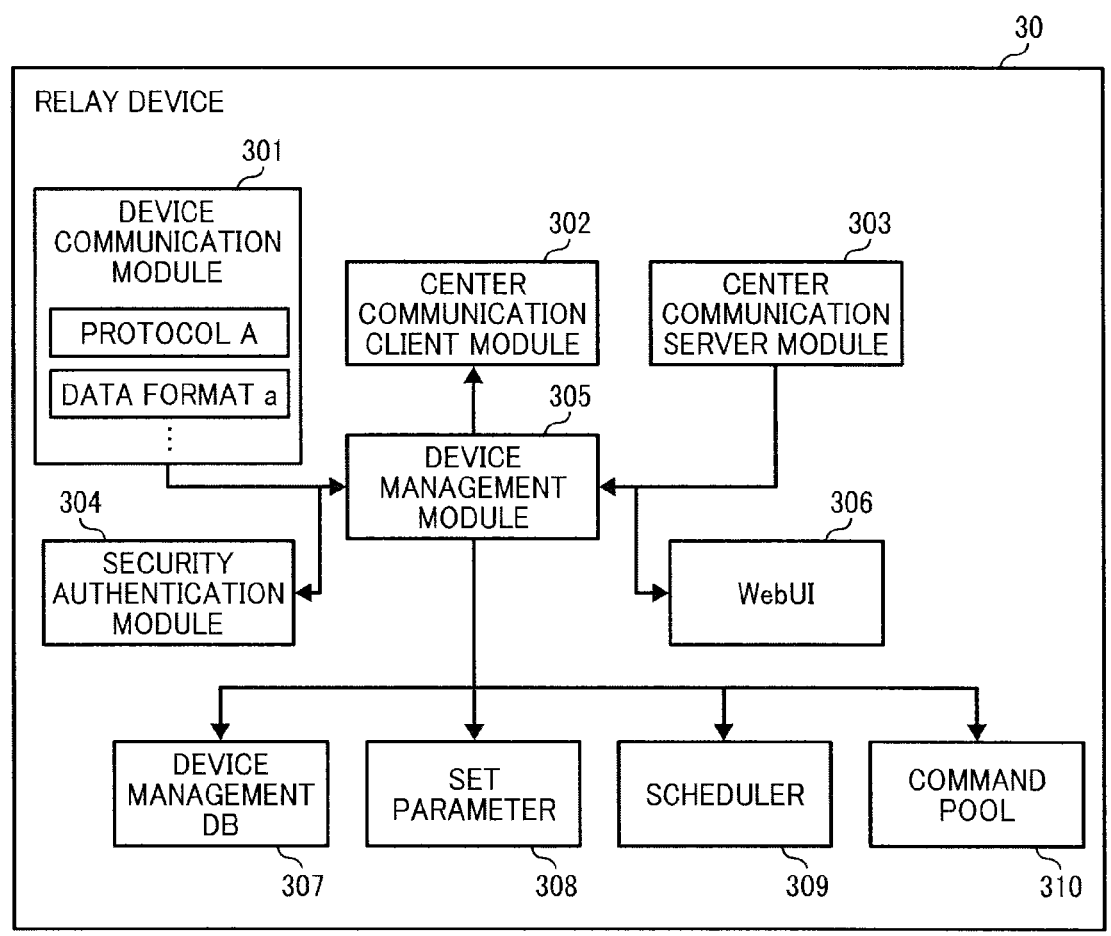
FIG. 4 is a schematic block diagram illustrating a functional structure of the relay device of the communication system of FIG. 1.

Referring now to FIG. 4, a software structure of the relay device 30 is explained according to an example embodiment of the present invention. More specifically, when a relay communications control program is installed, the relay device 30 having the structure of FIG. 2 is caused to have a software or functional structure illustrated in FIG. 4. Referring to FIG. 4, the relay device 30 includes a device communication module 301, a center communication client module 302, a center communication server module 303, a security authentication module 304, a device management and allocation module ("device management module") 305, a Web user interface (Web UI) 306, a device management database (DB) 307, a set parameter 308, a scheduler 309, and a command pool 310.

The device communication module 301 is a module that causes the relay device 30 to communicate with the communication device 10. In this example, the communication device 10 is provided within the firewall. The device communication module 301 causes the relay device 30 to function as a server that receives a communication request from the communication device 10, and sends a communication response to the communication device 10 in response to the communication request.

The device communication module 301 is further provided with the function of communicating with the communication device 10 based on at least one communication method. In this example illustrated in FIG. 4, the device communication module 301 is provided with the function of communicating using a protocol A and a data format a. As described below, the relay device 30 is allocated to the communication device 10 based on whether the relay device 30 is capable of communicating with the communication device 10 based on the communication method compatible with the communication device 10.

The center communication client module 302 is a module that causes the relay device 30 to function as a client that accesses the center communication device 40 to communicate with the center communication device 40. More specifically, the center communication client module 302 causes the relay device 30 to function as a client that sends a communication request to the center communication device 40, and receives a communication response from the center communication device 40 in response to the communication request.

The center communication server module 303 is a module that causes the relay device 30 to function as a server that communicates with the center communication device 40 in response to the access made by the center communication device 40. More specifically, the center communication server module 303 causes the relay device 30 to function as a server that receives a communication request from the center communication device 40, and sends a communication response to the center communication device 40 in response to the communication request.

In this example, it is assumed that the relay device 30 and the center communication device 40 are managed by the same services provider, such that the relay device 30 and the center communication device 40 are made accessible from each other. Alternatively, the relay device 30 and the center communication device 40 may be made accessible only in one direction. In such case, one of the relay device 30 and the center communication device 40 functions as a server, and the other one of the relay device 30 and the center communication device 40 functions as a client. Depending on which of the server function and the client function is to be performed, the relay device 30 may only be provided with the module that functions as the server (such as the center communication server module 303) or the module that functions as the client (such as the center communication client module 302).

In this example, each of the relay devices 30 in the system communicates with the center communication device 40 using a predetermined communication method. For example, the HTTP protocol and the SOAP data format may be used by the relay device 30 to communicate with the center communication device 40. Accordingly, the center communication device 40 does not have to change a communication method based on the relay device 30 such that workload of the center communication device 40 decreases.

In case a communication method used for communicating with the communication device 10 differs from the communication method used for communicating with the center communication device 40, the relay device 30 converts a data format. More specifically, the relay device 30 converts data received from the communication device 10 to have a data format compatible with the communication method of the center communication device 40, and sends the converted data to the center communication device 40. The relay device 30 converts data received from the center communication device 40 to have a data format compatible with the communication device 10, and sends the converted data to the communication device 10. In this manner, the communication device 10 is able to freely set a communication method according to user preference as a communication method to be used for communicating with the center communication device 40 that is provided outside the user environments.

The security authentication module 304 is a module that causes the relay device 30 to perform the function relating to authentication of a device or authentication of a user who operates the device, and the function relating to encryption of communications.

The device management and allocation module 305 is a module that causes the relay device 30 to perform the function of relaying communications between the center communication device 40 and the communication device 10 so as to cause the center communication device 40 to manage the communication device 10. More specifically, the device management and allocation module 305 of the relay device 30 manages the times to transmit communications data or the status in data transmission. Through management by the device management and allocation module 305, the center communication device 40 is able to transmit various data to the communication device 10 via the firewall, or receive various data from the communication device 10 via the firewall, while suppressing the processing load onto the center communication device 40.

The device management and allocation module 305 is further provided with the function of allocating the relay device 30 with the communication device 10 such that the allocated relay device 30 relays communications between the communication device 10 and the center communication device 40. More specifically, when the communication device 10 accesses the relay device 30 to request for allocation, the device management and allocation module 305 sends address information of the relay device 30 that is allocated to the communication device 10 to the communication device 10.

The Web UI 306 is a module that functions as a user interface, which allows the outside device to access the relay device 30 through a web browser to refer to or set various data stored in the device management DB 307.

The device management DB 307 is a database used for managing various information of the communication device 10 to be managed by the relay device 30 to relay data between the communication device 10 and the center management device 40. The relay device 30 transmits various data read from the device management DB 307 to the center communication device 40 through the center communication client module 302, or receives various data from the center communication device 40 through the center communication server module 302 to update various data in the device management DB 307.

The set parameter 308 corresponds to various parameters to be used when communicating with the communication device 10 or the center communication device 40. For example, the set parameter 308 includes a parameter indicating the time at which data received from the communication device 10 is transferred to the center communication device 40.

The scheduler 309 provides the function of managing the time at which the relay device 30 sends notification to the center communication device 40, or the time at which the command received from the center communication device 40 is deleted.

The command pool 310 provides the function of temporarily storing various data that is received from the center communication device 40 for the communication device 10 including command, notices, and responses, until such data is transferred to the destination communication device 10. The command pool 310 further provides the function of temporarily storing various data that is received from the communication device 10 for the center communication device 40, until such data is transferred to the center communication device 40.

Now, examples operations of communicating between the communication device 10 and the center communication device 40 through the relay device 30 are explained. In the following examples, the communication system of FIG. 1 is implemented as a remote management system in which the center communication device 40 remotely manages the communication device 10. For the descriptive purposes, the center communication device 40 may be referred to as the management device 40. Further, it is assumed that the communication device 10 is implemented by an image forming apparatus such as a copier, printer, or multifunctional printer (MFP).

Referring now to FIGS. 5A to 5E, operation of remotely managing the communication device 10 using the management device 40, performed by the communication system of FIG. 1, is explained according to an example embodiment of the present invention. In this example, the other system 80 is provided, which cooperates with the management device 40 to provide services to a user at the communication device 10, or to assist the management device 40 in providing services to the user at the communication device 10. For example, the other system 80 includes a plurality of systems each provided by a different services provider such that each system of the other system 80 may be located in a site where each services provider is located.

FIG. 5A illustrates the example case in which the communication device 10 periodically sends state information regarding the current state of the communication device 10 to the management device 40.

At S11, the communication device 10 periodically sends state information to the relay device 30. For example, when the communication device 10 determines that a counter value of a timer reaches a predetermined value, the communication device 10 collects various state information regarding the current state of the communication device 10 including, for example, counter information indicating a number of printed sheets, error occurrence information indicating the occurrence rate of error such as a jam error, and consumption information indicating a toner consumption. The communication device 10 sends the collected state information to be transmitted to the management device 40, to the relay device 30. In such case, the communication device 10 sends a communication request including a plurality of operation request each including state information to the relay device 30.

More specifically, in this example, at the communication device 10, the remote management SDK application 105 requests the platform 109 for a predetermined parameter value, through the device-specific absorption module 107 and the SDK I/F 108, to collect state information of the communication device 10.

At S12, the relay device 30 transfers the received state information to the management device 40. The relay device 30 may transfer the state information immediately after the state information is received. Alternatively, the relay device 30 may pool the state information, and transmits the accumulated state information to the management device 40 when the accumulated state information reaches a certain level.

When the state information is received, at S13, the management device 40 stores the received state information as information indicating the operation state of the communication device 10.

At S14, the other system 80 accesses the management device 40 at the predetermined time to obtain the state information indicating the operation state of the communication device 10. For example, the obtained state information may be used to generate an operation status report of the communication device 10 to be sent to a customer. Alternatively, the other system 80 may calculate a charge fee based on the counter value of the communication device 10 that is obtained from the state information.

When the relay device 30 receives a request including the state information from the communication device 10, the relay device 30 may respond to the communication device 10 indicating that the state information is successfully received in response to the request. Further, when the management device 40 completes processing of the state information, which is performed based on the request sent from the communication device 10, the management device 40 may send a response to the communication device 10 through the relay device 30 to indicate that the processing is successfully completed.

FIG. 5B illustrates an example case in which the communication device 10 transmits information to the management system 40, which requires immediate attention by the management system 40.

S21 to S23 are performed when an error or a trouble occurs such that the communication device 10 needs to be checked by a service technician.

At S21, when the communication device 10 detects an error or trouble, which needs to be notified to the management device 40 immediately, the communication device 10 transmits notices indicating that the error occurs, such as error information, to the management device 40 through the relay device 30. For example, when the communication device 10 needs to be repaired, the communication device 10 automatically sends error information to the management device 40 to request for a service technician.

At S22, the relay device 30 transfers the error information to the management device 40.

At S23, when the error information is received at the management device 40, the management device 40 analyzes the error information to generate a request for a service technician who can fix the error, and sends the request for service technician to the other system 80, specifically, to a service site that is responsible for managing the communication device 10. Based on the request for service technician, the service site arranges a service technician to be dispatched to the user site where the communication device 10 is located or contact the user of the communication device 10.

S24 to S26 are performed when the communication device 10 detects the end status of a supply such that the communication device 10 needs to order a new supply.

At S24, when the communication device 10 detects the end status of the supply, such as the end status of toner supply, the communication device 10 transmits notices indicating that the end status of a specific supply is detected, such as supply end information, to the management device 40 through the relay device 30.

At S25, the relay device 30 transfers the supply end information to the management device 40.

At S26, when the supply end information is received at the management device 40, the management device 40 analyzes the supply end information to generate a request for a new supply, and sends the request for new supply to the other system 80, specifically, to a service site that is responsible for sending a new supply to the communication device 10. Based on the request for new supply, the service site sends a new supply to the communication device 10 or arranges a service technician to bring a new supply to the communication device 10.

FIG. 5C illustrates an example case in which the management device 40 sends instructions such as a command to the communication device 10 to request the communication device 10 to execute specific operations according to the command. For example, when an error frequently occurs at a specific communication device 10, or when the user has requested the management device 40 to send a service technician to fix the error or trouble, the other system 80 may want to access the communication device 10 to obtain various data indicating the current state of the communication device 10, change settings of the communication device 10, or cause the communication device 10 to perform test operations. In such case, the other system 80 requests the management device 40 to transmit a request including a command to the communication device 10.

At S31, the other system 80 sends a request for obtaining information, changing setting, or executing a command, which is addressed to the communication device 10, to the management device 40.

At S32, the management device 40 generates a request addressed to the communication device 10, based on the instruction or the request received from the other system 80, and sends the request to the relay device 30 that relays communications between the destination communication device 10 and the management device 40.

At S33, the relay device 30 pools the request received from the management device 40.

When the communication device 10 performs polling at S34, the relay device 30 obtains the request that is pooled for the communication device 10, and transfers the request in response to the polling at S35.

Alternatively, the relay device 30 may transfer the request that is pooled at S33 at any other time when the communication device 10 accesses the relay device 30, for example, when the state information is sent at S11 or the error information is sent at S21.

At S36, the communication device 10, which receives the request from the management device 40, perform processing according to the command in the request to generate a result of executing the command. At S37, the communication device 10 transmits the processing result to the relay device 30 as a response to the request received from the management device 40.

At S38, the relay device 30 transfers the processing result to the management device 40.

At S39, based on the received processing result, the management device 40 sends notification indicating the processing result to the other system 80 that sends the request at S31.

As described above referring to FIG. 5C, the other system 80 is able to obtain information regarding the current operation state of the communication device 10 or any other information desired by the other system 80.

In the above-described example, it is assumed that the other system 80 requests the communication device 10 to obtain information, change settings, or execute a specific operation through the management device 40. In a substantially similar manner, the management device 40 may request the communication device 10 to obtain information, change settings, or execute a specific operation.

Figure 5D:
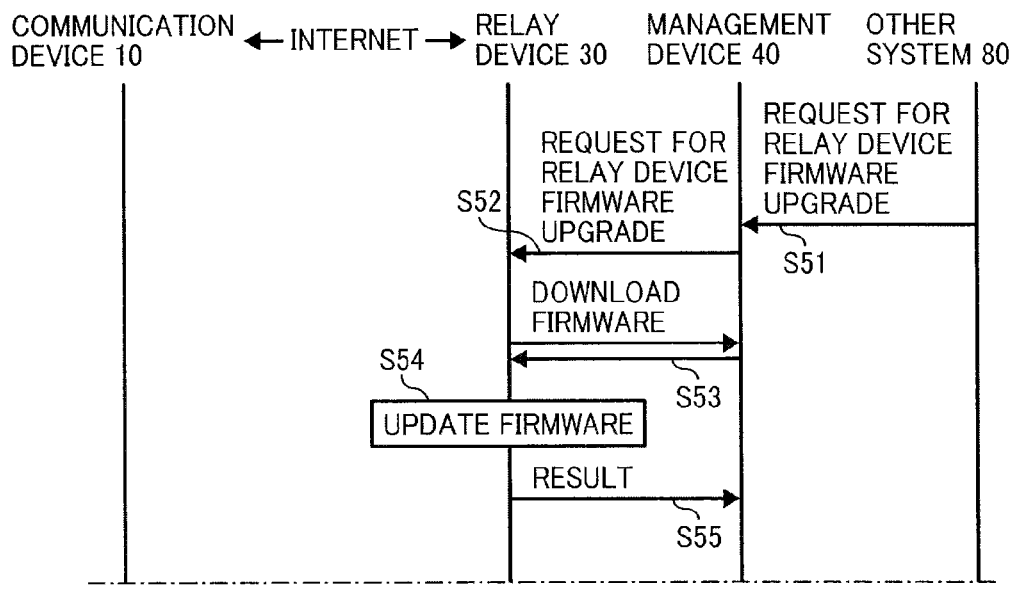
FIG. 5D is a data sequence diagram illustrating operation of sending a request for updating firmware of the relay device, performed by the communication system of FIG. 1, according to an example embodiment of the present invention.

FIG. 5D illustrates an example case in which firmware of the relay device 30 is updated. For example, when a services provider of the communication system of FIG. 1 determines that firmware of the relay device 30 needs to be upgraded to a new version, the services provider requests the management device 40 to instruct firmware upgrade of the relay device 30 through the other system 80.

At S51, the other system 80 sends a request for firmware upgrade of the relay device 30 to the management device 40. The management device 40 stores the new version of firmware in a memory, which is obtained from the other system 80, such that the relay device 30 can download the new version of firmware from the management device 40.

At S52, the management device 40 sends a request for firmware upgrade to all of the relay devices 30 that are managed by the management device 40, or at least the relay devices 30 that are needed to be upgraded.

At S53, the relay device 30, which receives the request for firmware upgrade, executes processing according to the request. More specifically, the relay device 30 accesses the management device 40 to download the new version of firmware.

At S54, the relay device 30 updates firmware using the downloaded new version of firmware.

At S55, the relay device 30 sends a processing result to the management device 40 to notify that firmware upgrade is successfully performed. The management device 40, which receives the processing result from each one of the relay devices 30, may send notification including the processing results of the relay devices 30 to the other system 80.

As described above, since firmware upgrade of the relay device 30 is performed by the services provider within the sites that can be managed by the services provider, polling or pooling the requests is not necessary such that firmware upgrade tends to be completed immediately after the request is generated.

Figure 5E:
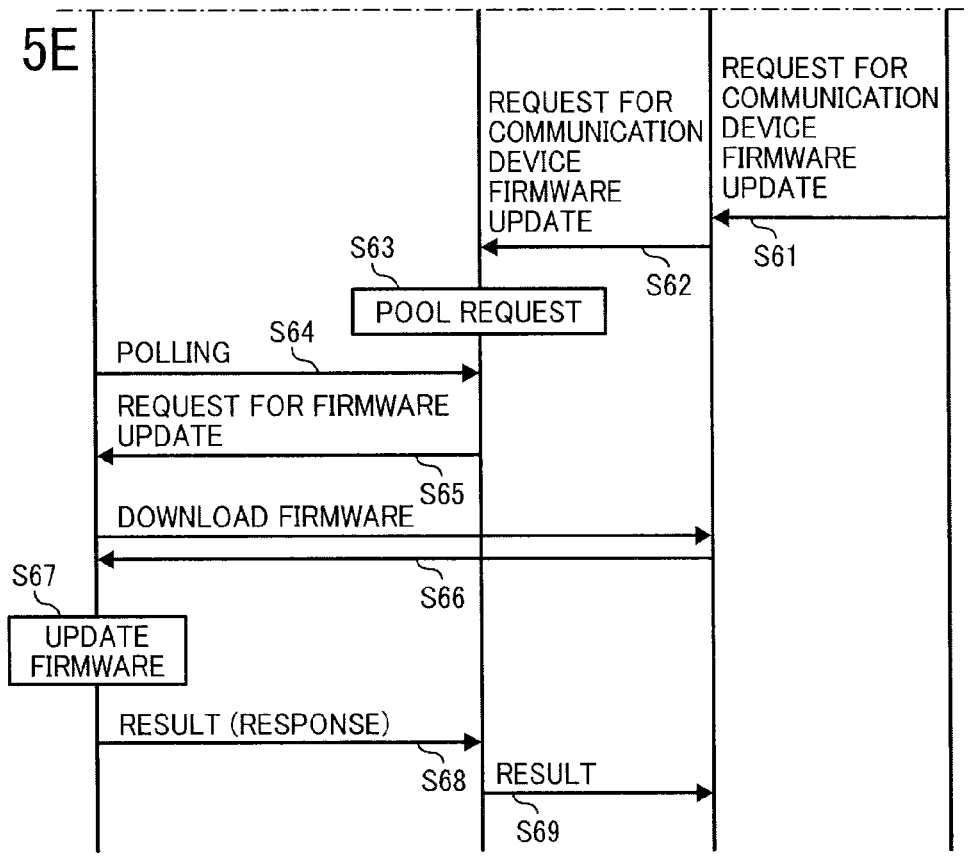
FIG. 5E is a data sequence diagram illustrating operation of sending a request for updating firmware of the communication device, performed by the communication system of FIG. 1, according to an example embodiment of the present invention.

FIG. 5E illustrates an example case in which firmware of the communication device 10 is upgraded. For example, when the services provider of the communication system of FIG. 1 determines that firmware of the communication device 10 needs to be upgraded to a new version, the services provider requests the management device 40 to instruct firmware upgrade of the communication device 10 through the other system 80.

At S61, the other system 80 sends a request for firmware upgrade of the communication device 10 to the management device 40. The management device 40 stores the new version of firmware in a memory, which is obtained from the other system 80, such that the communication device 10 can download from the new version of firmware from the management device 40.

At S62, the management device 40 sends a request for firmware upgrade to all of the communication devices 10 that are managed by the management device 40, or at least the communication devices 10 that are needed to be upgraded, through the relay devices 30.

At S63, each one of the relay devices 30, or the relay device 30, pools the request received from the management device 40.

When the communication device 10 performs polling at S64, the relay device 30 obtains the request and sends the request to the communication device 10 in response to the polling at S65.

At S66, the communication device 10, which receives the request for firmware upgrade, executes processing according to the request. More specifically, the communication device 10 accesses the management device 40 to download the new version of firmware from the management device 40.

At S67, the communication device 10 updates firmware using the downloaded new version of firmware.

At S68 and S69, the communication device 10 sends a processing result to the management device 40 through the relay device 30 to notify that firmware upgrade is successfully performed. The management device 40, which receives the processing result from each one of the communication devices 10, may send notification including the processing results of the communication devices 10 to the other system 80.

In the above-described example, it is assumed that the communication device 10 accesses the management device 40 to download the new version of firmware. Alternatively, the communication device 10 may access any other device, such as the relay device 30, as long as the new version of firmware is downloadable. The address to be accessed may be specified, for example, by a request for firmware upgrade.

As described above, firmware of the communication device 10, which is provided in the user site, is upgraded in response to the request sent by the management device 40.

In order to allow the communication device 10 and the management device 40 to perform any one of the above-described operations, the allocating device 20 assigns a specific relay device 30 to the communication device 10. The allocating device 20 further manages one or more devices in the communication system of FIG. 1 such that the processing load is equally distributed over the relay devices 30.

In the communication system of FIG. 1, the allocator 31 of the relay device 30 allocates one of a plurality of relay devices 30 to at least one of a plurality of communication devices 10. The relay device 30, which is allocated, performs operation with respect to the communication device 10 such as relaying data. The allocator 31 of the relay device 30 may further change the allocation of the relay device 30 to the communication device 10 according to various changes in communication system.

Figure 6:
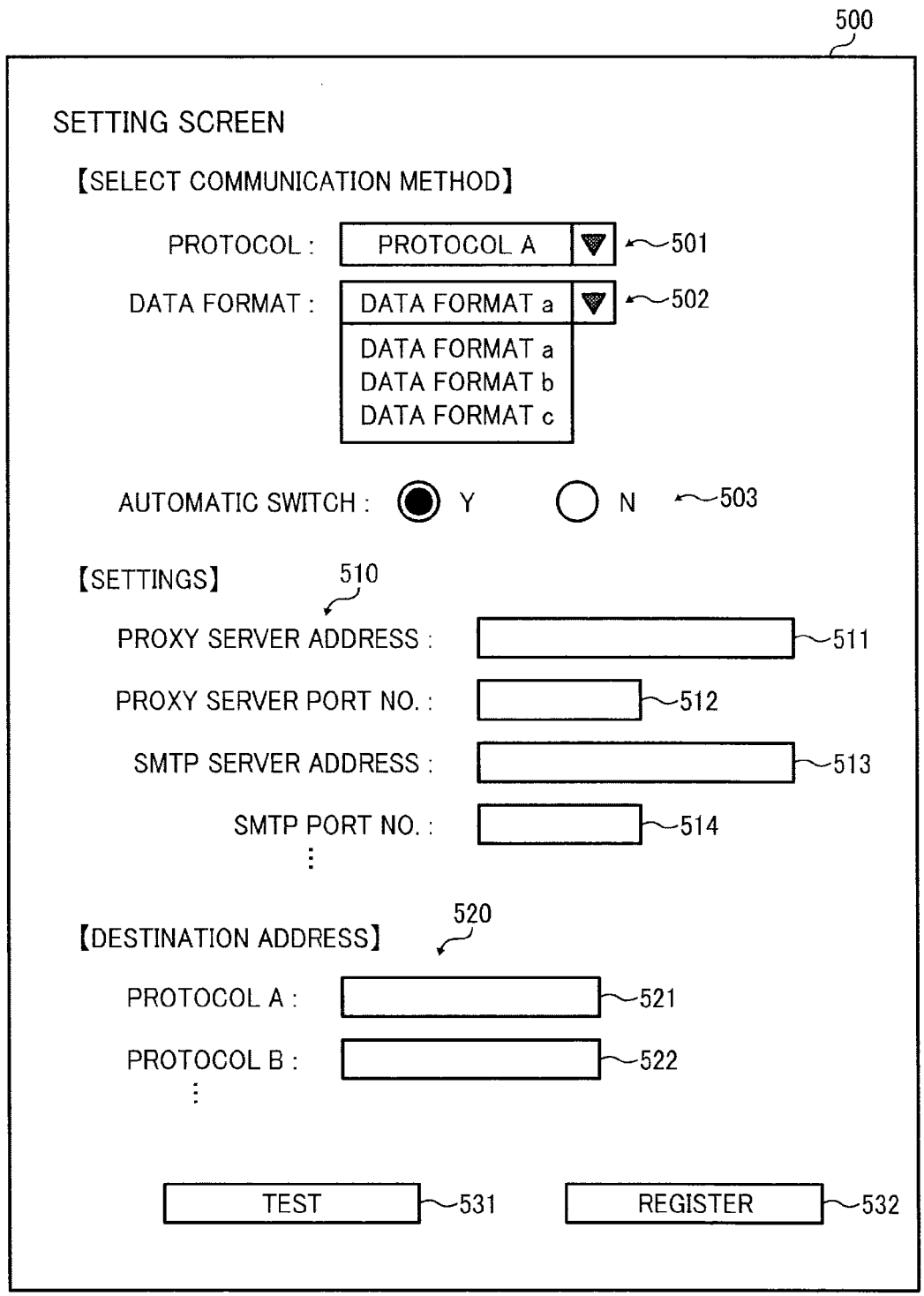
FIG. 6 is an example setting screen displayed at the communication device of FIG. 1.

FIG. 6 illustrates an example setting screen, which allows a user to enter various settings such as selection of a communication method to be used by the communication device 10 with the relay device 30, and various parameter values relating to the selected communication method.

The setting screen 500 of FIG. 6 is a geographic user interface (GUI) displayed by the UI control module 110 of the communication device 10 onto the display 14. The setting screen 500 includes a protocol selection part 501, a data format selection part 502, an automatic switch set part 503, a communication set part 510, a destination address part 520, a communication test execute key 531, and a register key 532.

The protocol selection part 501 is a pull-down menu, which allows the user to select a protocol to be used for communication with the relay device 30, from one or more protocols registered to the communication protocol library 101.

The data format selection part 502 is a pull-down menu, which allows the user to select a data format to be used for communication with the relay device 30, from one or more data formats registered to the data format library 102.

In case there is any one or any combination of the registered protocols and the registered data formats that may not work based on hardware resources of the communication device 10, the protocol selection part 501 or the data format selection part 502 may cause the protocol or the data format that is not compatible to be unelectable by the user. In such case, the protocol or the data format that is not compatible may be displayed differently, such as in gray, as in the case of "data format c" of FIG. 6. Alternatively, the protocol or the data format that is not compatible may not be included in the pull-down menu. By making the protocol or the data format that is not compatible be unelectable by the user, negative influences on the communication system may be suppressed. For example, this prevents communications from being unstable due to the increased workloads in communication processing by the communication device 10.

The communication device 10 may determine whether the protocol or the data format registered to the communication device 10 is compatible with the communication device 10 by referring to information regarding the hardware resources of the communication device 10. Alternatively, the management device 40 may determine whether the protocol or the data format registered to the communication device 10 is compatible with the communication device 10, based on information regarding the hardware resources of the communication device 10 obtained from the communication device 10. Alternatively, the communication device 10 may perform a communication test using a specific communication protocol or data format to generate a test result, and determines whether the protocol or the data format registered to the communication device 10 is compatible based on the test result.

The automatic switch set part 503 is a radio button, which is selected by the user to indicate whether the user permits the communication device 10 to automatically change a communication method. For example, in case the communication device 10 determines that communication based on a communication method selected by the user fails, or when the communication device 10 receives an instruction for changing the communication method from the management device 40, the communication device 10 automatically changes the communication method when a value of the automatic switch set part 503 indicates valid "Y".

The communication set part 510 allows the user to set various parameter values that may be used by the communication device 10 to communicate with the outside apparatus such as the relay device 30. In FIG. 6, the communication set part 510 includes four text boxes 511 to 514, which respectively allow the user to set a proxy server address, a proxy server port number, a SMTP server address, and a SMTP server port number. The communication set part 510 may further include boxes for entering a POP server address and a POP server port.

The destination address part 520 allows the user to set address information (first address information) of a destination to which the communication device 10 accesses to obtain information indicating the allocated relay device 30, before starting communication with the management device 40. The allocated relay device 30 is communicable with the communication device 10 using the protocol and the data format that are selected using the protocol selection part 501 and the data format selection part 502. The destination address part 520 is set based on notification received from an administrator of the communication system. Alternatively, when registering the communication control program to the communication protocol library 101 or the description or interpretation control program to the data format library 102, the communication device 10 may automatically set the destination address information that corresponds to a specific communication protocol, based on data obtainable from the program.

As described above referring to FIG. 1, the first address information is set so for each one of different communication methods, such as different communication protocols, which are available to the communication device 10. More specifically, in FIG. 6, the destination address part 520 includes text boxes 521 and 522, which allow the user to respectively set address information corresponding to the protocols A, B, etc. In addition to the address information, any other authentication information that may be required to access the destination such as an ID, a password, or a digital certificate may be set.

In this example, it is assumed that each relay device 30 is capable of communicating based on one specific communication protocol in various data formats. In case the relay device 30 is capable of communicating based on a specific combination of protocol and data format, the address information is set for a specific combination of protocol and data format.

The settings of the address information for the destination address part 520 may be previously determined by a services provider of the management device 40 based on a structure of the relay device 30. The settings information previously determined may be included in the control program, which is to be installed onto the communication device 10 to start communication with the management device 40, such as the SDK application.

The communication test execute key 531, when selected, executes a communication test based on the settings that are entered through the setting screen 500. Based on a test result, the user may determine whether to use the settings that are currently selected. The register key 532, when selected, accepts a user instruction for registering the settings that are entered through the setting screen 500. More specifically, the communication device 10 registers the settings information regarding the settings that are entered through the setting screen 500, in a nonvolatile memory such as the memory 12. Further, the communication device 10 may interpret the instruction for registering as an instruction for selecting or changing a communication method to be used for communication with the relay device 30.

Figure 7:
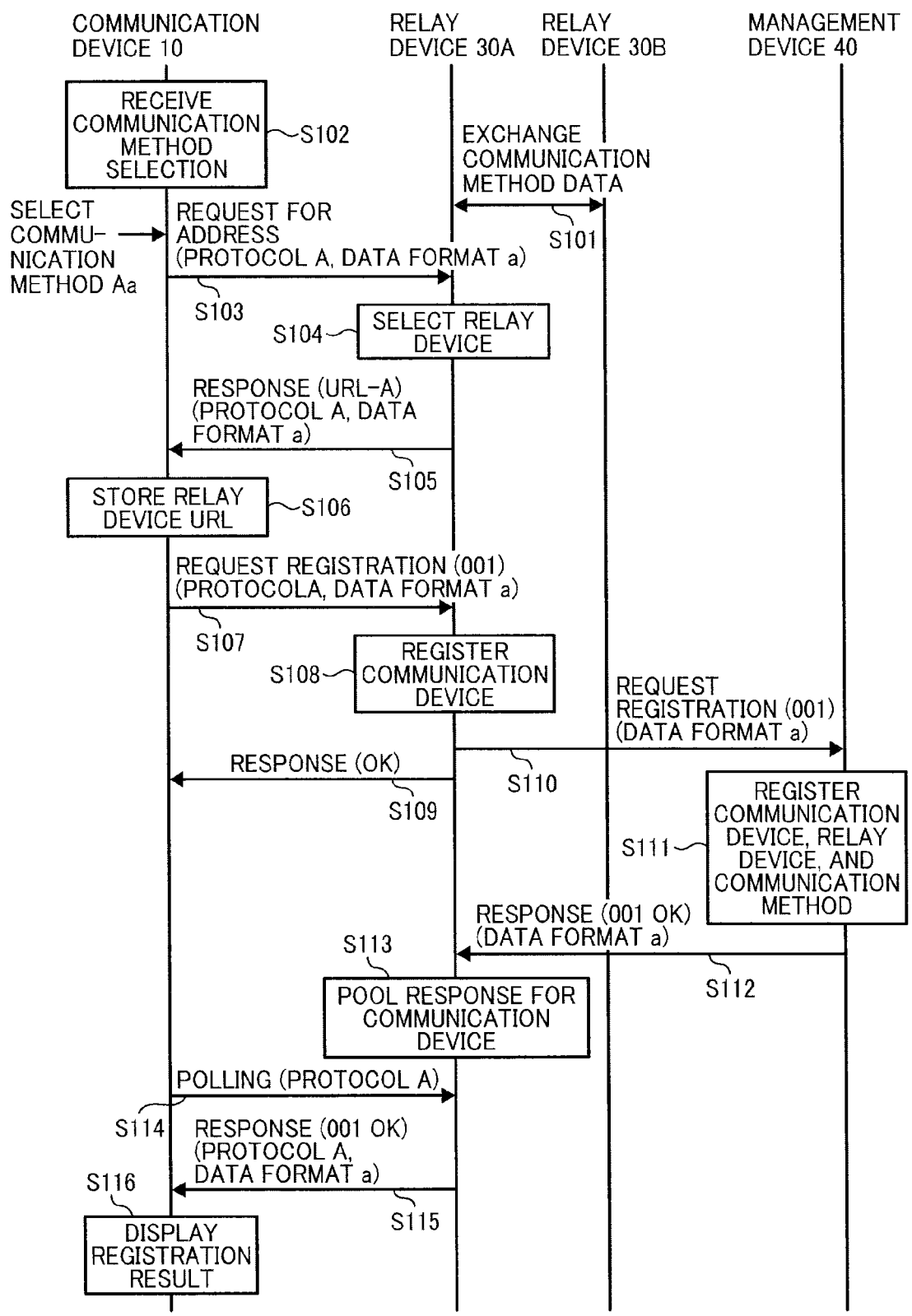
FIG. 7 is a data sequence diagram illustrating operation of assigning a relay device to the communication device, which is not assigned with a relay device, to start communication with the management device, performed by the communication system of FIG. 1, according to an example embodiment of the present invention.

Referring now to FIG. 7, operation of assigning a relay device 30 to a communication device 10 when the remote management SDK application 105 is installed or newly executed onto the communication device 10, is explained according to an example embodiment of the present invention. While FIG. 7 shows only one communication device 10, allocation of the relay device 30 is performed for each one of the communication devices 10 to be remotely managed by the center communication device 40. Further, in this example, it is assumed that the relay devices 30A and 30B are managed as a candidate relay device to be assigned to the communication device 10. For the descriptive purposes, the relay devices 30A and 30B are assumed to be provided at the services provider site, which could be any virtual site that can be managed by the services provider. The physical location of each of the relay devices 30A and 30B is not fixed such that any one of the relay devices 30A and 30B may be provided within or outside the country.

At S101, the relay devices 30A and 30B of the relay system M exchange information regarding a communication method that is available. In this example, it is assumed that the relay device 30A is capable of communicating using a protocol A in a plurality of data formats, and the relay device 30B is capable of communicating using a protocol B in a plurality of data formats.

At S102, the communication device 10 receives an instruction for setting a communication method. More specifically, as described above, the communication device 10 may display the setting screen 500 of FIG. 6 to allow the user to enter various parameters. In this example, it is assumed that the user selects a protocol "A" and a data format "a" as a communication method, which may be referred to as the communication method "Aa".

At S103, the communication device 10 sends a request for assigning a relay device written in the data format "a" using the protocol "A" ("request for address"), to the relay device 30A based on the first address information that corresponds to the communication method "Aa".

When the request for assigning a relay device is received, at S104, the relay device 30A specifies the communication method of the received request, and selects a relay device 30 that is compatible with the specified communication method as a relay device that relays communications between the communication device 10 and the management device 40. In this example, since the relay device 30A is capable of communicating using the communication method "Aa", the relay device 30A selects the relay device 30A. Alternatively, the request for assigning may include information regarding the communication method "Aa" to be referred to by the relay device 30A. The relay device 30A may store allocation information indicating the association between the communication device 10 and the relay device 30A in a memory.

At S105, the relay device 30A sends the address information of the relay device 30 that is assigned to the communication device 10 at S104. In FIG. 7, it is assumed that the relay device 30A having the "URL-A" URL address is assigned. At S105, the relay device 30A sends the URL address "URL-A" of the relay device 30A to the communication device 10, using the communication method "Aa".

S101, S104, and S105 are performed by the allocator 31A of the relay device 30A. The other steps of FIG. 7 performed by the relay device 30A should correspond to the relay 32A of the relay device 30A.

When the response with the address information of the relay device 30A is received, at S106, the communication device 10 stores the received address information ("URL-A") of the relay device 30A in a memory such as the memory 12, as second address information to be used for accessing the relay device 30 to communicate with the management device 40.

At S107, the communication device 10 accesses the relay device 30A using the address information of the relay device 30A read out from the memory, and sends a request for registering the communication device 10 to be remotely managed by the management device 40 based on the protocol "A" in the data format "a". In this example, the communication device 10 and the relay device 30A communicate with each other using the communication method "Aa".

When the relay device 30A receives the request for registration from the communication device 10, the relay device 30A may determine whether the communication device 10 is an authenticated device that is allowed to be managed by the management device 40. When it is determined that the communication device 10 is the authenticated device, at S108, the relay device 30A registers the communication device 10 as a device subjected for relaying processing. At S109, the relay device 30A sends a response indicating that the request for registration is successfully received, to the communication device 10.

At S110, the relay device 30A sends notification indicating that the communication device 10 is newly registered to be managed by the relay device 30A, to the management device 40. More specifically, with the request, the relay device 30A sends identification information "001" of the communication device 10 to notify that relaying of communications for the communication device 10 is started. In this example, it is assumed that the relay device 30A communicates with the management device 40 using the communication method "Aa", which is the same as the communication method used for communication between the relay device 30A and the communication device 10. For this reasons, data format conversion is not necessary. Further, the communication method used for communication between the relay device 30A and the management device 40 is the same as the communication method used for communication between the relay device 30B and the management device 40.

When the notification indicating start of relaying communications is received, at S111, the management device 40 stores the communication device 10 and the relay device 30A in association with each other. The management device 40 further stores information indicating the communication method "Aa", which is notified from the relay device 30A, in association with information indicating the communication device 10 and the relay device 30A.

At S112, the management device 40 sends a result of registering the communication device 10 to the relay device 30A, as a response to be transmitted to the communication device 10.

At S113, the relay device 30A temporarily pools the response received from the management device 40.

When the communication device 10 performs polling at S114, at S115, the relay device 30A transfers the response that is pooled to the communication device 10 in response to the request for registration. At the time of polling, the communication device 10 transmits a packet containing no data to the relay device 30A.

At S116, the communication device 10, which receives the result of registering the communication device 10, causes a display, such as the display 14, to display that the registration process is completed to the user.

As described above, the relay device 30 provided with the allocator 31 is able to assign the most desirable relay device 30 to the communication device 10 when the communication device 10 accesses the communication system. Through the relay device 30, the communication device 10 is able to communicate with the management device 40 to be remotely managed by the management device 40. More specifically, the allocator 31 of the relay device 30 assigns the relay device 30 capable of communicating using the communication method used by the communication device 10 such that communication between the communication device 10 and the relay device 30 is performed using the communication method as requested by the user.

The most desirable relay device 30 can be easily assigned with the communication device 10 even when the communication method available to the communication device 10 is limited due to hardware resources of the communication device 10 or a policy at the user environments. Accordingly, communication can be carried out more smoothly. Any one of the above-described steps may be performed in an order different from the order described above.

Figure 8:
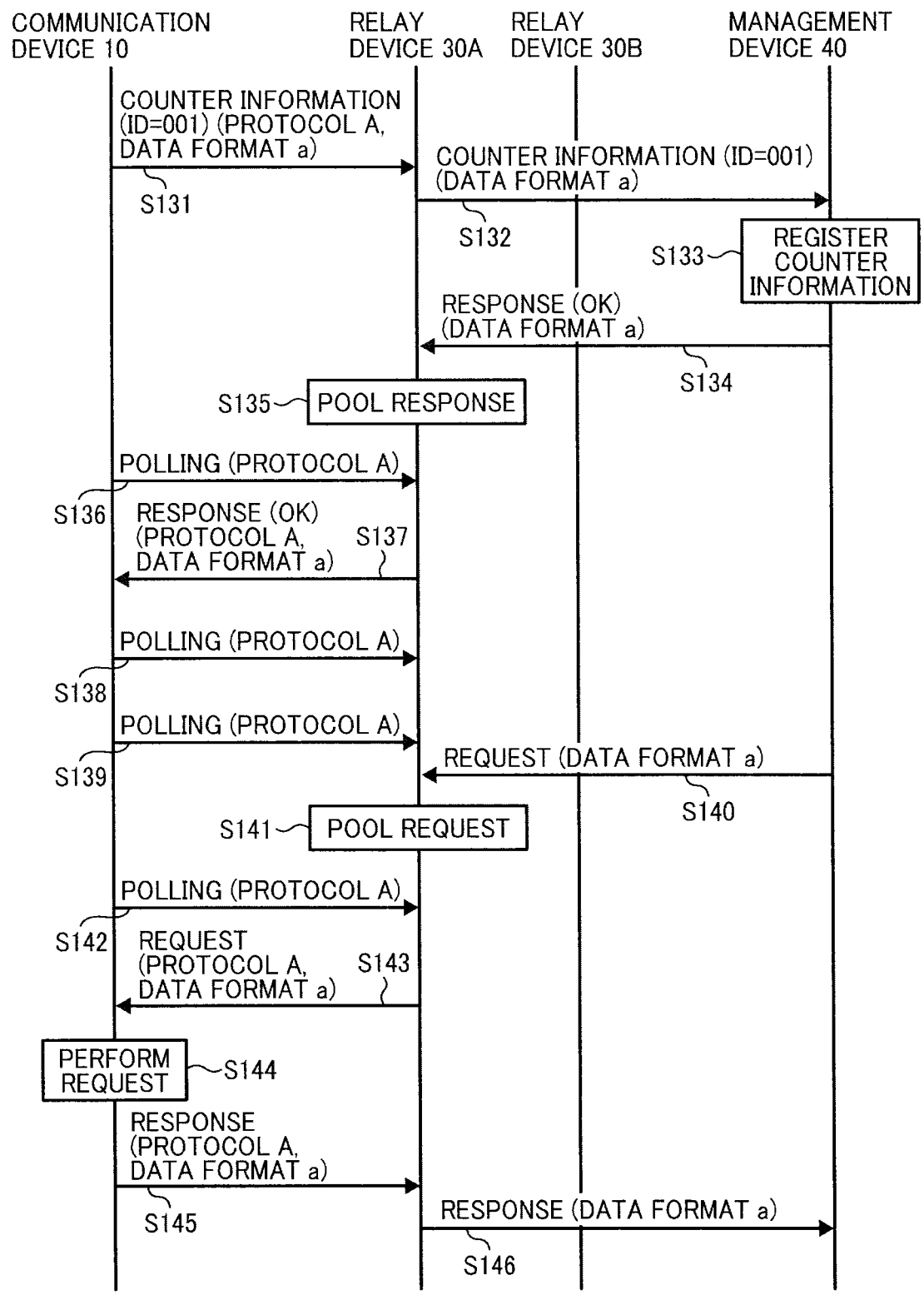
FIG. 8 is a data sequence diagram illustrating operation of communicating between the communication device and the management device via the relay device assigned through operation of FIG. 7, performed by the communication system of FIG. 1, according to an example embodiment of the present invention.

Referring now to FIG. 8, operation of communicating between the communication device 10 and the management device 40 via the relay device 30 selected through operation of FIG. 7, performed by the communication system of FIG. 1, is explained according to an example embodiment of the present invention. The operation of FIG. 8 may be performed when the communication device 10 determines to send counter information or when the management device 40 determines to send a request for obtaining information. As illustrated in FIG. 8, the communication device 10 and the relay device 30A communicate with each other using the communication method "Aa".

At S131, the communication device 10 collects counter values of various devices in the communication device 10 to generate counter information, and sends the counter information addressed to the management device 40 to the relay device 30A, using the address information stored in the memory at S106 of FIG. 7. With the counter information, the communication device 10 sends identification information of the communication device 10, such as the ID "001", in the form of a request. At S132, the relay device 30A sends the request including the counter information and the ID that are received from the communication device 10 to the management device 40.

At S133, the management device 40 registers the counter information of the communication device 10 as information regarding the communication device 10. When this registration of the counter information is successfully completed, at S134, the management device 40 sends a response indicating that registration of counter information is completed to the relay device 30A, in response to the request including the counter information.

In case there is a delay in processing the request at the management device 40, the communication device 10 may no longer be assigned to the relay device 30A since the allocation of the relay device 30 may change over time. In view of this, at S133, the management device 40 may search for the relay device 30 that is currently associated with the communication device 10 using the ID of the communication device 10 to identify the relay device 10 to which the response is to be transmitted.

When the response is received at the relay device 30A, at S135, the relay device 30A pools the response. When the communication device 10 performs polling at S136, at S137, the relay device 30A obtains the response addressed to the communication device 10 and sends the response to the communication device 10.

As described above referring to FIG. 8, the communication device 10 is able to send the counter information to the management device 40 through the relay device 30A, which is assigned by the allocator 31 of the relay device 30.

Further, the management device 40 may request the communication device 10 to send information as described below referring to S140 to S146. At S140, the management device 40 generates a request for information, which is addressed to the communication device 10, and sends the request to the relay device 30A that is associated with the communication device 10 using the allocation information registered at S111 (FIG. 7).

At S141, the relay device 30A pools the request addressed to the communication device 10. When there is access by the communication device 10 at S142, at S143, the relay device 30A transfers the request that is pooled to the communication device 10. In this example, the communication device 10 periodically polls irrespective of whether data is transmitted from the management device 40 to the relay device 30A for the communication device 10, at S138 and S139. In case there is no data pooled for the communication device 10, the relay device 30A returns a packet containing no data to the communication device 10.

At S144, the communication device 10, which receives the request at S143, performs processing according to the request to obtain information requested by the management device 40. At S145, the communication device 10 sends the obtained information as a response to the request, to the relay device 30A. At S146, the relay device 30A transfers the response received from the communication device 10 to the management device 40.

Figure 9:
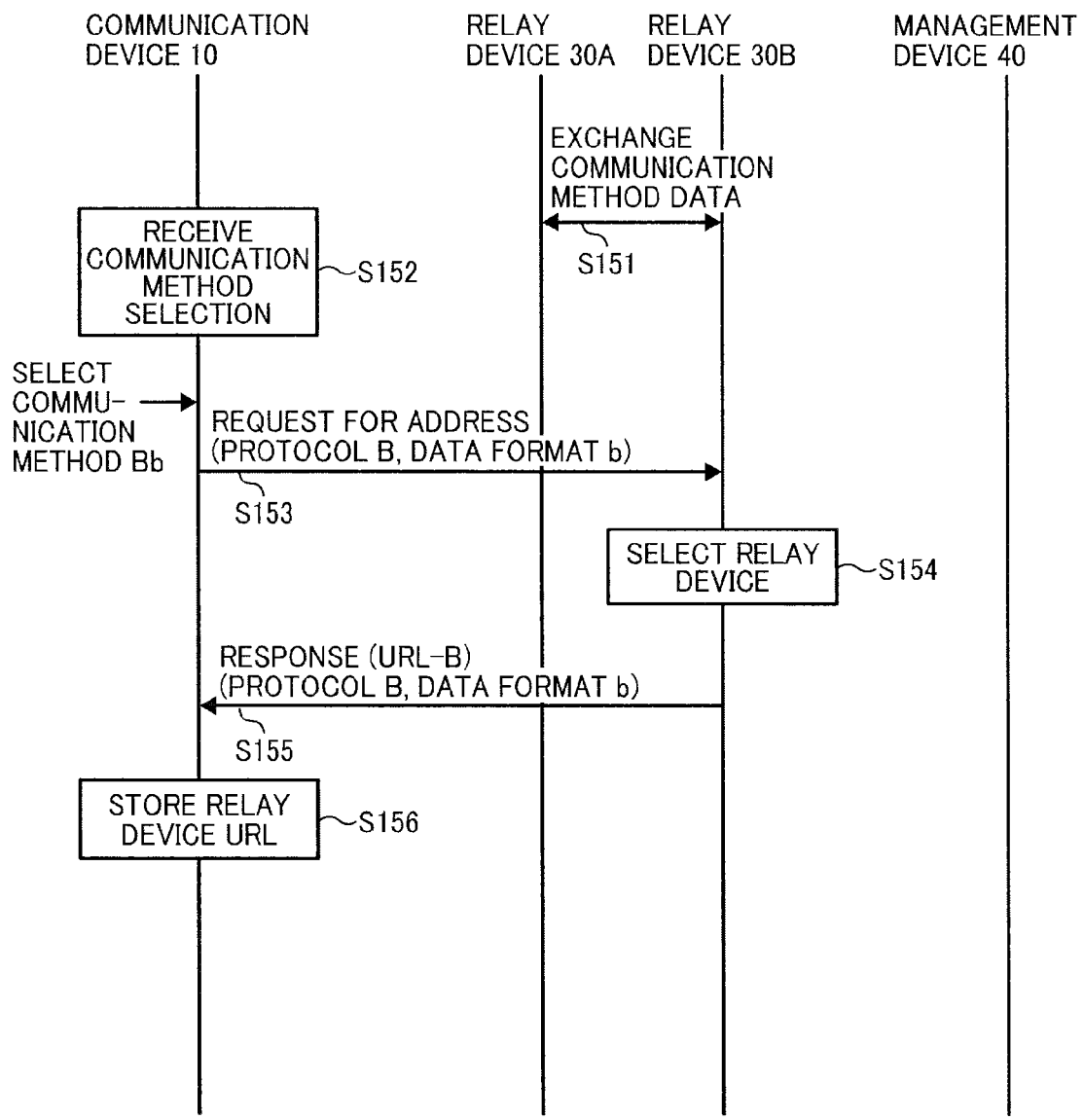
FIGS. 9 and 10 are a data sequence diagram illustrating operation of assigning a relay device to the communication device, which is not assigned with a relay device, to start communication with the management device, performed by the communication system of FIG. 1, according to an example embodiment of the present invention.
Figure 10:
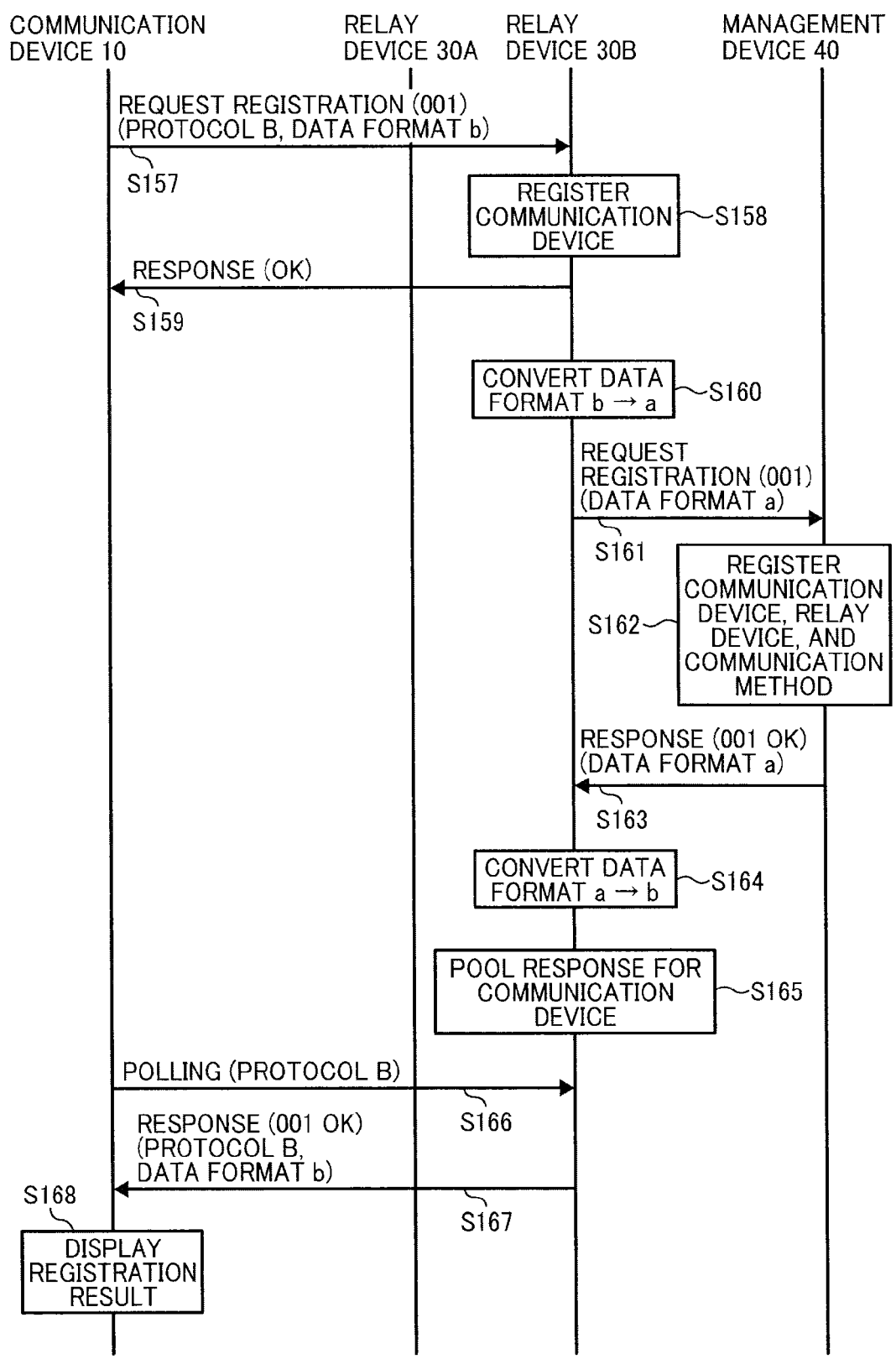

Referring now to FIGS. 9 and 10, operation of assigning a relay device 30 to a communication device 10, performed by the communication system of FIG. 1, is explained according to an example embodiment of the present invention. In this example, it is assumed that the communication device 10 selects to use the communication method "Bb".

At S151, the relay devices 30A and 30B of the relay system M exchange information regarding a communication method that is available. At S152, the communication device 10 receives an instruction for setting a communication method, through the setting screen 500. In this example, it is assumed that the user selects a protocol "B" and a data format "b" as a communication method, which may be referred to as the communication method "Bb".

At S153, the communication device 10 sends a request for assigning a relay device written in the data format "b" using the protocol "B" to the relay device 30B, based on the first address information that corresponds to the communication method "Bb".

When the request for assigning a relay device is received, at S154, the relay device 30B specifies the communication method of the received request, and selects a relay device 30 that is compatible with the specified communication method as a relay device that relays communications between the communication device 10 and the management device 40. In this example, since the relay device 30B is capable of communicating using the communication method "Bb", the relay device 30B selects the relay device 30B. The relay device 30B may store allocation information indicating the association between the communication device 10 and the relay device 30B.

At S155, the relay device 30B sends the address information of the relay device 30B that is assigned to the communication device 10 at S154. The relay device 30B sends the URL address "URL-B" of the relay device 30B to the communication device 10, using the communication method "Bb".

S151, S154, and S155 are performed by the allocator 31B of the relay device 30A. The other steps of FIGS. 9 and 10 performed by the relay device 30B should correspond to the relay 32B of the relay device 30B.

At S156, the communication device 10 stores the received address information ("URL-B") of the relay device 30B in a memory such as the memory 12, as second address information to be used for accessing the relay device 30 to communicate with the management device 40.

The operation then proceeds to FIG. 10. At S157, the communication device 10 accesses the relay device 30B using the address information of the relay device 30B read out from the memory, and sends a request for registering the communication device 10 to be remotely managed by the management device 40 based on the protocol "B" in the data format "b". In this example, the communication device 10 and the relay device 30B communicate with each other using the communication method "Bb".

When the relay device 30B receives the request for registration from the communication device 10, the relay device 30B may determine whether the communication device 10 is an authenticated device that is allowed to be managed by the management device 40. When it is determined that the communication device 10 is the authenticated device, at S158, the relay device 30B registers the communication device 10 as a device subjected for relaying processing. At S159, the relay device 30B sends a response indicating that the request for registration is successfully received, to the communication device 10.

At S161, the relay device 30B sends notification indicating that the communication device 10 is newly registered to be managed by the relay device 30B, to the management device 40. More specifically, with the request, the relay device 30B sends identification information "001" of the communication device 10 to notify that relaying of communications for the communication device 10 is started. In this example, it is assumed that the relay device 30B communicates with the management device 40 using the communication method "Aa", which is the same as the communication method used for communication between the relay device 30A and the management device 40. For this reasons, the data format "b" used for communication between the relay device 30B and the communication device 10 needs to be converted to the data format "a" used for communication between the relay device 30B and the management device 40. Before sending data, at S160, the relay device 30B converts the data from the data format "b" to the data format "a". At S161, the relay device 30B sends the converted data having the data format "a" to the management device 40 using the communication protocol "A".

When the notification indicating start of relaying communications is received, at S162, the management device 40 stores the communication device 10 and the relay device 30B in association with each other. The management device 40 further stores information indicating the communication method "Bb", which is notified from the relay device 30B, in association with information indicating the communication device 10 and the relay device 30B.

At S163, the management device 40 sends a result of registering the communication device 10 to the relay device 30B, as a response to be transmitted to the communication device 10.

At S165, the relay device 30B temporarily pools the response received from the management device 40. Since data format conversion is needed to send data to the communication device 10, at S164, the relay device 30B converts data from the data format "a" to the data format "b".

When the communication device 10 performs polling at S166, at S167, the relay device 30B transfers the response that is pooled to the communication device 10 in response to the request for registration. At S168, the communication device 10, which receives the result of registering the communication device 10, causes a display, such as the display 14, to display that the registration process is completed to the user.

As described above, the relay device 30 provided with the allocator 31 is able to assign the most desirable relay device 30 to the communication device 10 when the communication device 10 accesses the communication system. Through the relay device 30, the communication device 10 is able to communicate with the management device 40 to be remotely managed by the management device 40. Further, when the communication method used for communication between the relay device 30 and the communication device 10 is different from the communication method used for communication between the relay device 30 and the management device 40, the relay device 30 converts a data format of data before sending to the management device 40 or the communication device 10. This allows the communication device 10 to freely set a communication method even when the management device 40 requires the relay device 30 to use a specific communication method.

Figure 11:
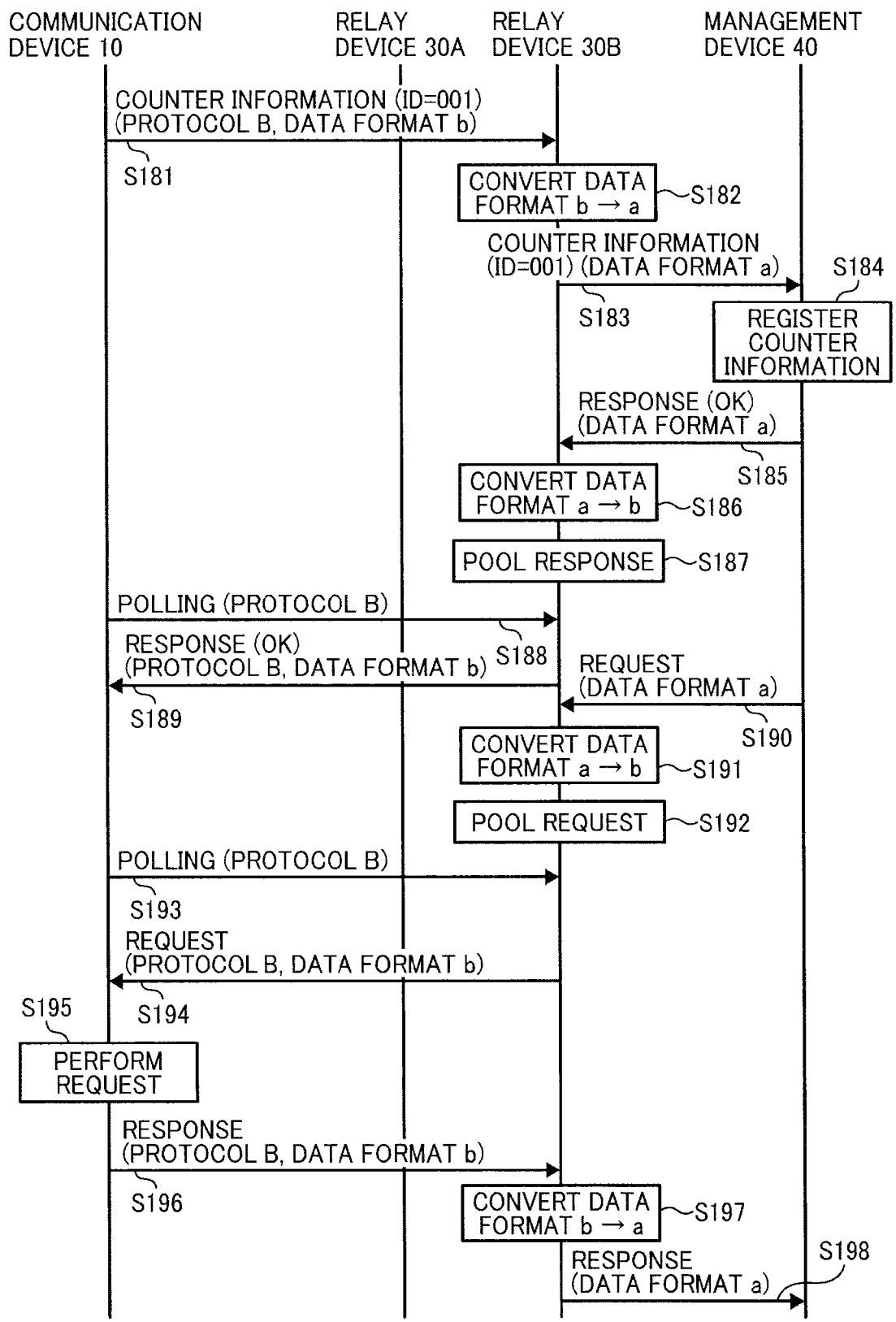
FIG. 11 is a data sequence diagram illustrating operation of communicating between the communication device and the management device via the relay device assigned through operation of FIGS. 9 and 10, performed by the communication system of FIG. 1, according to an example embodiment of the present invention.

Referring now to FIG. 11, operation of communicating between the communication device 10 and the management device 40 via the relay device 30 selected through operation of FIGS. 9 and 10, performed by the communication system of FIG. 1, is explained according to an example embodiment of the present invention. The operation of FIG. 11 may be performed when the communication device 10 determines to send counter information or when the management device 40 determines to send a request for obtaining information. In this example, the communication device 10 and the relay device 30B communicate with each other using the communication method "Bb".

S181 to S189 of FIG. 11 are performed in a substantially similar manner as described above referring to S131 to S137 of FIG. 8. S190 to S198 of FIG. 11 are performed in a substantially similar manner as described above referring to S140 to S146 of FIG. 8. The differences with respect to operation of FIG. 8 include: the relay device 30B relays communications between the communication device 10 and the management system 40; the communication method "Bb" is used for communications between the communication device 10 and the relay device 30B; and the relay device 30B converts a data format of data before sending the data to the management device 40 or the communication device 10 (S182, S186, S191, and S197).

Figure 12:
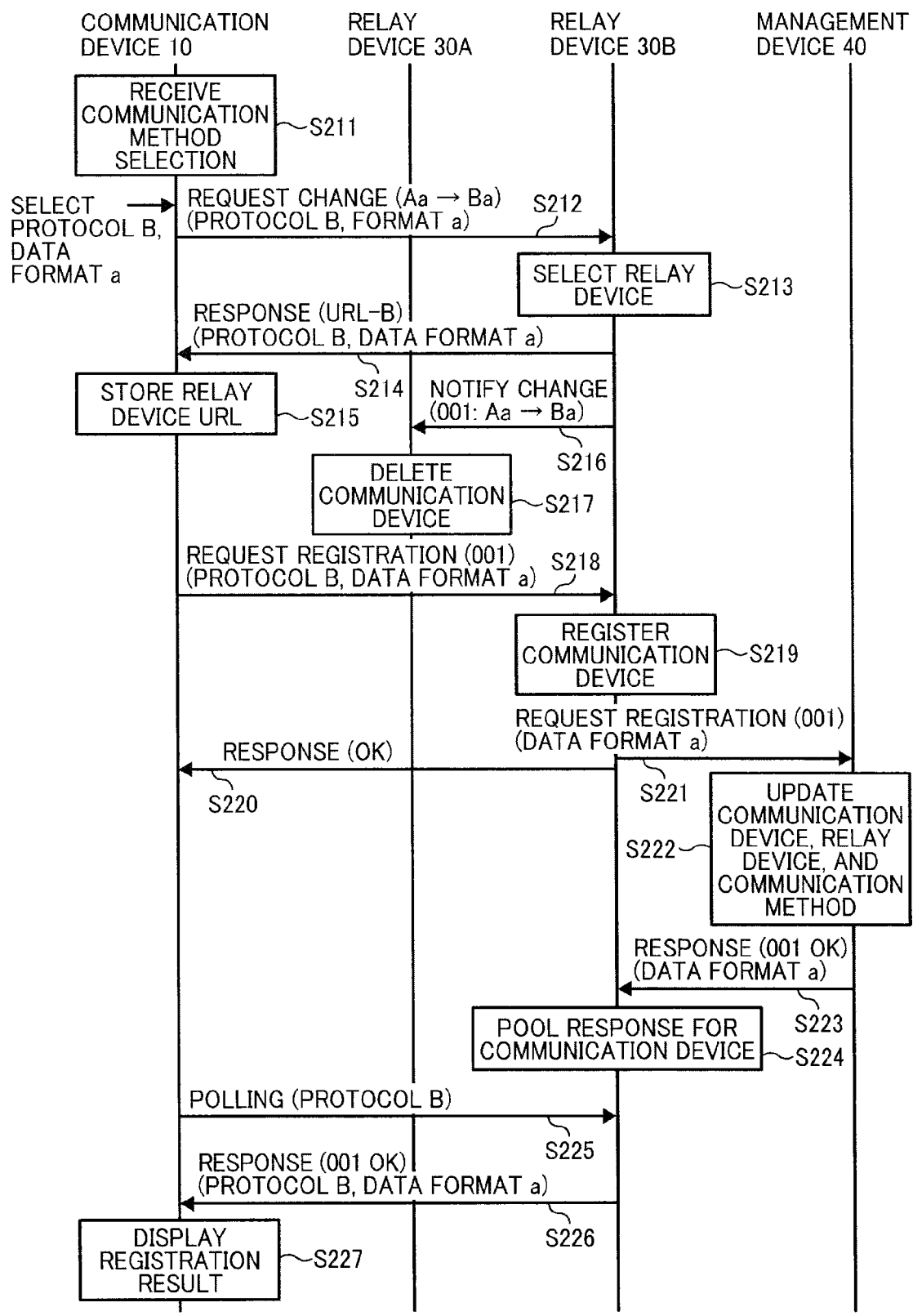
FIG. 12 is a data sequence diagram illustrating operation of changing the allocation of a relay device to the communication device that is assigned with the relay device, performed by the communication system of FIG. 1, according to an example embodiment of the present invention.

Referring now to FIG. 12, operation of changing the allocation of the relay device 30 to the communication device 10, performed by the communication system of FIG. 1, is explained according to an example embodiment of the present invention. In this example, it is assumed that the communication device 10 has been allocated with the relay device 30A based on selection of the communication method "Aa" as described above referring to FIG. 7.

At S211, the communication device 10 receives an instruction for setting a communication method, for example, through the setting screen 500 of FIG. 6. In this example illustrated in FIG. 12, the communication device 10 receives a user instruction for setting the communication method "Ba".

At S212, the communication device 10 sends a request for changing the communication method "Aa" to the communication method "Ba". The request for changing is written in the data format "a" using the protocol "B", which is transmitted to the relay device 30B using the first address information that corresponds to the communication method Ba. In this example, the address information is stored for each of the protocols A and B such that the address information of the relay device 30B is selected even though the data format "a" is selected. The request for changing includes information indicating the communication method "Aa" that is previously selected and the communication method "Ba" that is currently selected. The information indicating the communication method "Ba" may not be included in contents of the request, as the request is transmitted using the communication method "Ba".

When the request for changing is received, at S213, the relay device 30B selects a relay device 30 that is compatible with the communication method obtained from the request, as a relay device that relays communications between the communication device 10 and the management device 40. In this example, since the relay device 30B is capable of communicating using the communication method "Ba", the relay device 30B selects the relay device 30B.

At S214, the relay device 30B sends the address information of the relay device 30 that is assigned to the communication device 10 at S213. In FIG. 12, it is assumed that the relay device 30B having the "URL-B" URL address is assigned. The relay device 30B sends the URL address "URL-B" of the relay device 30B to the communication device 10, using the communication method "Ba".

When the response with the address information of the relay device 30B is received, at S215, the communication device 10 stores the received address information ("URL-B") of the relay device 30B in a memory such as the memory 12, as second address information to be used for accessing the relay device 30 to communicate with the management device 40. In this example, the second address information indicating the relay device 30A is updated with the second address information indicating the relay device 30B.

At S216, the relay device 30B sends notification indicating that the communication device 10 is no longer allocated to the relay device 30A, to the relay device 30A. More specifically, the relay device 30B sends notification indicating that the communication method has changed, to the allocator 31 of the relay device 30 that is assigned with the communication device 10 based on the previously selected communication method. The notification includes the identification information "001" of the communication device 10 that changes the communication method. The notification may further include information indicating the previously selected communication method "Aa" and the currently selected communication method "Ba".

S213, S214, and S216 are performed by the allocator 31B of the relay device 30B. The other steps of FIG. 12 are performed by the relay 32B of the relay device 30B.

When the notification is received, at S217, the allocator 31A of the relay device 30A specifies the relay device 30A that is assigned with the communication device 10 using the allocation information indicating the association between the communication device 10 and the relay device 30, and requests the relay device 30A that is assigned with the communication device 10 to delete the communication device 10 from a list of devices that are managed by the relay device 30A in relaying communications. In response to this request, the relay 32A of the relay device 30A deletes information indicating the communication device 10. The allocator 31A of the relay device 30A also deletes information indicating the allocation of the relay device 30A with the communication device 10.

More specifically, S217 is performed by the allocator 31A and the relay 32A in cooperation with each other. When the relay 32B of the relay device 30B previously has information indicating a specific relay 32 that is allocated to the communication device 10, the relay 32B of the relay device 30B may send notification indicating the communication method change to the relay 32A of the relay device 30A. The relay 32A of the relay device 30A, which receives the notification, transfers the notification to the allocator 31A to request for updating the allocation information based on the notification.

S218 to S227 are performed in a substantially similar manner as described above referring to S157 to S168 of FIGS. 9 and 10. At S218, the communication device 10 accesses the relay device 30B using the second address information of the relay device 30B to send a registration request addressed to the management device 40 to the relay device 30B. At S219, the relay device 30B registers the communication device 10 as a device to be managed. Since the relay device 30B uses the data format "a" for the communication with the communication device 10, which is the same as the data format "a" used for the communication with the management device 40, data format conversion is not necessary. At S221, the relay device 30B sends a registration request in the data format "a" according to the protocol "A" to the management device 40. At S222, the management device 40 updates the allocation information so as to change the relay device 30 assigned with the communication device 10 from the relay device 30A to the relay device 30B.

As described above, the communication device 10 may accept a user instruction for changing the communication method at any desired time, and change the allocation of the relay device 30 such that the relay device 30 compatible with the currently selected communication method is allocated to the communication device 10. Accordingly, the communication device 10 may freely select the communication method, for example, according to the user preference, and dynamically changes the allocation of the relay device 30 while keeping communications between the communication device 10 and the management device 40. This allows the communication system of FIG. 1 to operate more smoothly.

Figure 13:
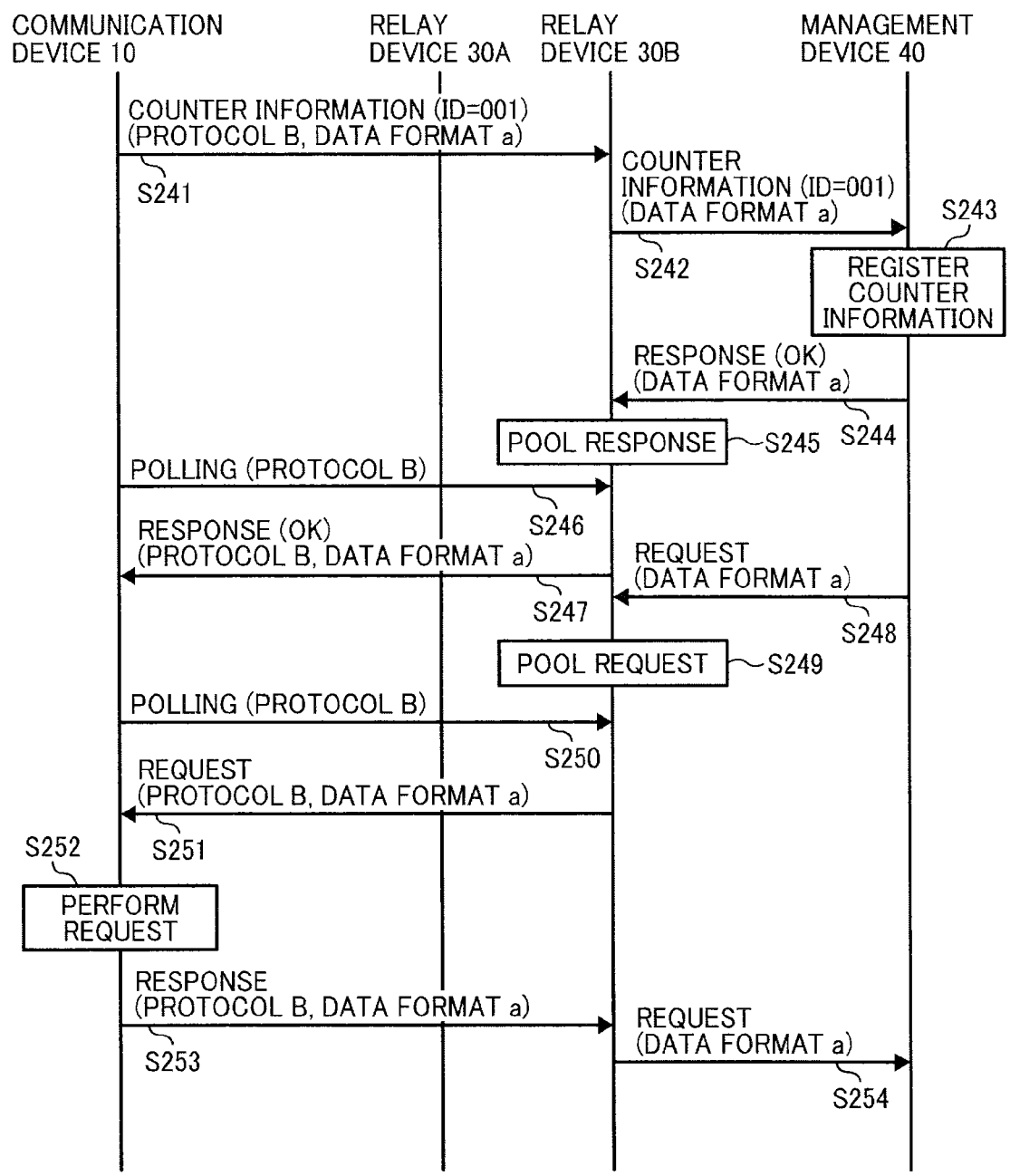
FIG. 13 is a data sequence diagram illustrating operation of communicating between the communication device and the management device via the relay device assigned through operation of FIG. 12, performed by the communication system of FIG. 1, according to an example embodiment of the present invention.

Referring now to FIG. 13, operation of communicating between the communication device 10 and the management device 40 via the relay device 30 selected through operation of FIG. 12, performed by the communication system of FIG. 1, is explained according to an example embodiment of the present invention. The operation of FIG. 13 may be performed when the communication device 10 determines to send counter information or when the management device 40 determines to send a request for obtaining information. Further, the communication device 10 and the relay device 10B communicate with each other using the communication method "Ba".

S241 to S247 of FIG. 13 are performed in a substantially similar manner as described above referring to S131 to S137 of FIG. 8. S248 to S254 of FIG. 13 are performed in a substantially similar manner as described above referring to S140 to S146 of FIG. 8. The differences with respect to operation of FIG. 8 include: the relay device 30B relays communications between the communication device 10 and the management system 40; and the communication method "Ba" is used for communications between the communication device 10 and the relay device 30B. In this example, data format conversion is not necessary as the data format "a" is commonly used by the communication device 10 and the management device 40.

Figure 14:
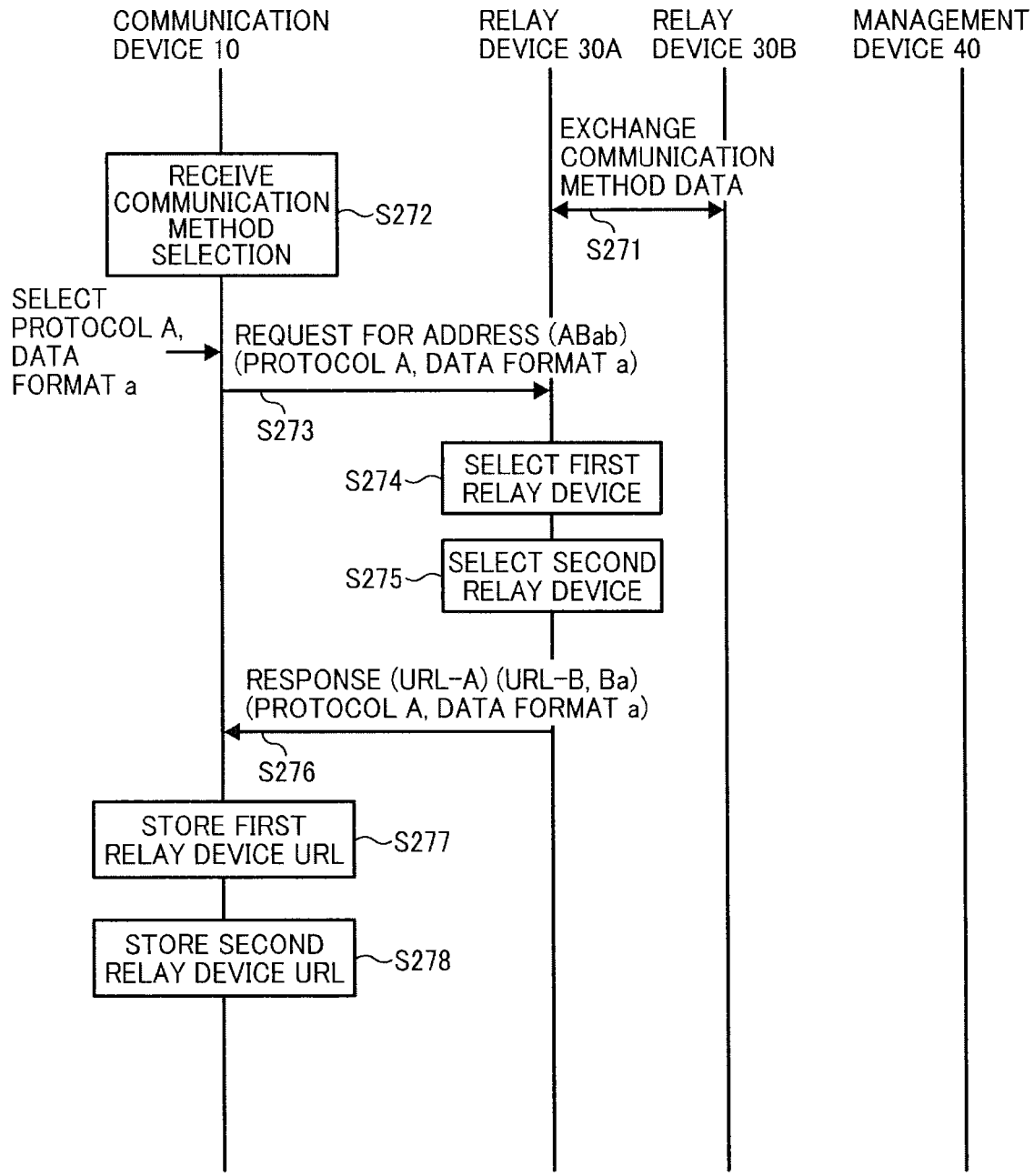
FIG. 14 is a data sequence diagram illustrating operation of assigning at least two relay devices to the communication device, which is not assigned with a relay device, to start communication with the management device, performed by the communication system of FIG. 1, according to an example embodiment of the present invention.

Referring now to FIG. 14, operation of assigning a relay device 30 to a communication device 10 when the relay device 30 is not assigned, is explained according to an example embodiment of the present invention. In this example, at least one relay device 30 is selected, which may be replaced with the relay device that is selected based on the communication method.

At S271, the relay devices 30A and 30B of the relay system M exchange information regarding a communication method that is available. At S272, the communication device 10 receives an instruction for setting a communication method through the settings screen 500 of FIG. 6. In this example, it is assumed that the communication method "Aa" is selected.

At S273, the communication device 10 sends a request for assigning a relay device written in the data format "a" using the protocol "A" to the relay device 30A, based on the first address information that corresponds to the communication method "Aa". The request further includes information indicating the other communication method that is compatible with the communication device 10. In this example, the request indicates that the communication device 10 is capable of communicating using any combination including one of the protocol "A" or the protocol "B" and one of the data format "a" or the data format "b", based on information obtainable from the communication protocol library 101 and the data format library 102.

When the request for assigning a relay device is received, at S274, the relay device 30A selects the relay device 30 that is compatible with the communication method selected by the communication device 10 as a relay device 30 to be assigned with the communication device 10, in a substantially similar manner as described above referring to S104 of FIG. 7. In this example, the relay device 30A selects the relay device 30A, which is capable of communicating using the communication method "Aa". At S275, the relay device 30A further selects at least one relay device 30 other than the relay device 30A, using the information indicating the communication method that is available to the communication device 10. The relay device 30 other than the relay device 30A is used as a replacement relay device 30, which may be replaced with the relay device 30A in case the relay device 30A becomes unavailable for use.

For example, an error may be detected due to a trouble in the relay device 30A. In such case, the relay device 30 capable of communicating using the currently selected communication method "Aa" may be preferably selected as a replacement relay device 30. In such case, the change in communication method is not necessary.

However, if the detected error relates to the communication method such as the communication protocol currently used, selecting the relay device 30 that uses the same communication method is not preferable. For example, the user environments may block the currently selected protocol or the user environments may have a trouble accepting the currently selected protocol. In such case, the communication method, especially, the communication protocol, needs to be changed. In view of this, at S275, the relay device 30B capable of communicating using the communication method "Ba" is selected as a replacement relay device. More specifically, the relay device 30A selects the replacement relay device based on the information regarding the communication method that is obtained from the relay device 30B at S271. Further, while the relay device 30B is compatible with the communication method "Bb", the communication method "Ba" is used as the data format "a" is the same as the data format "a" of the currently selected communication method "Aa".

At S276, the relay device 30A sends a response to the communication device 10 in response to the request received at A273. More specifically, the response includes the address information for accessing the relay device 30A selected at S274, the address information for accessing the replacement relay device 30B selected at S275, and the communication method to be used for communicating with the replacement relay device 30B. In FIG. 14, the response includes the address information "URL-A" of the relay device 30A, the address information "URL-B" of the replacement relay device 30B, and the communication method "Ba" of the replacement relay device 30B. The request, which is written in the data format "a", is transmitted using the protocol "A".

S271, S274, S275, and S276 are performed by the allocator 31A of the relay device 30A. The other steps of FIG. 14 are performed by the relay 32A of the relay device 30A.

When the response with the address information is received at S276, at S277, the communication device 10 stores the received address information ("URL-A") of the relay device 30A in a memory such as the memory 12, as second address information to be used for accessing the relay device 30 to communicate with the management device 40. At S278, the communication device 10 further stores the address information ("URL-B") of the replacement relay device 10B in the memory, as third address information to be used for accessing the replacement relay device 30B in case there is a communication failure. The communication method "Ba" is stored in association with the third address information.

Although the further steps are omitted from FIG. 14, the operation of FIG. 14 further performs S107 to S116 of FIG. 7 to register the communication device 10 as a device subjected for management by the relay device 30A and the management device 40. After registration of the communication device 10 is completed, the operation may further proceed to operation of FIG. 8 to start communication between the communication device 10 and the management device 10 via the selected relay device 30A.

Figure 15:
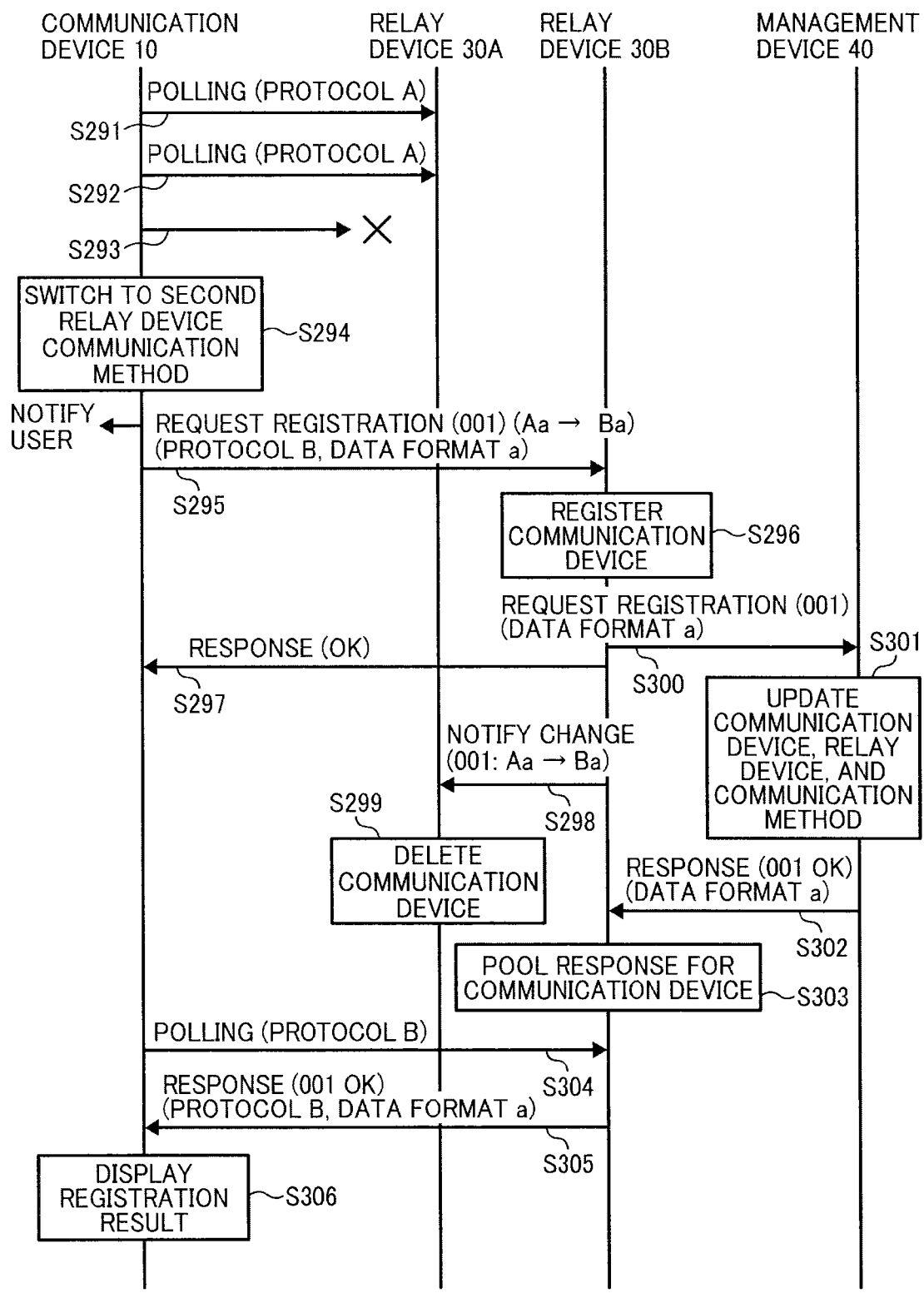
FIG. 15 is a data sequence diagram illustrating operation of changing the allocation of the relay device, which is selected through operation of FIG. 14, performed by the communication system of FIG. 1, according to an example embodiment of the present invention.

Referring now to FIG. 15, operation of changing the allocation of the relay device due to a communication failure, performed by the communication system of FIG. 1, is explained according to an example embodiment of the present invention. In this example, it is assumed that an error is detected while the communication device 10 communicates with the management device 40 via the relay device 30A that is selected through operation of FIG. 14.

At S291 and S292, the communication device 10 periodically performs polling with respect to the relay device 30A. When polling is not successful at S293, the communication device 10 determines that there is a communication failure in communicating with the relay device 30A.

At S294, the communication device 10 automatically changes the communication method "Aa" to the communication method "Ba" of the replacement relay device 30B, based on information stored at S278 of FIG. 14. The communication device 10 may cause the display 140 to display a pop-up window indicating that the communication method is changed. In this example, it is assumed that the user has permitted the communication system to automatically change the communication method, by selecting the automatic switch set part 503 of the setting screen 500 to have the valid value "Y". When the value "N" is selected for the automatic switch set part 503, S294 is not performed but an error screen may be displayed.

At S295, the communication device 10 sends a request for registering the communication device 10 to the replacement relay device 30B, using the third address information stored in the memory at S278 of FIG. 14. The registration request is sent in the data format "a" using the protocol "B". The communication device 10 further sends a request for changing the communication method "Aa" to the communication method "Ba" in a substantially similar manner as described above referring to S212 of FIG. 12.

Since selection of the relay device 30 is not necessary, at S295, the communication device 10 may access the relay 32B of the relay device 30B to request for registration of the communication device 10 as a device to be managed.

S296 to S306 are performed in a substantially similar manner as described above referring to S158 to S168 of FIG. 10. At S296, the relay 32B of the relay device 30B registers the communication device 30 as a device to be managed in a substantially similar manner as described above referring to S219 of FIG. 12. At S300, the relay device 30B sends a registration request in the data format "a" according to the protocol "A" to the management device 40. At S301, the management device 40 updates the allocation information so as to change the relay device 30 assigned with the communication device 10 from the relay device 30A to the relay device 30B.

At S298, the relay device 30B sends notification indicating that the communication device 10 is no longer allocated to the allocator 31A of the relay device 30A, in a substantially similar manner as described above referring to S216 of FIG. 12. More specifically, the notification includes the identification information "001" of the communication device 10 that changes the communication method, and information indicating the previously selected communication method "Aa" and the currently selected communication method "Ba".

When the notification is received, at S299, the relay device 30A deletes the communication device 10 from a list of devices that are managed by the relay device 30A, in a substantially similar manner as described above referring to S217 of FIG. 12.

Depending on the error detected at S293, the communication device 10 may not be able to send the request to the relay device 30B. In such case, the communication device 10 may change the communication method "Ba" back to the previously selected communication method "Aa" to try polling again. In case there is more than one replacement relay device 30 that is selected through operation of FIG. 14, the communication device 10 may try to access the other replacement relay device 30.

Further, depending on the error detected at S293, S298 and S299 may not be performed. In such case, the relay device 30B performs S298 at later time to notify the relay device 30A of the change in communication method.

As described above, the replacement relay device 30 and the communication method to be used for the replacement relay device 30 are previously selected. In case there is a failure in communicating with the currently selected relay device 30, the communication device 10 is able to access the replacement relay device 30 to request for relaying of data to the management device 40. Accordingly, operation of the communication system is stabilized.

As described above, the user may set the automatic switch set part 503 to have the value "N" to not allow the communication device 10 to automatically change the communication method. In such case, the user, which is notified by the error screen of a communication failure, may again select the communication method.

Referring back to FIG. 14, at S275, the relay device 30A may only select the communication method to be used, without selecting the replacement relay device 30. In such case, after changing the communication method "Aa" to the communication method "Ba" at S294 of FIG. 15, the communication device 10 refers to the first address information that corresponds to the communication method "Ba", and accesses the relay device 30B using the obtained first address information to request for allocation in a substantially similar manner as described above referring to S212 of FIG. 12. After the relay device 30 is allocated at S213, the operation further proceeds to S214 to perform operation of FIG. 12.

Even though the relay device 30 may be replaced with the replacement relay device 30 due to a communication failure, such communication failure may be solved after a certain time period elapses. In view of this, the communication device 10 may try to communicate with the relay device 30, which is previously selected, using the previously selected communication method every time a predetermined time period elapses. When communication is successful, the communication device 10 may change the communication method back to the previously selected communication method such that the previously selected relay device 30 is again used to relay communications for the communication device 10. This allows the communication device 10 to communicate using the communication method that is set according to the user preference.

Alternatively, the communication device 10 may switch back to the previously selected communication method when the communication receives notification from the previously selected relay device 30 that an error is corrected.

Figure 16:
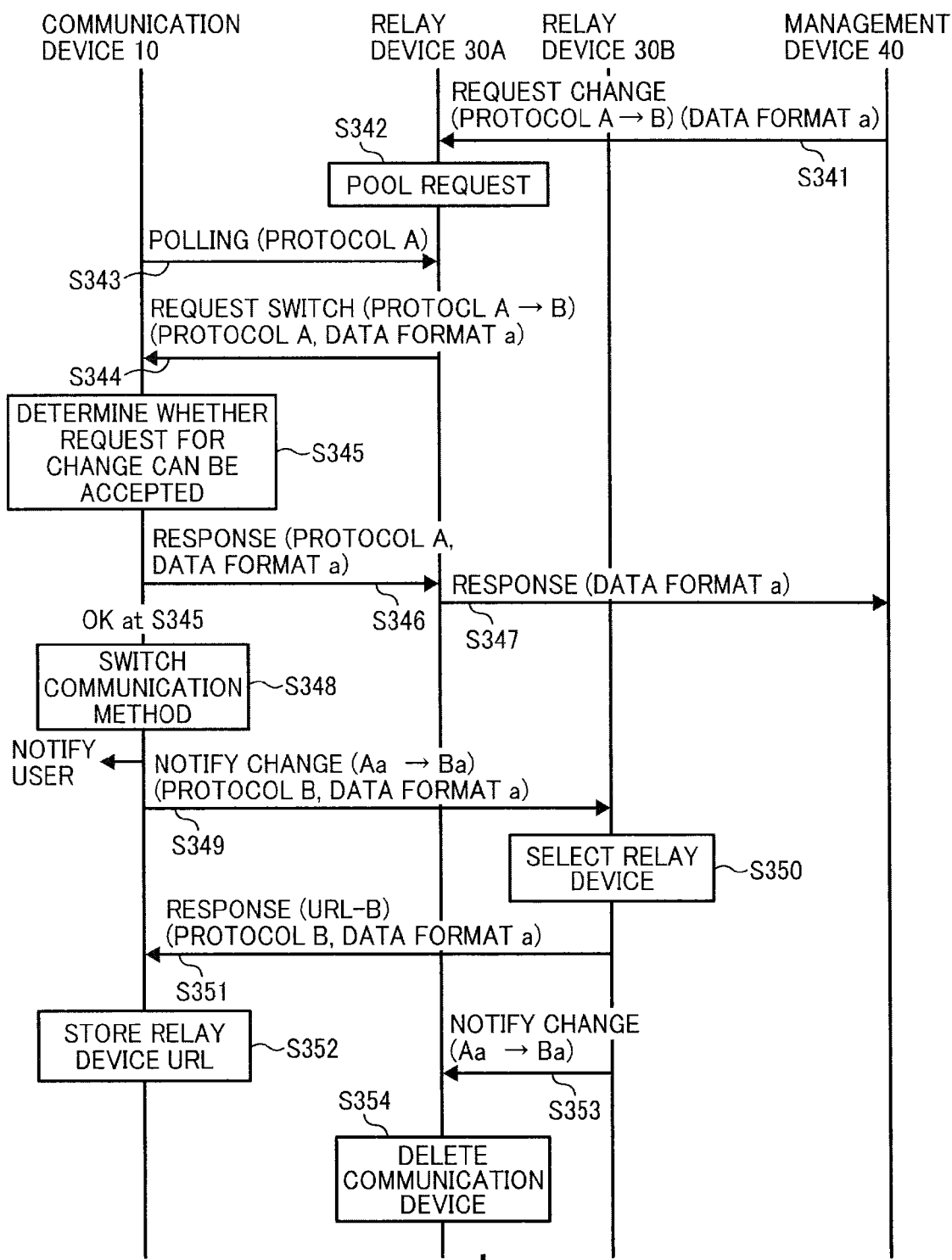
FIG. 16 is a data sequence diagram illustrating operation of changing the allocation of the relay device, which is selected through operation of FIG. 14, performed by the communication system of FIG. 1, according to an example embodiment of the present invention.

Referring now to FIG. 16, operation of changing the allocation of the relay device due to a request from the management device 40, performed by the communication system of FIG. 1, is explained according to an example embodiment of the present invention. In this example, it is assumed that the management device 40 requests changing of the communication method while the communication device 10 communicates with the management device 40 via the relay device 30A that is selected through operation of FIG. 14. For example, when the relay device 30 that communicates based on a specific communication method has high processing loads, the management device 40 may request the communication device 10 to change the communication method so as to reduce the processing load on the relay device 30. In another example, when the relay device 30 that communicates based on a specific communication method is removed from the provider site, the management device 40 may request the communication device 10 to change the communication method.

At S341, the management device 40 generates a request for changing the communication method that is addressed to the communication device 10, and sends the request to the relay device 30A that relays communications with the communication device 10.

At S342, the relay device 30A pools the request. At S343 and S344, the relay device 30A sends the request to the communication device 10 in response to polling by the communication device 10.

In this example, the request for changing the communication method includes information indicating that the protocol is changed from "A" to "B", and the data format "a" remains the same. The management device 40 has obtained and stored information regarding the communication method used by the communication device 10 at S111 of FIG. 7.

When the request for changing is received, at S345, the communication device 10 determines whether the communication method can be changed, based on the value of automatic switch set part 50 of the setting screen 500 and information regarding the communication method that is available. At S346, the communication device 10 transmits a determination result to the relay device 30A as a response addressed to the management device 40. At S347, the relay device 30A transfers the response including the determination result to the management device 40.

When the determination result at S345 is "NO", that is, the communication method cannot be changed, the operation ends. In such case, the response indicating that the communication method is not changed is sent to the management device 40 through the relay device 30A. When the determination result at S345 is "YES", that is, the communication method can be changed, the operation proceeds to S348 to change the communication method to the communication method requested by the management device 40. At S348, the communication device 10 may cause the display 40 to display a window indicating that the communication method is changed.

S349 to S354 are performed in a substantially similar manner as described above referring to S212 to S217 of FIG. 12. More specifically, the relay device 30B, which receives a request for changing, selects the relay device 30B that is compatible with the communication method "Ba" specified by the management device 40. The relay device 30B and the management device 40 respectively register the communication device 10 as a device to be managed. Although the further steps are omitted from FIG. 16, the operation of FIG. 16 may further perform S218 to S227 of FIG. 12.

As described above, the communication device 10 may change the communication method in response to a request for changing the previously selected communication method to the currently selected communication method at any desired time, and assigns the relay device 30 that is compatible with the currently selected communication method. Accordingly, the management device 40 is able to freely change the communication method of the communication device 10 as long as such operation is permitted, while carrying out the communications between the communication device 10 and the management device 40. This allows the communication system to operate more smoothly.

Figure 17:
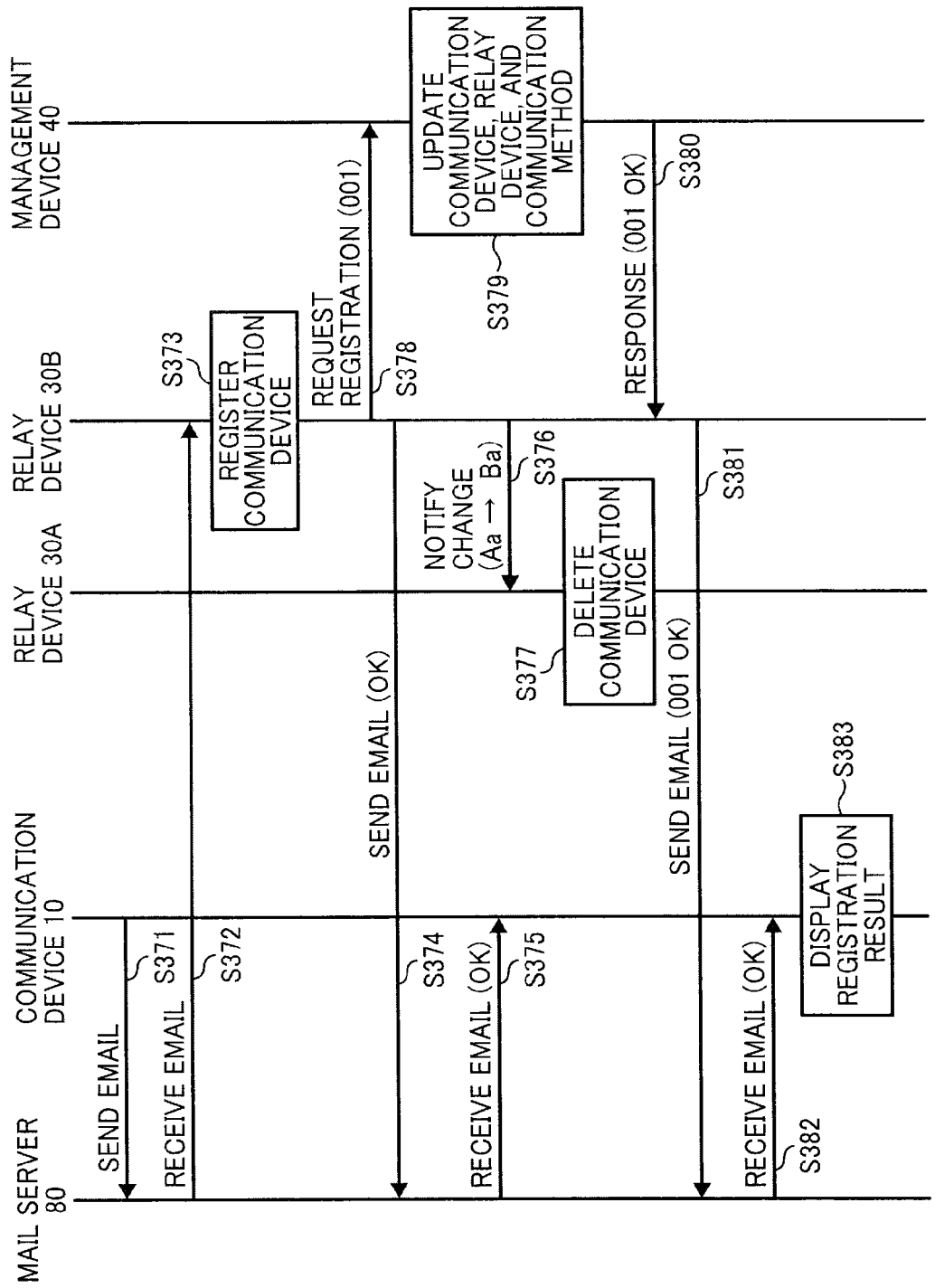
FIG. 17 is a data sequence diagram illustrating operation of changing the allocation of the relay device when an email protocol is used, performed by the communication system of FIG. 1, according to an example embodiment of the present invention.

In any one of the above-described examples, explanation of a specific communication procedure that may differ depending on a communication protocol has been omitted. Using the example case in which the email protocol is used for communication between the communication device 10 and the relay device 30, specific communication procedure is explained. FIG. 17 is a data sequence diagram illustrating operation of changing the allocation of the relay device, when the communication device 10 communicates using the email protocol.

S371 to S383 of FIG. 17 correspond to S295 to S306 of FIG. 15, when the email protocol is used for communication between the communication device 10 and the relay device 30. In case the email protocol is used, an email server 80 processes email data to be transmitted to or received from the communication device 10. When the email data is transmitted to outside the LAN A to the relay system M, a plurality of email servers may relay the email data to a destination email server in the relay system M.

When sending data from the communication device 10 to the relay device 30A, the communication device 10 transmits email data to an email address of the relay device 30A. The email data is attached with or linked to specific data to be transmitted to the management device 40 via the relay device 30A. The address information of the relay device 30A is thus the email address.

At S371, the communication device 10 transmits email data including a request for replacing the relay device and a request for changing the communication method, to the address of the relay device 30B, in a substantially similar manner as described above referring to S295 of FIG. 15. The email server 80 stores the email data.

At S372, the relay device 30B periodically accesses the email server 80 to check whether there is new email data, and obtains the email data transmitted from the communication device 10.

Since the communication method between the relay device 30 and the management device 40 is not influenced by the communication between the relay device 30 and the communication device 10, S373, and S376 to S380 are performed in a substantially similar manner as described above referring to S296 and S298 to S302 of FIG. 15.

At S374, the relay device 30B sends email data addressed to the communication device 10, which includes confirmation that the requests are received, to the email server 80. The email server 80 stores the email data. At S375, the communication device 10 periodically accesses the email server 80 to check for new email data, and obtains the email data.

When the relay device 30B receives a response that is addressed to the communication device 10 to indicate a registration result from the management device 40 at S380, at S381, the relay device 30B sends email data including the response addressed to the communication device 10 to the email server 80 without pooling.

At S382, the communication device 10, which accesses the email server 80, obtains the email data including the response. At S383, the communication device 10 causes the display 14 to display the registration result to the user.

Referring now to FIGS. 18 to 25, a device, system, method, and control program, each of which assigns a relay device to a communication device is explained according to an example embodiment of the present invention.

Figure 18:
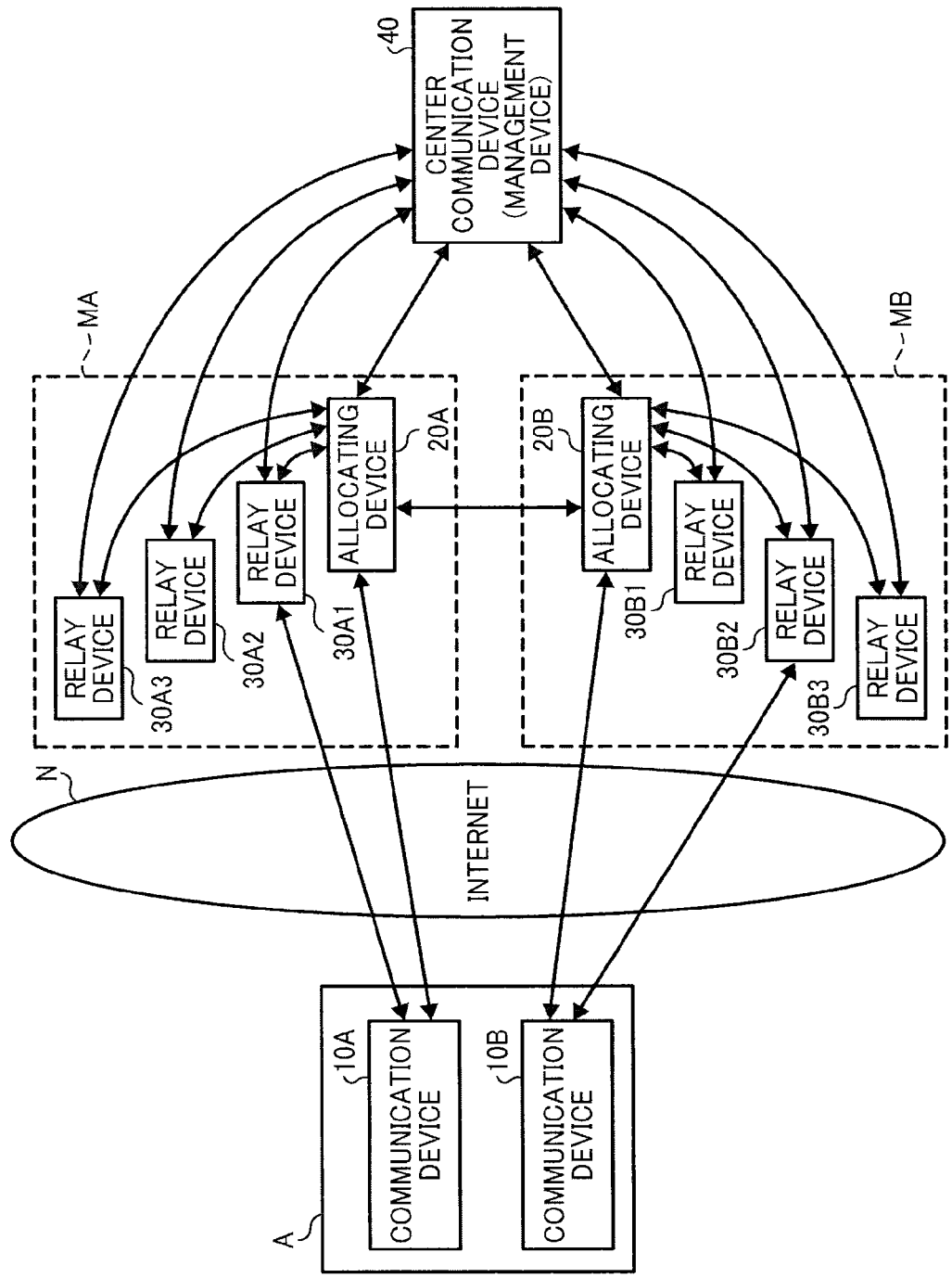
FIG. 18 is a schematic block diagram illustrating a communication system including a plurality of relay devices, a plurality of communication devices including a device functioning as a management device, and a plurality of allocating devices, according to an example embodiment of the present invention.

FIG. 18 illustrates a configuration of a communication system according to an example embodiment of the present invention. The communication system of FIG. 1 includes the communication devices 10A and 10B, the center communication device 40, and relay systems MA and MB. The relay system MA includes an allocating device 20A functioning as the allocator 31 of the relay device 30, and a plurality of relay devices 30A1 to 30A3 each functioning as the relay 32 of the relay device 30 and being compatible with the communication method based on the protocol A. The relay system MB includes an allocating device 20B functioning as the allocator 32 of the relay device 30, and a plurality of relay devices 30B1 to 30B3 each functioning as the relay 32 of the relay device 30 and being compatible with the communication method based on the protocol B. In addition to selecting the relay device 30 based on the communication method, the allocating devices 20A and 20B (collectively referred to as the allocator 20) each assigns the relay device 30 having a low processing load to the communication device 10 while balancing the processing loads on the relay devices 30. More specifically, the allocating device 20A allocates at least one of the relay devices 30A1 to 30A3 to the communication device 10 when the communication method based on the protocol A is selected, while considering the processing load on the relay device 30. The allocating device 20B allocates at least one of the relay devices 30B1 to 30B3 to the communication device 10 when the communication based on the protocol B is selected, while considering the processing load on the relay device 30.

The hardware and functional structures of the relay device 30 are substantially similar to the hardware and functional structures as described above referring to FIGS. 2 and 4, respectively. In replace of the device management and allocation module 305 of FIG. 4, the relay device 30 may be provided with a device management module that is not provided with the function of allocating. The allocating device 20, which is provided with the function of allocating, may have a hardware structure that is substantially similar to the hardware structure of FIG. 2.

In this example of FIG. 18, the allocating device 20 assigns a specific relay device 30 that is compatible with the communication method selected by the communication device 10, in a substantially similar manner as described above referring to FIGS. 1 to 17. The allocating device 20 also considers the processing load on each relay device 30 such that the processing load is evenly distributed over the system. In the following examples, it is assumed that the communication device 10 accesses the allocating device 20A to be assigned with one of the relay devices 30A1 to 30A3 each capable of communicating using the communication method based on the protocol A.

Figure 19:
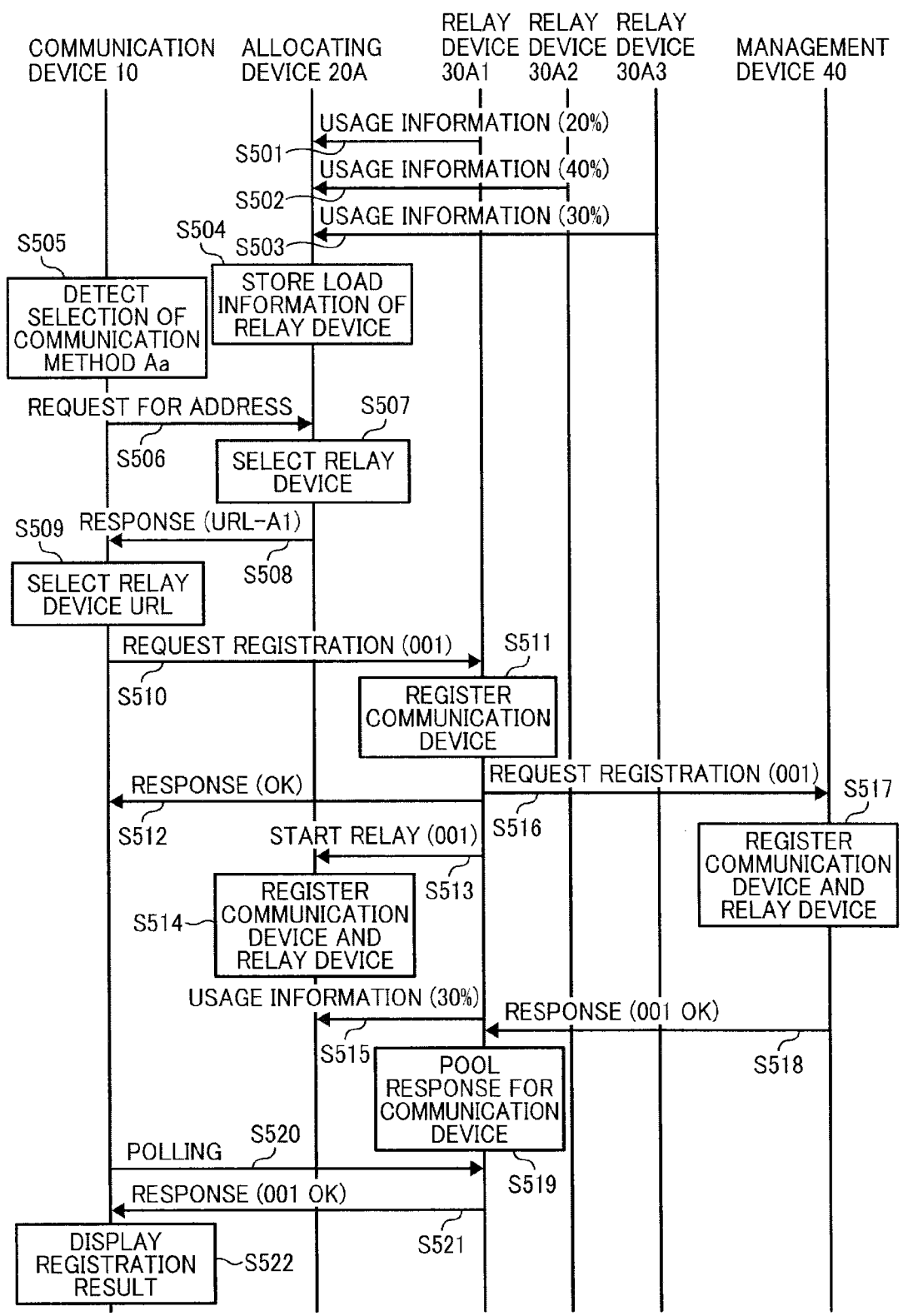
FIG. 19 is a data sequence diagram illustrating operation of assigning a relay device to the communication device, which is not assigned with a relay device, to start communication with the management device, performed by the communication system of FIG. 18, according to an example embodiment of the present invention.

Referring now to FIG. 19, operation of assigning a relay device 30 to a communication device 10 when the remote management SDK application 105 is installed or newly executed onto the communication device 10, performed by the communication system of FIG. 18, is explained according to an example embodiment of the present invention. While FIG. 19 shows only one communication device 10, allocation of the relay device 30 is performed for each one of the communication devices 10 to be remotely managed by the center communication device 40. Further, in this example, it is assumed that the relay devices 30A1 to 30A3 are managed as a candidate relay device to be assigned by the allocating device 20A to the communication device 10. For the descriptive purposes, the relay devices 30A1 to 30A3 are assumed to be provided at the services provider site, which could be any virtual site that can be managed by the services provider. The physical location of each of the relay devices 30A1 to 30A3 is not fixed such that any one of the relay devices 30A1 to 30A3 may be provided within or outside the country.

At S501 to S503, the relay devices 30A1 to 30A3 (collectively referred to as the relay device 30) each send usage information to the allocating device 20A at a predetermined time. In this example, the relay device 30 is caused to periodically send usage information including processing load information. The processing load information indicates the degree of processing load on the relay device 30 in relaying communications. The usage information may further include any information regarding the usage of the relay device 30 other than the processing load information indicating the degree of processing load.

In FIG. 19, the relay device 30A1 sends processing load information indicating that 20% of load is on the relay device 30A1 with respect to its capacity limit. The relay device 30A2 sends processing load information indicating that 40% of load is on the relay device 30A2 with respect to its capacity limit. The relay device 30A3 sends processing load information indicating that 30% of load is on the relay device 30A3 with respect to its capacity limit.

The processing load on the relay device 30 in relaying communications is obtained based on the degree of a number of communication devices 10 that is assigned to the relay device 30 with respect to its capacity in a number of communication devices 10 that can be assigned, and/or the usage rate of the CPU or memory of the relay device 30. Further, the relay device 30 may be set to send usage information periodically, for example, every one hour. Alternatively, the relay device 30 may be set to send at least processing load information, for example, when the processing load increases or decreases by more than 10% with respect the processing load that was previously sent to the allocating device 20A.

When the allocating device 20A receives the usage information from the relay devices 30A1 to 30A3, at S504, the allocating device 20A stores the processing load information in a memory, such as the memory 12, for each of the relay devices 30A1 to 30A3. S501 to S504 are performed no matter whether or not the communication device 10 accesses the allocating device 20A.

At S505, the communication device 10 receives a user instruction for selecting the communication method "Aa" through the setting screen 500. At S506, the communication device 10 sends a request for assigning a relay device written in the data format "a" using the protocol "A" to the allocating device 20A, based on the first address information that corresponds to the communication method "Aa".

When the request for assigning a relay device is received, at S507, the allocating device 20A selects a relay device 30 to be assigned to the communication device 10, based on the communication method selected by the communication device 10 and the processing load information. In this example, the allocating device 20A selects the relay device 30 that is compatible with the selected communication method and having a low processing load, as a relay device to relay communications for the communication device 10. This causes the processing load to be distributed over the relay devices 30 such that the processing load is balanced, thus suppressing downtime of the system that may be otherwise caused as the load is concentrated on a specific relay device 30. Accordingly, the communication system is able to perform operations more smoothly.

At S508, the allocating device 20A sends address information for accessing the relay device 30 selected at S507, to the communication device 10 in response to address confirmation request. In FIG. 19, the allocating device 20A sends the URL address "URL-A" of the relay device 30A1 to the communication device 10.

When the response with the address information of the relay device 30A1 is received, at S509, the communication device 10 stores the received address information ("URL-A1") of the relay device 30A1 in a memory such as the memory 12, as second address information to be used for accessing the relay device 30 to communicate with the management device 40.

At S510, the communication device 10 accesses the relay device 30A1 using the address information of the relay device 30A1 read out from the memory, and sends a request for registering the communication device 10 to be remotely managed by the management device 40 based on the protocol "A" in the data format "a". In this example, the communication device 10 and the relay device 30A1 communicate with each other using the communication method "Aa".

When the relay device 30A1 receives the request for registration from the communication device 10, the relay device 30A1 may determine whether the communication device 10 is an authenticated device that is allowed to be managed by the management device 40. When it is determined that the communication device 10 is the authenticated device, at S511, the relay device 30A1 registers the communication device 10 as a device subjected for relaying processing. At S512, the relay device 30A1 sends a response indicating that the request for registration is successfully received, to the communication device 10.

At 513, the relay device 30A1 sends notification indicating that the communication device 10 is newly registered to be managed by the relay device 30A1, to the allocating device 20A. With the request, the relay device 30A sends identification information "001" of the communication device 10 to notify that relaying of communications for the communication device 10 is started.

At S515, the relay device 30A1 further calculates the processing load on the relay device 30A1 in relaying communications, since the communication device 10 is added as a device subjected for management in relaying communications. The relay device 30A1 sends updated usage information that reflects the recalculated processing load to the allocating device 20A.

When the notification indicating start of relaying communications is received, at S514, the allocating device 20A stores the communication device 10 and the relay device 30A1 in association with each other.

At S516, the relay device 30A1 transfers the request for registration, which is received from the communication device 10, to the management device 40.

At S517, the management device 40 registers the communication device 10 as a device for remote management, and the relay device 30A1 that sends the request for registration from the communication device 10 as the relay device 30A1 that relays communications for the communication device 10, in association with each other.

At S518, the management device 40 sends a result of registering the communication device 10 to the relay device 30A1, as a response to be transmitted to the communication device 10.

At S519, the relay device 30A1 temporarily pools the response received from the management device 40.

When the communication device 10 performs polling at S520, at S521, the relay device 30A1 transfers the response that is pooled to the communication device 10 in response to the request for registration.

At S522, the communication device 10, which receives the result of registering the communication device 10, causes a display, such as the display 14, to display that the registration process is completed to the user.

As described above, the allocating device 20 is able to assign the most desirable relay device 30 to the communication device 10 when the communication device 10 accesses the communication system. Through the relay device 30, the communication device 10 is able to communicate with the management device 40 to be remotely managed by the management device 40.

More specifically, the allocating device 20 receives a user instruction for selecting a specific communication method. The allocating device 20 further receives processing load information indicating the degree of processing load on the relay device 30 in relaying communications from each one of the relay devices 30. Based on the communication method and the processing load information, the allocating device 20 selects the relay device 30 that is compatible with the communication method and is low in processing load, and assigns the selected relay device 30 to the communication device 10. This suppresses the processing load from being concentrated onto a specific relay device 30, thus suppressing downtime of the communication system. Accordingly, the communication system becomes more stabilized.

Any one of the above-described steps may be performed in an order different from the order described above. For example, S512, S513, S515, and S516 may be performed in an order different from this order.

Figure 20:
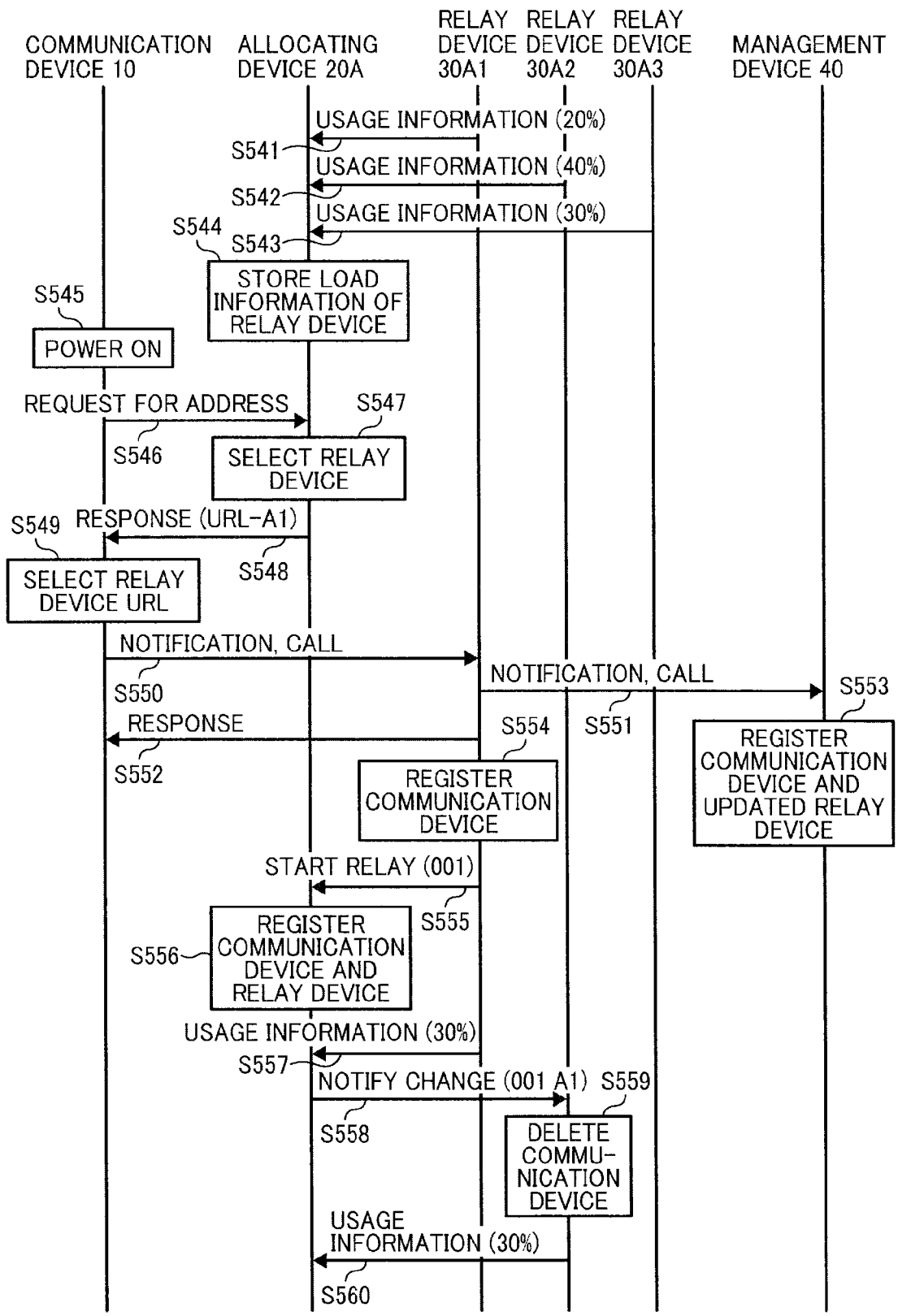
FIG. 20 is a data sequence diagram illustrating operation of changing the allocation of a relay device to the communication device that is assigned with the relay device, performed by the communication system of FIG. 18, according to an example embodiment of the present invention.

Referring now to FIG. 20, operation of changing the allocation of the relay device 30 to the communication device 10, performed by the communication system of FIG. 1, is explained according to an example embodiment of the present invention. In this example, it is assumed that the communication device 10 turns off its power, after the communication device 10 is assigned with a specific relay device 30, for example, through performing operation of FIG. 19.

At S541 to S543, the relay devices 30A1 to 30A3 each send usage information including the processing load information to the allocating device 20A at a predetermined time, in a substantially similar manner as described above referring to S501 to S503 of FIG. 19.

When the allocating device 20A receives the usage information from the relay devices 30A1 to 30A3, at S544, the allocating device 20A stores at least the received processing load information in the memory for each of the relay devices 30A1 to 30A3.

At S545, the communication device 10 turns on its power such that the remote management SDK application 105 is executed. It is assumed that the communication device 10 is previously assigned with the relay device 30A2.

At S546, the communication device 10 accesses the allocating device 20A using the address of the allocating device 20A, which is obtained at S509 of FIG. 19, to send an address confirmation request ("request for address") to the allocating device 20A.

At S547, the allocating device 20A selects one of the relay devices 30A1 to 30A3 based on the selected communication method and the processing load information that is stored at S544 to assign the selected relay device 30 to the communication device 10 that sends the request, in a substantially similar manner as described above referring to S507 of FIG. 19.

At S548, the allocating device 20A sends address information of the relay device 30 that is assigned to the communication device 10 at S547, to the communication device 10 in response to the address confirmation request. In this example, it is assumed that the relay device 30A1 is assigned to the communication device 10, which has the URL address "URL-A1". Accordingly, the allocating device 20 sends the "URL-A1" of the relay device 30A1 to the communication device 10.

At S549, the communication device 10 stores the received address information ("URL-A1") of the relay device 30A1 in the memory, as information to be used for accessing the relay device 30 to communicate with the management device 40.

More specifically, in this example, the communication device 10 stores the address information of the relay device 30A1 that is currently assigned in the memory, not matter whether the communication device 40 is previously assigned with the relay device 30B. Based on the address information stored at S549, at S550 to S552, the communication device 10 accesses the relay device 30A1 to start communication with the management device 40, in a substantially similar manner as described above referring to S131 to S137 of FIG. 8.

In prior to receiving the notification from the communication device 10 through the relay device 30A1 at S551, the management device 40 stores the communication device 10 and the relay device 30A2 in association with each other to reflect the previous allocation of the relay device 30A2 to the communication device 10. At S551, when the management device 40 receives notification from the communication device 10 through the relay device 30A1, which is different from the relay device 30A2 that is registered, the management device 10 determines that allocation of the relay device 30 to the communication device 10 has changed. To reflect the current allocation of the relay device 30, at S553, the management device 40 updates the allocation information by registering the relay device 30A1 in association with the communication device 10.

Similarly, when the notification is received from the communication device 10 at S550, at S554, the relay device 30A1 determines that the communication device 10 is assigned to the relay device 30A1 as a device to be managed in relaying communications. At S554, the relay device 30A1 registers the communication device 10 as the device to be managed by the relay device 30A1.

At S555 and S557, the relay device 30A1 sends notification indicating that the communication device 10 is newly registered to be managed by the relay device 30A1 with the updated processing load information, to the allocating device 20A, in a substantially similar manner as described above referring to S513 and S515 of FIG. 19.

When the notification indicating start of relaying communications is received at S555, at S556, the allocating device 20A stores the communication device 10 and the relay device 30A1 in association with each other.

Further, at S556, the allocating device 20A is able to know that the relay device 30A2, which is previously assigned to the communication device 10, is no longer assigned to the communication device 10 in relaying communications. At S558, the allocating device 20A sends relay device updated information to the relay device 30A2, which indicates that the relay device 30A1 is now assigned to the communication device 10. For example, the relay device updated information includes the ID "001A1" of the relay device 30A1 and the ID "001" of the communication device 10.

When the relay device updated information is received, at S559, the relay device 30A2 deletes the communication device 10 from a list of devices that are managed by the relay device 30A2 in relaying communications.

At S560, the relay device 30A2 further calculates the processing load on the relay device 30A2 in relaying communications since the communication device 10 is deleted. The relay device 30A2 sends updated usage information that reflects the recalculated processing load to the allocating device 20A. When the updated usage information is received, the allocating device 20A updates the processing load information of the relay device 30A2 based on the received information.

Through performing the operation of FIG. 20 when power of the communication device 10 is turned on, the allocating device 20A is able to assign the most desirable relay device 30 to the communication device 10, such as the relay device 30 compatible with the communication method and having a low processing load. This helps the processing load to be equally distributed over the relay devices 30, thus stabilizing the communication system.

Further, when the allocating device 20A assigns the communication device 10 with the relay device 30, which is different from the relay device 30 that is previously assigned, the allocating device 20A sends notification to the previously assigned relay device 30 to indicate that the communication device 10 is no longer assigned as a device to be managed by the previously assigned relay device. Based on this notification, the previously assigned relay device 30 is able to recalculate the processing load, and sends the recalculated processing load to the allocating device 20A.

Figure 21:
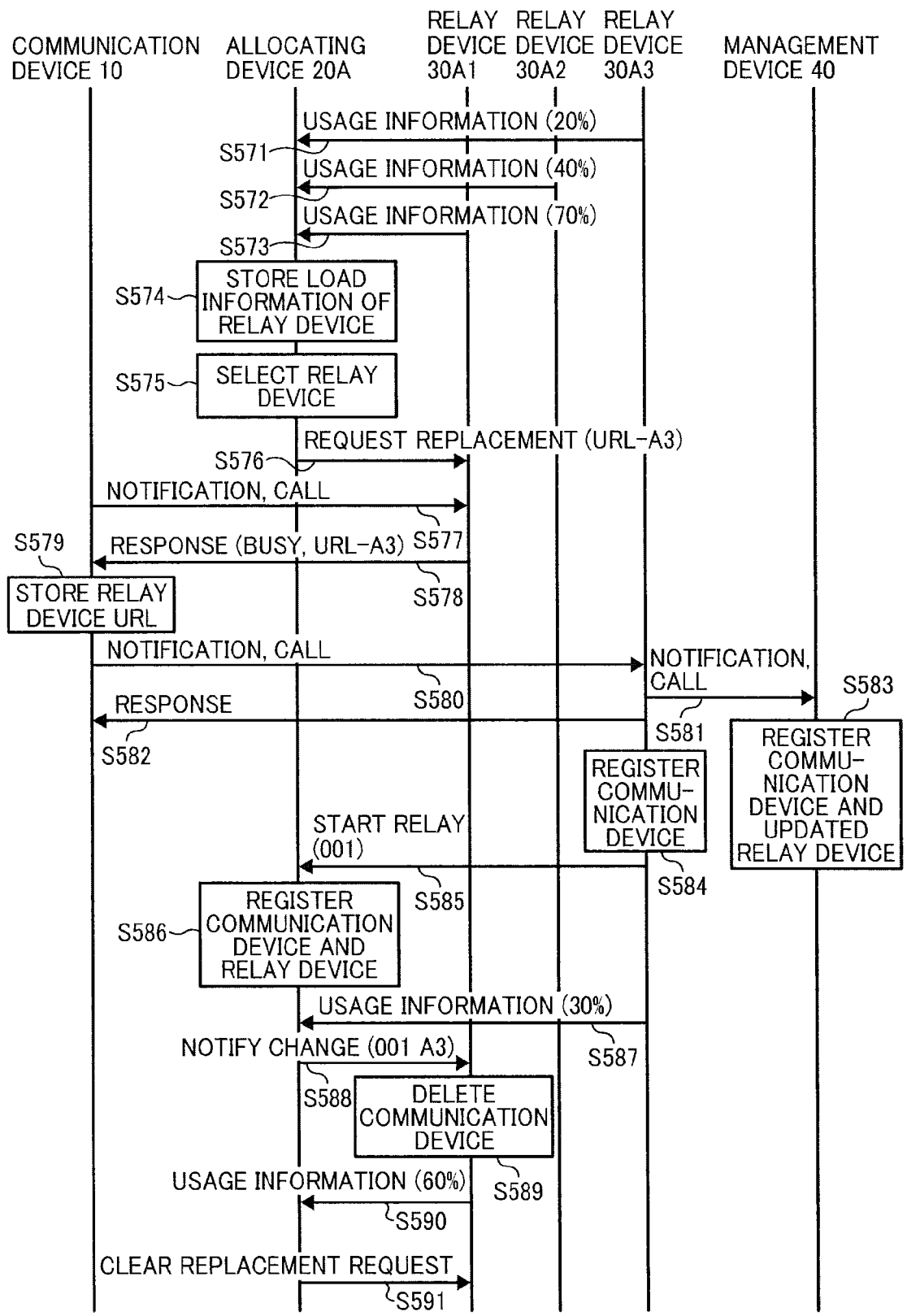
FIG. 21 is a data sequence diagram illustrating operation of changing the allocation of a relay device to the communication device that is assigned with the relay device, performed by the communication system of FIG. 18, according to an example embodiment of the present invention.

Referring now to FIG. 21, operation of changing allocation of the relay device 30 to the communication device 10, performed by the communication system of FIG. 18, is explained according to an example embodiment of the present invention. In this example, through changing the allocation, the allocating device 20 suppresses the processing load from being concentrated on a specific relay device 30, thus evenly distributing the processing load over the relay devices 30.

At S571 to S573, the relay devices 30A1 to 30A3 each send usage information including processing load information to the allocating device 20A at a predetermined time, in a substantially similar manner as described above referring to S501 to S503 of FIG. 19.

When the allocating device 20A receives the usage information from the relay devices 30A1 to 30A3, at S574, the allocating device 20A stores at least the received processing load information in the memory for each of the relay devices 30A1 to 30A3.

At S575, the allocating device 20A determines whether any one of the relay devices 30A1 to 30A3 has the processing load that has exceeded a predetermined threshold level. When it is determined that at least one of the relay devices 30A1 to 30A3 has the processing load that has exceeded the predetermined threshold level, the allocating device 20A balances the processing loads on the relay devices 30, for example, by changing the allocation of the relay device 30 to the communication device 10.

In this example, it is determined that the relay device 30A1 having the processing load of 70% exceeded the threshold level. The allocating device 20A selects one of the relay devices 30 having the processing load that is lower than the threshold level, such as the relay device 30A3 having the lowest processing load of 20%. To reduce the processing load onto the relay device 30A1, the allocating device 20A assigns the relay device 30A3 to the communication device 10, in replace of the relay device 30A1.

At S576, the allocating device 20A sends a request for replacement to the relay device 30A1 having the high processing load. The request for replacement requests the relay device 30A1 to transfer the work related to relaying communications for the communication device 10, to the relay device 30A3. The request for replacement includes address information of the relay device 30A3 to which the work is transferred, such as the URL address "URL-A3" of the relay device 30A3. The address information of the relay device 30A3 is later transmitted to the communication device 10 through the relay device 30A1 to allow the communication device 10 to access the relay device 30A3.

Assuming that the communication device 10 sends notification to the relay device 30A1 at S577, at S578, the relay device 30A1 sends a response indicating that the relay device 30A1 is not available such that the communication device 10 should access the relay device 30A3. The response includes the URL address "URL-A3" of the relay device 30A3.

When the response is received, at S579, the communication device 10 stores the address information of the newly assigned relay device 30A3, such as the URL address "URL-A3" of the relay device 30A3, in the memory.

At S580 to S582, the communication device 10 accesses the relay device 30A3 using the address information of the relay device 30A3 to start communication with the management device 40 through the relay device 30A3, in a substantially similar manner as described above referring to S550 to S552 of FIG. 20.

S583 to S587 are performed in a substantially similar manner as described above referring to S553 to S557 of FIG. 20, for example, to update the allocation information and send notification to the allocating device 20A. When the notification indicating start of relaying communications is received at S585, at S586, the allocating device 20A stores the communication device 10 and the relay device 30A3 in association with each other to update the allocation information.

Further, at S588, the allocating device 20A sends relay device updated information to the relay device 30A1, which indicates that the relay device 30A3 is now assigned to the communication device 10 in a substantially similar manner as described above referring to S558 of FIG. 20. When the relay device updated information is received, at S589, the relay device 30A1 deletes the communication device 10 from a list of devices that are managed by the relay device 30A1 in relaying communications. At S590, the relay device 30A1 further calculates the processing load on the relay device 30A1 in relaying communications, and sends updated usage information that reflects the recalculated processing load to the allocating device 20A.

Based on the updated usage information from the relay device 10A1 that includes the updated processing load information, the allocating device 20A determines whether the processing load of the relay device 30A1 is lower than a predetermined threshold level. When it is determined that the processing load is lower than the predetermined threshold level, at S591, the allocating device 20A sends a request for clearing the replacement request, which is sent at S576, to the relay device 30A1.

When the request for clearing the replacement request is received, the relay device 30A1 operates in a substantially similar manner as the relay device 30A1 used to operate before the replacement request is received. More specifically, the relay device 30A1 does not send a response indicating that the relay device 30A1 is not available, when the request for relaying is received from the communication device 10.

At S590, when it is determined that the processing load of the relay device 30A1 is equal to or higher than the predetermined threshold level, the allocating device 20A does not send the request for clearing the replacement request. In such case, the above-described operation of transferring the work to the relay device 30A3 is repeated for another communication device 10, which is registered as a device to be managed by the relay device 30A1.

Through performing the operation of FIG. 21, the allocating device 20 is able to balance the processing loads so as to evenly distribute the processing loads over the relay devices 30, thus stabilizing the communication system. More specifically, when the allocating device 20 determines that the processing load on a specific relay device 30 has exceeded a predetermined threshold level, the allocating device 20 searches for a relay device 30 that is low in processing load and is capable of communicating using the selected communication method. The allocating device 20 sends notification to the high-load relay device 30 to cause the work of the high-load relay device 30 to be transferred to the low-load relay device 30. For example, transferring of the work may be achieved by changing the allocation of the relay device 30 to the communication device 10. This causes the processing loads to be evenly distributed over the relay devices 30.

When the allocating device 20 determines that the processing load on the high-load relay device 30 is less than a predetermined threshold level, the allocating device 20 sends notification to the high-load relay device 30 to stop operation of transferring the work to another relay device 30. The communication device 10, which has not accessed the high-load relay device 30 for a time period between the time at which the request for replacement is sent and the time at which the request for cancellation of the replacement request, does not have to change the relay device 30 to be accessed. Since the operation of transferring the work from the high-load relay device 30 to the low-load relay device 30 is stopped when the processing load of the high-load relay device 30 becomes less than the predetermined threshold level, the processing loads on the relay devices 30 are kept relatively even among the relay devices 30, thus suppressing the processing loads from being uneven again due to repeatedly performing the operation of changing the allocation. In this example, a threshold level for causing the allocating device 20 to generate a request for replacement is set higher than a threshold level for causing the allocating device 20 to generate a request for clearing the replacement request. Further, any one of the threshold levels may be previously set and stored in the set parameter 308.

Figure 22A:
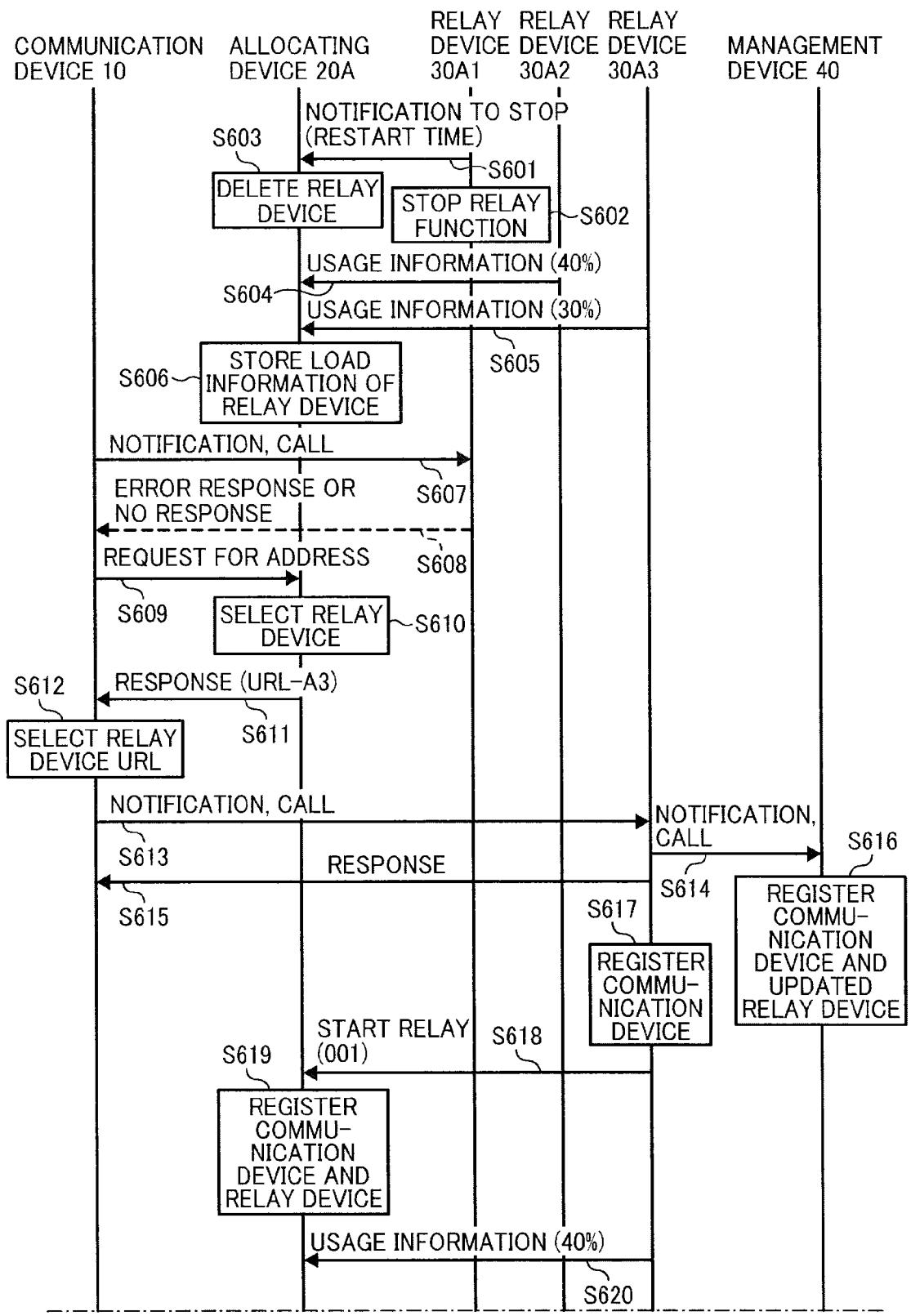
FIGS. 22A and 22B are a data sequence diagram illustrating operation of changing the allocation of a relay device to the communication device that is assigned with the relay device, performed by the communication system of FIG. 18, according to an example embodiment of the present invention.
Figure 22B:
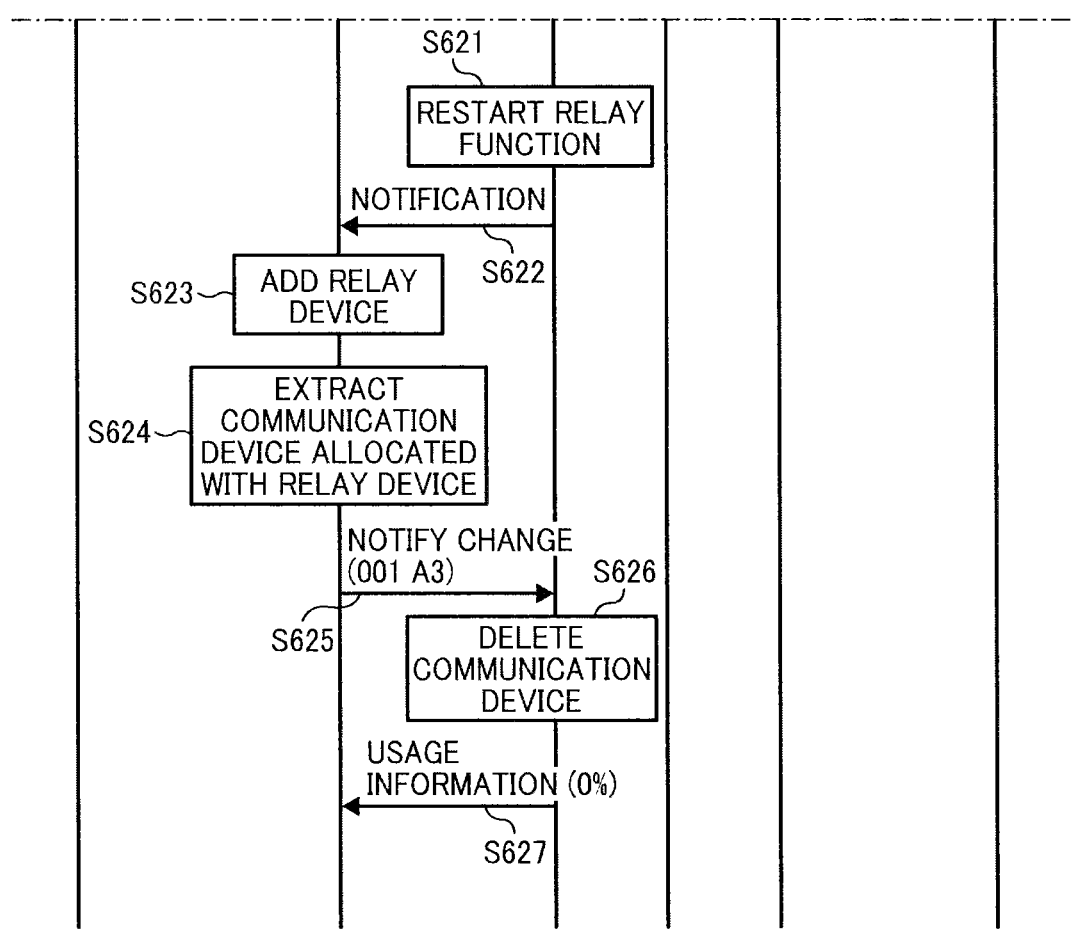

Referring now to FIG. 22, operation of changing allocation of the relay device 30 to the communication device 10, performed by the communication system of FIG. 18, is explained according to an example embodiment of the present invention. In this example, the allocating device 20 changes the allocation of the relay device 30, when a specific relay device 30 temporarily stops providing the relay function, for example, due to maintenance.

Assuming that the relay device 30A1 stops to provide the relaying function, at S601, the relay device 30A1 sends notification to the allocating device 20A, which indicates that the relay function is stopped. The notification may include information regarding a restart time at which the relay device 30A1 restarts to provide the relay function. At S602, the relay device 30A1 stops the relay function.

When the notification to stop is received, at S603, the allocating device 20A deletes the relay device 30A1 from a list of candidate relay devices 30 that can be assigned to the communication device 10 to relay communications.

In alternative to stopping the relay function, for example, due to maintenance, the relay device 30 may accidentally stop the relay function due to an error. In such case, the relay device 30 may not be able to send notification at S601. Even without notification, the allocating device 20 is caused to periodically receive information, such as usage information, from the relay devices 30. In case the allocating device 20A does not receive any information from the relay device 30 for a predetermined time period, the allocating device 20A determines that the relay function of the relay device 30 is stopped, and deletes the relay device 30 from the list of candidate relay devices 30.

At S604 to S605, the relay devices 30A2 and 30A3 each send usage information including processing load information to the allocating device 20A at a predetermined time, in a substantially similar manner as described above referring to S502 to S503 of FIG. 19.

When the allocating device 20A receives the usage information from the relay devices 30A2 and 30A3, at S606, the allocating device 20A stores at least the received processing load information in the memory for each of the relay devices 30A2 and 30A3.

Assuming that the communication device 10 is previously assigned with the relay device 30A1, at S607, the communication device 10 accesses the relay device 30A1 to communicate with the management device 40 through the relay device 30A1.

At S608, the relay device 30A1, which stops the relay function, returns an error response or no response to the communication device 10.

Based on the error response or no response, the communication device 10 is able to know that the relay device 30A1 does not function. At S609, the communication device 10 sends an address confirmation request to the allocating device 20A to request the allocating device 20A to assign another relay device 30 to the communication device 10.

At S610, the allocating device 20A selects one of the relay devices 30A2 and 30A3 based on the selected communication method and the processing load information that is stored at S606 to assign the selected relay device 30 to the communication device 10 that sends the request, in a substantially similar manner as described above referring to S509 of FIG. 19.

At S611, the allocating device 20A sends address information of the relay device 30 that is assigned to the communication device 10 at S610, to the communication device 10 in response to the address confirmation request. In this example, it is assumed that the relay device 30A3 is assigned to the communication device 10 such that the URL address "URL-A3" of the relay device 30A3 is sent to the communication device 10.

At S612, the communication device 10 stores the received address information of the relay device 30A3 in the memory.

At S613 to S615, the communication device 10 accesses the relay device 30A3 using the address information of the relay device 30A3 read out from the memory to start communication with the management device 40, in a substantially similar manner as described above referring to S550 to S552 of FIG. 20.

At S616, when the management device 40 receives notification from the communication device 10 through the relay device 30A3, which is different from the relay device 30A1 that is previously registered, the management device 40 determines that allocation of the relay device 30 to the communication device 10 has changed. To reflect the current allocation of the relay device 30, at S616, the management device 40 updates the stored allocation information by registering the relay device 30A3 in association with the communication device 10.

Similarly, when the notification is received from the communication device 10 at S613, at S617, the relay device 30A3 determines that the communication device 10 is assigned to the relay device 30A3 as a device to be managed in relaying communications. At S617, the relay device 30A3 registers the communication device 10 as the device to be managed by the relay device 30A3.

At S618, the relay device 30A3 sends notification indicating that the communication device 10 is newly registered to be managed by the relay device 30A3, to the allocating device 20A, in a substantially similar manner as described above referring to S555 of FIG. 20.

At S620, the relay device 30A3 further calculates the processing load on the relay device 30A3 in relaying communications, since the communication device 10 is added as a device to be managed. The relay device 30A3 sends updated usage information that reflects the recalculated processing load to the allocating device 20A.

When the notification indicating start of relaying communications is received at S618, at S619, the allocating device 20A stores the communication device 10 and the relay device 30A3 in association with each other to update the allocation information. In this example, however, the allocation information indicating that the relay device 30A1 is assigned to the communication device 10 is kept stored in the memory. This allows the allocating device 20A to notify the relay device 30A1 of change in the allocation of relay device 30, when the relay device 30A1 restarts the relay function.

At S621, the relay device 30A1 restarts the relay function. At S622, the relay device 30A1 sends notification indicating that the relay function is restarted to the allocating device 20.

At S623, the allocating device 20A adds the relay device 30A1 back to the list of candidate relay devices 30 that can be assigned to the communication device 10.

At S624, the allocating device 20A extracts the communication device 10, which is assigned with the new relay device 30A3 in replace of the relay device 30A1 when the relay device 30A1 stops the relay function, by referring to the allocation information stored in the memory.

At S625, the allocating device 20A sends the relay device updated information to the relay device 10A1, which includes information regarding the communication device 10 that is extracted at S624. With this relay device updated information, the relay device 30A1 is able to know that the communication device 10, which is included in the relay device updated information, is now assigned with a new relay device 30.

At S626, the relay device 30A1 deletes the communication device 10, which is included in the relay device updated information, from a list of devices that are managed by the relay device 30A1 in relaying communications.

At S627, the relay device 30A1 further calculates the processing load on the relay device 30A1 in relaying communications, and sends updated usage information that reflects the recalculated processing load to the allocating device 20A.

Through performing the operation of FIG. 22, the allocating device 20 causes the relay device 30, which stops the relay function, to be not assigned with the communication device 10. Further, the allocating device 20 changes the allocation of the relay device 30 even when there is the communication device 10 that is assigned with the relay device 30 that stops the relay function. This helps the communication system to operate more smoothly.

Figure 23A:
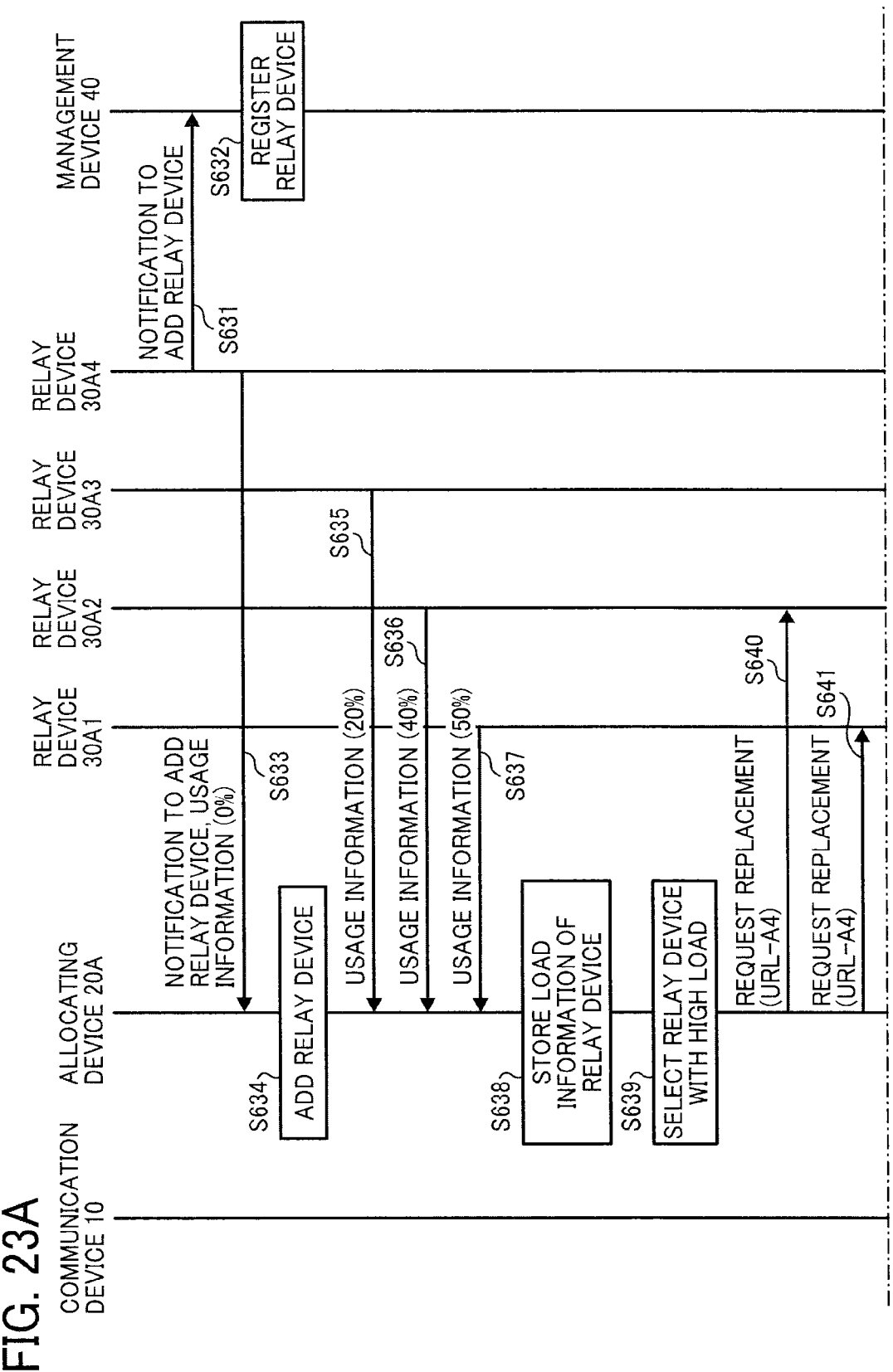
FIGS. 23A to 23C are a data sequence diagram illustrating operation of changing the allocation of a relay device to the communication device that is assigned with the relay device, performed by the communication system of FIG. 18, according to an example embodiment of the present invention.
Figure 23B:
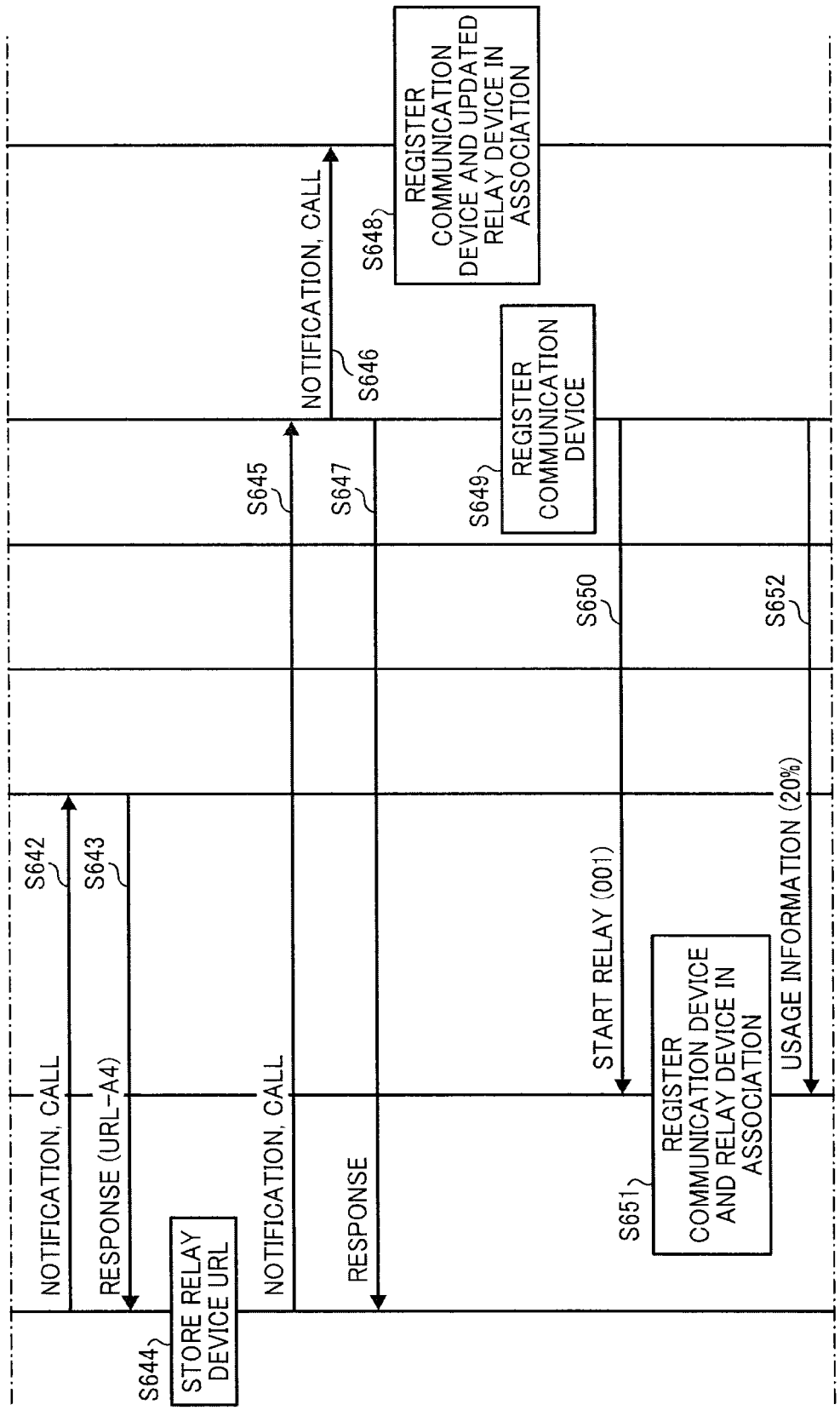
Figure 23C:
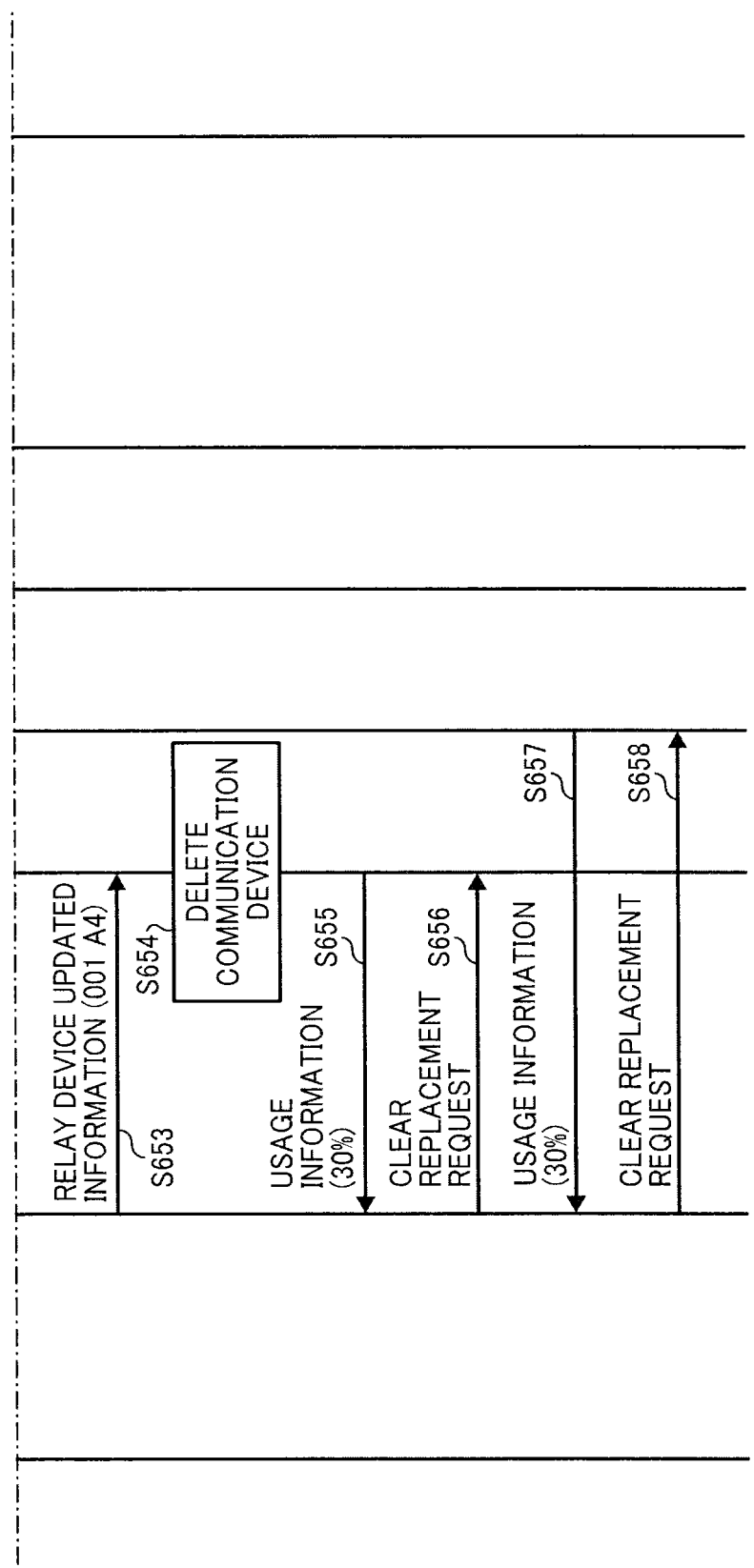

Referring now to FIGS. 23A to 23C, operation of adding the relay device 30 to the communication system of FIG. 18, performed by the communication system of FIG. 18, is explained according to an example embodiment of the present invention. In this example, it is assumed that a relay device 30A4 is newly added to the relay devices 30A1 to 30A3 in the relay system MA.

At S631, the relay device 30A4, which is newly added to the communication system, sends notification indicating that the relay device 30A4 is added to the management device 40.

When the management device 40 receives the notification, at S632, the management device 40 registers the relay device 30A4 as the relay device 30A4 that relays communications for the management device 40. At S632, the management device 40 may store information regarding the relay device 30A4 such as the communication method compatible with the relay device 30A4. While performing S632 is optional, registration of the relay device 30 improves the security as the management device 40 may be set to not to accept a request or a response sent from any unregistered relay device 30.

At S633, the relay device 30A4 sends notification indicating that the relay device 30A4 is added to the communication system, to the allocating device 20A. With this notification, the relay device 30A4 sends information regarding the communication method compatible with the relay device 30A4, and usage information of the relay device 30A4, to the allocating device 20A. In this example, it is assumed that the relay device 30A4 is capable of communicating using the communication method based on the protocol A in various data formats. Since the relay device 30A4 is newly added, the processing load is 0%.

When the notification is received, at S634, the allocating device 20A adds the relay device 30A4 to a list of candidate relay devices 30 that can be assigned to the communication device 10.

At S635 to S637, the relay devices 30A1 and 30A3 each send usage information including processing load information to the allocating device 20A at a predetermined time, in a substantially similar manner as described above referring to S501 to S503 of FIG. 19.

When the allocating device 20A receives the usage information from the relay devices 30A1 to 30A3, at S638, the allocating device 20A stores at least the received processing load information in the memory for each of the relay devices 30A1 and 30A4.

When the relay device 30A4 is newly added, the allocating device 20A may change the allocation of the communication device 10 to the relay device 30 such that the processing loads on the relay devices 30 are evenly distributed. More specifically, at S639, the allocating device 20A extracts a relay device 30 that is high in processing load. The allocating device 20A sends the request for replacement to the relay device 30 extracted at S639.

More specifically, at S639, the allocating device 20A selects one or more relay devices 30 having the processing load that is higher than a predetermined threshold level. In this example, the threshold level used at S639 is set lower than the threshold level used at S575 of FIG. 21. Alternatively, the allocating device 20A may select a predetermined number of relay devices 30 having the highest levels of processing load.

In this example, the relay device 30A1 and the relay device 30A2 are extracted at S639. At S640 and S641, the allocating device 20A sends the request for replacement to the relay device 30A1 and the relay device 30A2, respectively. The request for replacement includes address information of the relay device 30A4 to which the work is transferred, such as the URL address "URL-A4" of the relay device 30A4.

S642 to S647 are performed in a substantially similar manner as described above referring to S577 to S582 of FIG. 21. For simplicity, FIG. 23 shows an example case for transferring the work from the relay device 30A1 to the relay device 30A4.

At S648, the management device 40 updates the stored allocation information by registering the relay device 30A4 in association with the communication device 10. At S649, the relay device 30A4 registers the communication device 10 as the device to be managed by the relay device 30A4. When the notification is received from the relay device 30A4 at S650, at S651, the allocating device 20A stores the communication device 10 and the relay device 30A4 in association with each other to update the allocation information.

The above-described operation of updating the allocation information is performed for each one of the communication devices 10 that are managed by the relay device 30A1 and the relay device 30A2.

When the updated usage information is received from the relay device 30A1 at S655, and the relay device 30A2 at S657, respectively, the allocating device 20A determines whether the processing load of the relay device 30 is lower than a predetermined threshold level for each one of the relay devices 30A1 and 30A2. When it is determined that the processing load is lower than the predetermined threshold level, at S656 and S658, the allocating device 20A sends a request for clearing the replacement request to the relay device 30A1 and the relay device 30A2, respectively.

Through performing the operation of FIGS. 23A to 23C, the allocating device 20 is able to balance the processing loads so as to evenly distribute the processing loads over the relay devices 30, when the relay device 30 is newly added to the communication system. The operation after S639 may not be performed when there is no relay device 30 that is high in processing load.

Figure 24A:
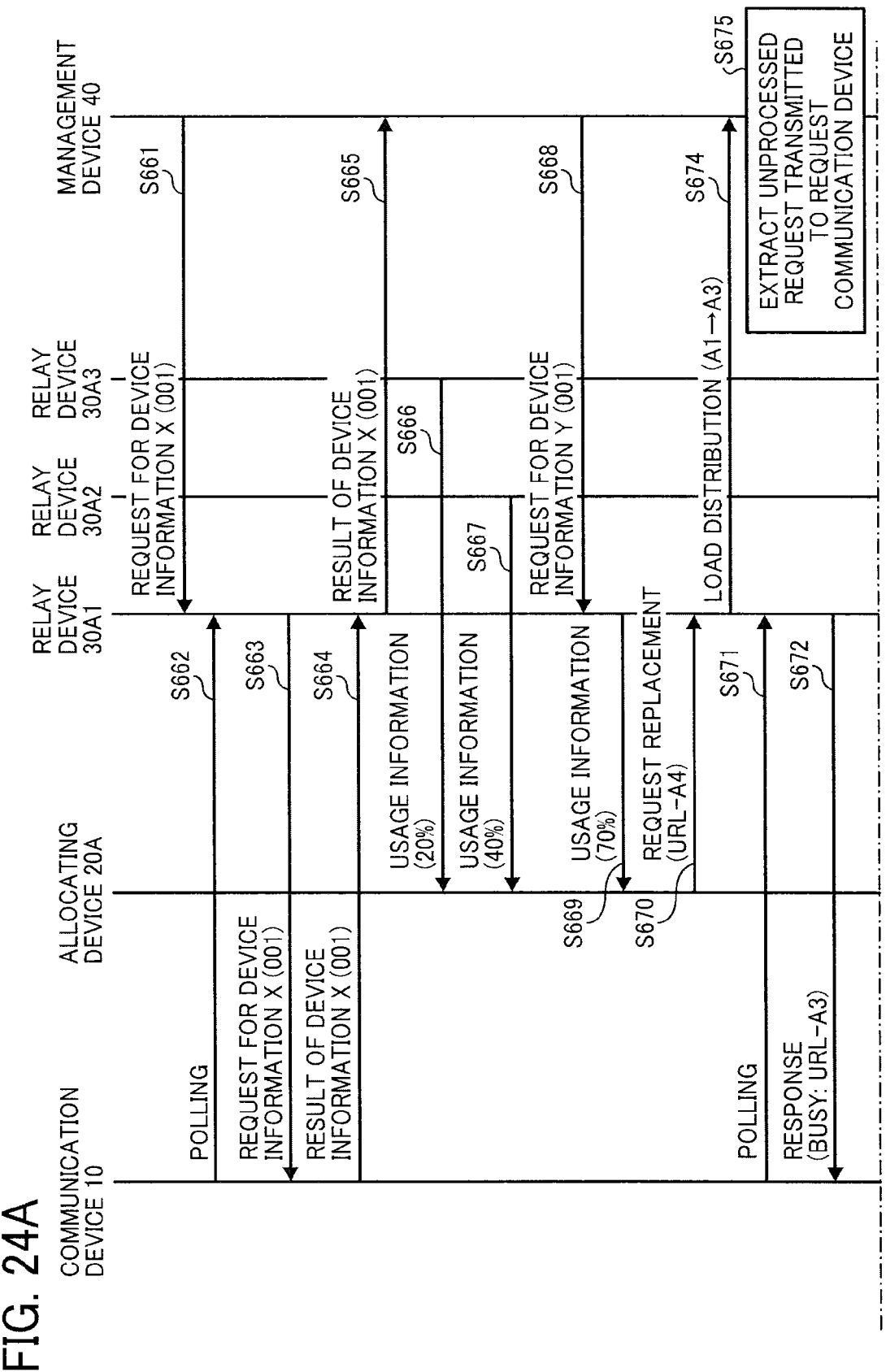
FIGS. 24A to 24C are a data sequence diagram illustrating operation of managing a request transmitted from the management device to the relay device when the allocation of the relay device is changed, performed by the communication system of FIG. 18, according to an example embodiment of the present invention.
Figure 24B:
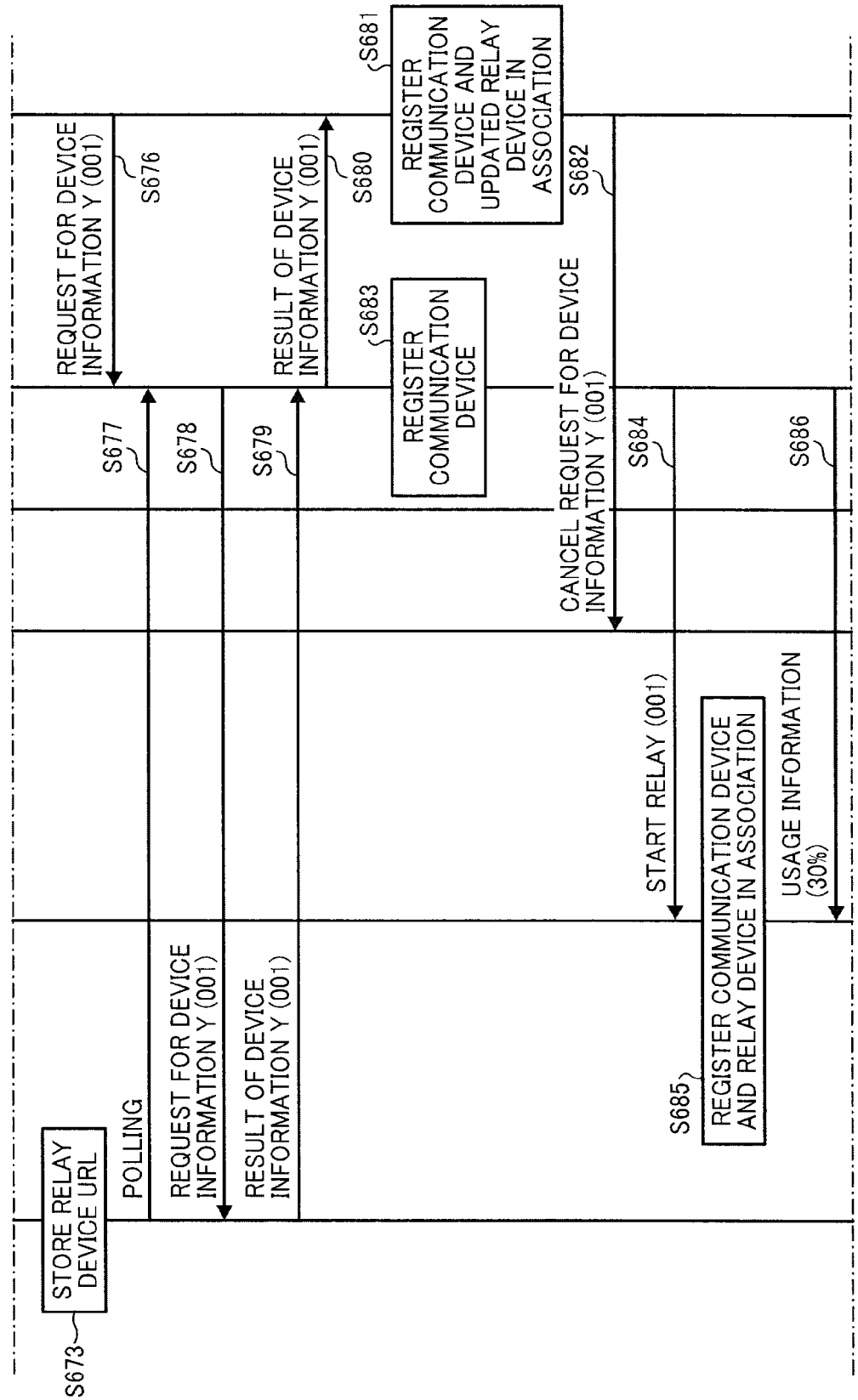
Figure 24C:
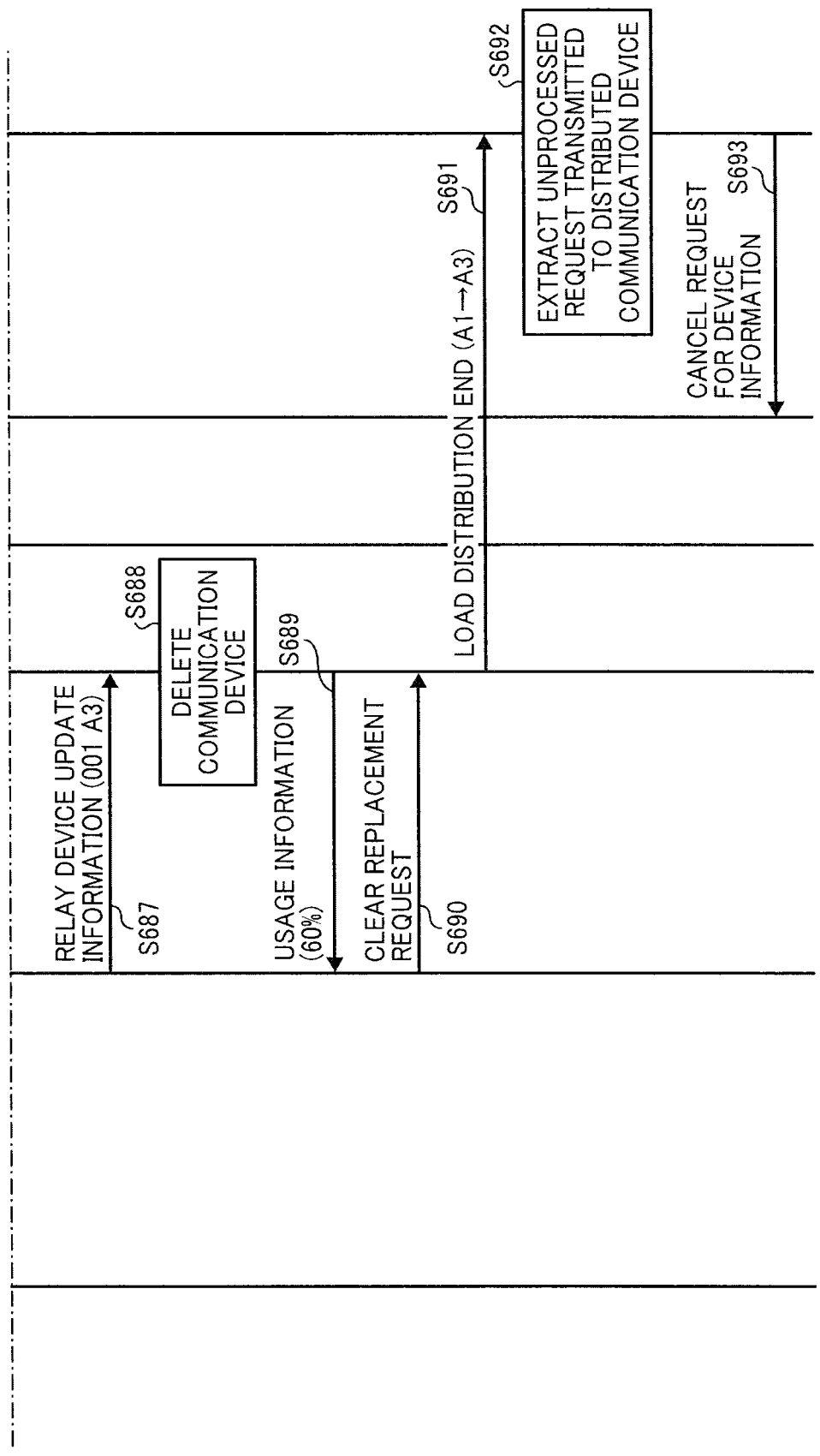

Referring now to FIGS. 24A to 24C, operation of managing a request transmitted by the management device 40 to the communication device 10 when the allocation is changed, performed by the communication system of FIG. 18, is explained according to an example embodiment of the present invention. In this example, it is assumed that the allocation of the relay device 30 changes as the allocating device 20A detects a relay device 30 that is high in processing load.

At S661 to S665, the management device 40 sends a device information request "X" for obtaining device information of the communication device 10, which is addressed to the communication device 10, through the relay device 30A1. The management device 40 receives a response including the result of processing the device information request "X" from the communication device 10 through the relay device 30A1. The device information request "X" includes the ID "001" of the communication device 10. This operation of sending the request and receiving the response is performed in a substantially similar manner as described above referring to S32 to S38 of FIG. 5C.

Further, at S661, the management device 40 determines to send the request to the relay device 30A1, based on the allocation information that is stored, for example, at S517 of FIG. 19. Further, based on assumption that it takes some time to process the request addressed to the communication device 10, the management device 40 stores information regarding the request addressed to the communication device 10 in a memory such as the memory 12, together with information indicating the relay device 30 to which the request is transmitted. The request that is sent is managed as an unprocessed request, until the response for that request is received.

At S666, S667, and S669, the relay devices 30A1 to 30A3 each send usage information including processing load information to the allocation device 20A at a predetermined time. The allocating device 20A, which receives the usage information, stores at least the received processing load information in the memory.

At S668, the management device 40 sends a device information request "Y" for obtaining device information, which is addressed to the communication device 10, to the relay device 30A1. The relay device 30A1 pools the received request "Y". In this example, the relay device 30A1 receives the device information request "Y", before the relay device 30A1 sends the usage information of the relay device 30A1 to the allocating device 20A.

At S670, the allocating device 20A determines that the processing load of the relay device 30A1, which is 70%, is higher than the threshold level, and sends a request for replacement to the relay device 30A1. In this example, the relay device 30A3 is selected to be replaced with the relay device 30A1.

The relay device 30A1, which receives the request for replacement, sends an error response to the communication device 10 at S672 when accessed by the communication device 10 at S671 and causes the communication device 10 to change the relay device 30 to be accessed, in a substantially similar manner as described above referring to S577 and S578 of FIG. 21. For this reasons, the device information request "Y" received at S668 remains in the relay device 30A1 without being transferred to the communication device 10.

When the request for replacement is received at S670, and the relay device 30A1 determines that there is a request that is pooled for the communication device 10, the relay device 30A1 sends notification ("load distribution notification") indicating that the work to be performed by the relay device 30A1 is now performed by the relay device 30A3, to the management device 40. The load distribution information includes address information of the relay device 30A3 to be replaced.

When the load distribution notification is received, at S675, the management device 40 refers to the management information regarding the requests that have been transmitted but not processed to extract an unprocessed request that is addressed to the communication device 10 through the relay device 30A1, that is, the device information request "Y". At S676, the management device 40 transmits the extracted device information request "Y" to the relay device 30A3, which is set as the relay device 30 that processes the request addressed to the communication device 10. However, at this time, the allocation of work to the relay device 30A3 from the relay device 30A1 has not been completed, or there is no guarantee that the relay device 30A3 relays communications for the communication device 10. The management device 40 does not cancel the unprocessed request that is addressed to the communication device 10, which is sent through the relay device 30A1. Further, the management device 40 manages information regarding the device information request "Y" that is sent to the relay device 30A3 at S676 in a substantially similar manner as described above referring to S661 and S668.

At S673, the communication device 10, which receives the error response from the relay device 30A1, stores the identification information "URL-A3" of the relay device 30A3 as information used for accessing the relay device 30A3 to communicate with the management device 40. At S677, when polling is performed, the relay device 30A3 obtains the device information request "Y", which is pooled, and sends the device information request "Y" to the communication device 10. At S679, the communication device 10 sends a response including the result of obtaining the device information, in response to the device information request "Y" to the relay device 30A3. At S680, the relay device 30A3 transfers the response including the result of obtaining the device information, to the management device 40.

When the response to the device information request "Y" is received from the relay device 30A3, the management device 40 is able to know that the relay device 30A3 now relays communications for the communication device 10. At S681, the management device 40 stores the relay device 30A3 in association with the communication device 10 to update the allocation information.

At S682, the management device 40 sends a request for canceling the device information request "Y", which is previously sent to the relay device 30, to the relay device 30A1. This prevents the device information request "Y", which remains unprocessed in the relay device 30A1, from being sent to the communication device 10.

S683 to S690 are performed in a substantially similar manner as described above referring to S584 to S591 of FIG. 21. More specifically, the relay device 30A3, the relay device 30A1, and the allocating device 20A each update information regarding the allocation of the relay device 30 to the communication device 10 to reflect the change in allocation. Further, when the processing load of the relay device 30A1 becomes less than a predetermined threshold level, the allocating device 20A sends a request for clearing the request for replacement at S690.

When the request for clearing the request for replacement is received, at S691, the relay device 30A1 sends notification ("load distribution end notification") to the management device 40, which indicates that operation of transferring the work to be performed by the relay device 30A1 to the relay device 30A3 ends.

When the load distribution end notification is received, at S692, the management device 40 refers to the management information regarding the requests that have been transmitted but not processed to extract an unprocessed request that is addressed to the communication device 10 through the relay device 30A3.

At S693, the management device 40 sends a request for canceling the unprocessed request, which is extracted at S692, to the relay device 30A3. Based on the request for canceling, the relay device 30A3 deletes the unprocessed request from that pool. More specifically, even if there is a request that is not transferred by the relay device 30A3 to the communication device 10 remains in the relay device 30A3, such request can be transferred to the communication device 10 through the relay device 30A1 after the request for replacement is cleared. Canceling the unprocessed request prevents the relay device 30A3 from sending the request to the communication device 10, which was or will be transmitted to the communication device 10 through the relay device 30A1.

Through performing the operation of FIGS. 24A to 24C, when the management device 40 receives notification indicating that the relay function provided for the communication device 10 is performed by a newly assigned relay device 30 in replace of a previously assigned relay device 30, any unprocessed request addressed to the communication device 10, which is pooled at the previously assigned relay device 30, is transferred to the communication device 10 through the newly assigned relay device 30. Further, any unprocessed request that is pooled at the previously assigned relay device 30 is canceled after it is transferred to the communication device 10 through the newly assigned relay device 30, based on determination whether a response to the request is received at the management device 40. Accordingly, even when the allocation of the relay device 30 changes, the communication system is able to process the request issued by the management device 40 smoothly, while suppressing an error in processing the request.

Figure 25A:
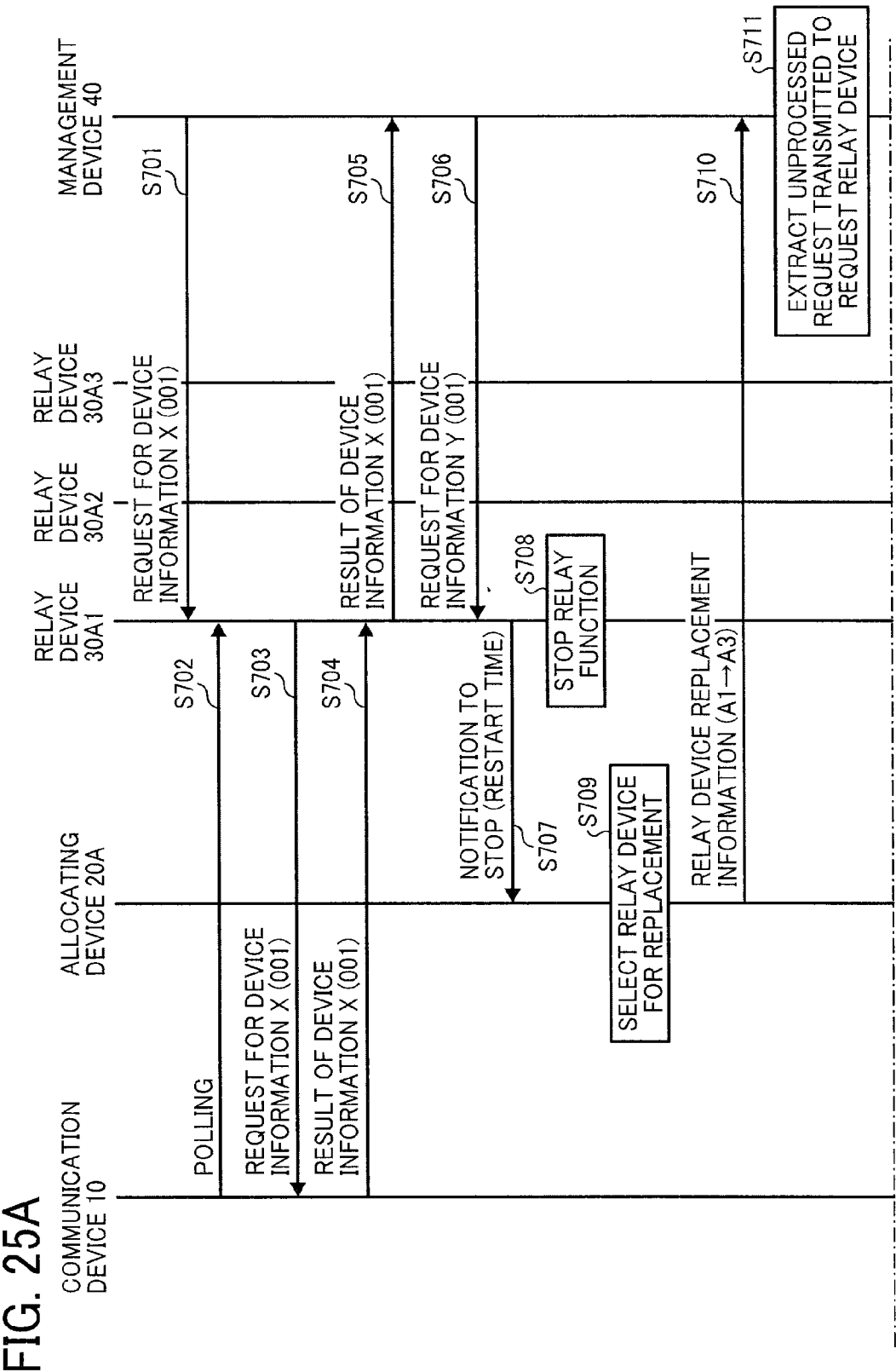
FIGS. 25A to 25C are a data sequence diagram illustrating operation of managing a request transmitted from the management device to the relay device when the allocation of the relay device is changed, performed by the communication system of FIG. 18, according to an example embodiment of the present invention.
Figure 25B:
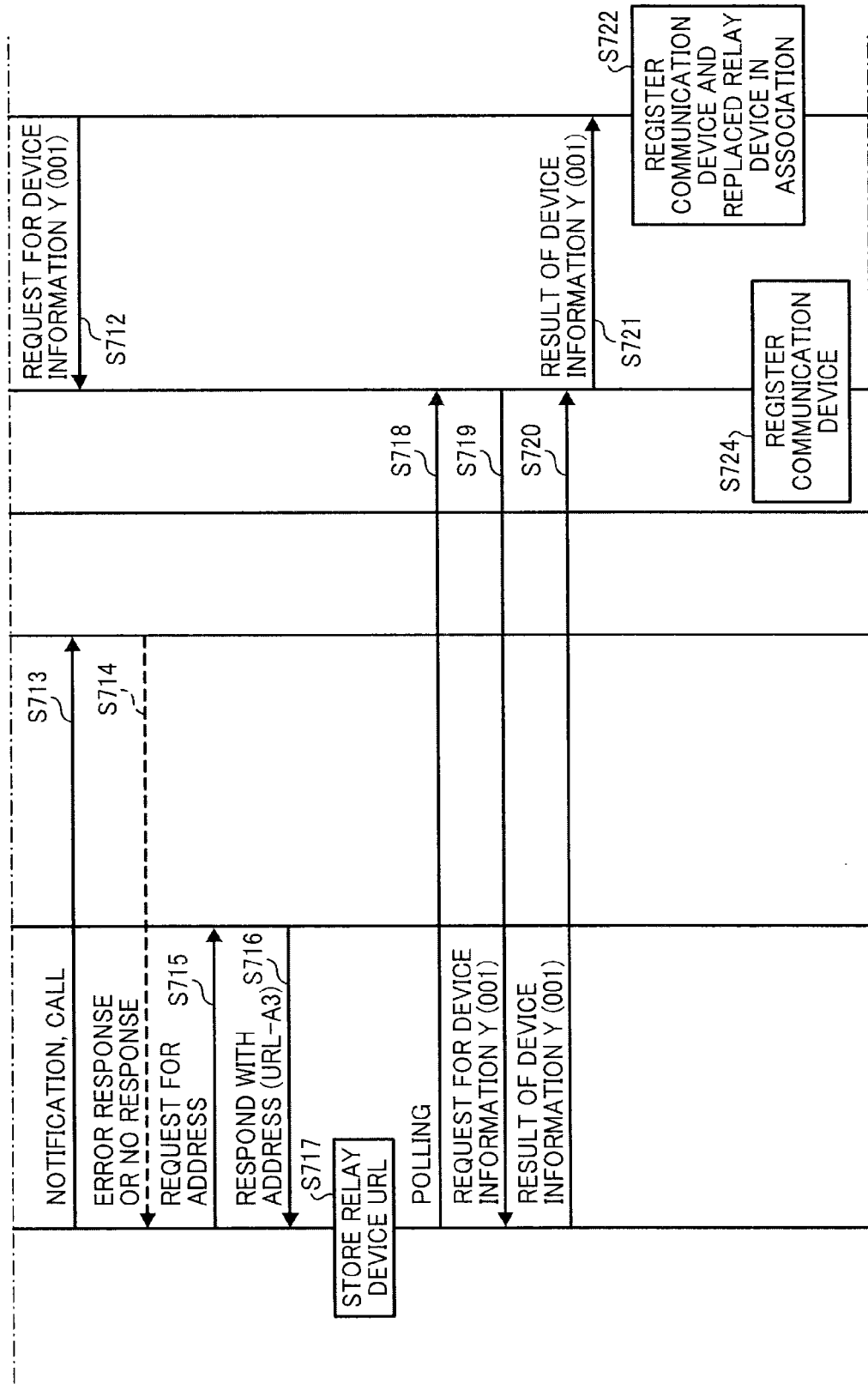
Figure 25C:
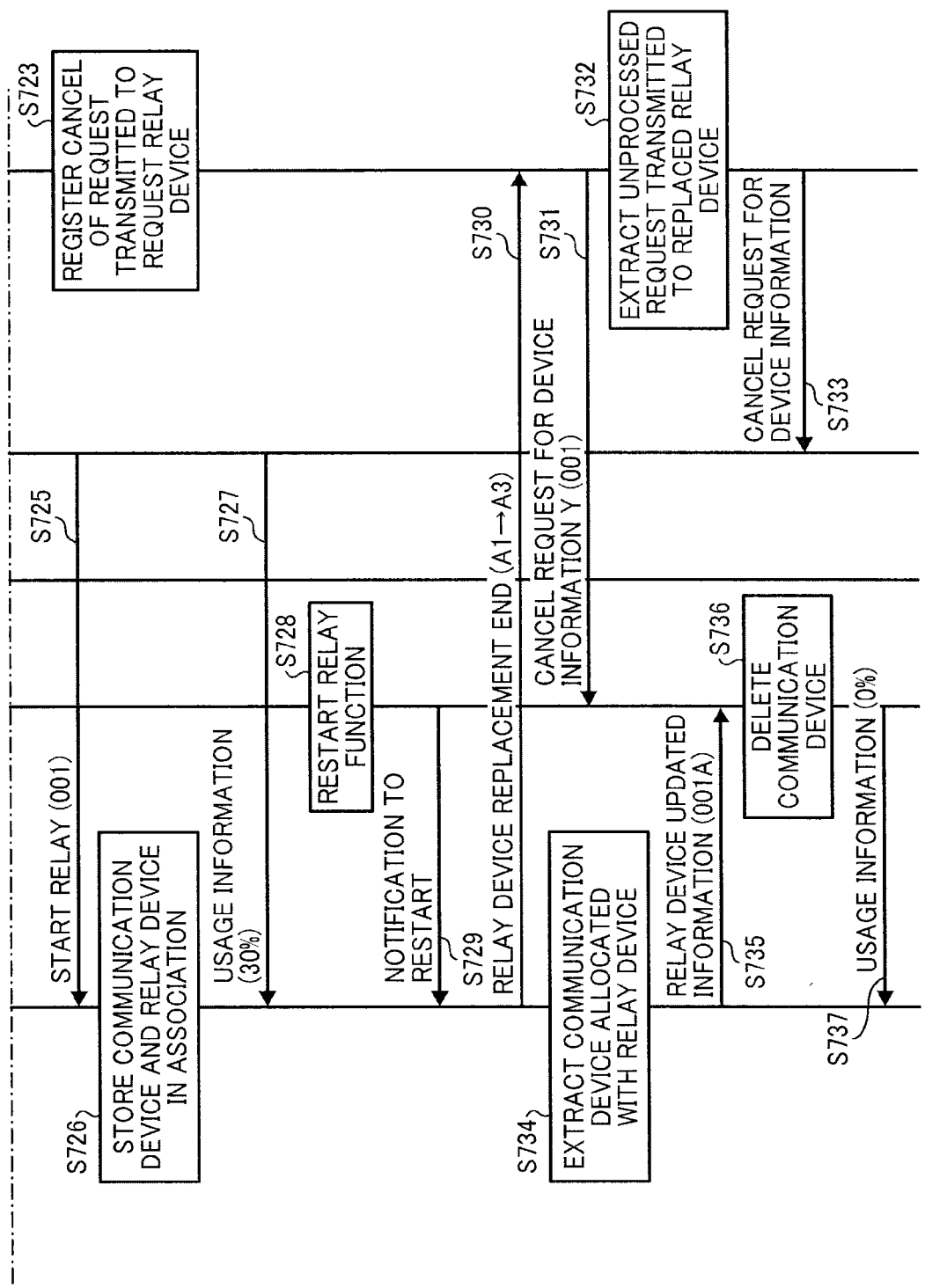

Referring now to FIGS. 25A to 25C, operation of managing a request transmitted by the management system 40 to the communication device 10 when the allocation is changed, performed by the communication system of FIG. 18, is explained according to an example embodiment of the present invention. In this example, it is assumed that the allocation of the relay device 30 changes as the relay function of the relay device 30 is stopped as described above referring to FIG. 22.

At S701 to S705, the management device 40 sends a device information request "X" for obtaining device information of the communication device 10, which is addressed to the communication device 10 through the relay device 30A1. The management device 40 receives a response including the result of processing the device information request "X" from the communication device 10 through the relay device 30A1, in a substantially similar manner as described above referring to S661 to S665 of FIGS. 24A to 24C.

At S706, the management device 40 sends a device information request "Y" for obtaining device information, which is addressed to the communication device 10, to the relay device 30A1. The relay device 30A1 pools the received request "Y".

At S707, the relay device 30A1 sends notification to the allocating device 20A, which indicates that the relay function is stopped. At S708, the relay device 30A1 stops the relay function.

In the above-described example referring to FIG. 22, the allocating device 20A deletes the relay device 30A1 from a list of candidate relay devices 30 that can be assigned to the communication device 10. In this example referring to FIGS. 25A to 25C, the allocating device 20 selects one of the relay devices 30A2 and 30A3 to be replaced with the relay device 30A1 in performing the work, in a substantially similar manner as described above referring to S575 of FIG. 21. In this example, it is assumed that the relay device 30A3 is selected.

At S710, the allocating device 20A sends relay device replacement information to the management device 40, which indicates that the relay device 30A3 is now assigned to the communication device 10 in replace of the relay device 30A1. Instead of causing the relay device 30A1 to send such relay device replacement information, the allocating device 20 sends the relay device replacement information since the relay device 30A1 stops the relay function. The relay device replacement information includes address information of the relay device 30A3 to be replaced with the relay device 30A1.

When the relay device replacement information is received, at S711, the management device 40 refers to the management information regarding the requests that have been transmitted but not processed to extract an unprocessed request that is addressed to the communication device 10 through the relay device 30A1, that is, the device information request "Y". At S712, the management device 40 transmits the extracted device information request "Y" to the relay device 30A3, which is set as the relay device 30 that processes the request addressed to the communication device 10.

When the communication device 10, which is assigned with the relay device 30A1, accesses the relay device 30A1 at S713, the communication device 10 receives an error response or no response from the relay device 30A1 at S714 as the relay function is stopped.

At S715, the communication device 10 sends an address confirmation request to the allocating device 20A to request the allocating device 20A to assign the communication device 10 with another relay device 30.

At S716, the allocating device 20A sends identification information "URL-A3" of the relay device 30A3 that is newly assigned to the communication device 10 at S709, to the communication device 10 in response to the address confirmation request.

At S717, the communication device 10 stores the received identification information of the relay device 30A3 in the memory.

At S718, the communication device 10 accesses the relay device 30A3 using the address information of the relay device 30A3 read out from the memory to communicate with the management device 40. At S719, the communication device 10 receives the device information request "Y" from the relay device 30A3. At S720, the communication device 10 sends a response including the result of executing the device information request "Y" to the relay device 30A3.

At S721, the relay device 30A3 transfers the response including the result of executing the device information request "Y" to the management device 40.

When the response is received, the management device 40 is able to know that the relay device 30A3 is now assigned to the communication device 10. At S722, the management device 40 stores the relay device 30A3 in association with the communication device 10 to update the allocation information.

At S723, the management device 40 registers a request for canceling the device information request "Y", which is previously sent to the relay device 30A1, to the relay device 30A1. As described above referring to S682 of FIG. 24, in order to prevent the device information request "Y", which remains unprocessed in the relay device 30A1, from being sent to the communication device 10, the request for canceling needs to be sent to the relay device 30A1. However, since the relay device 30A1 does not operate to provide the relay function, the management device 40 registers the request for canceling the device information request "Y" such that the request for canceling is transmitted later when the relay device 30A1 starts the relay function.

S724 to S727 are performed in a substantially similar manner as described above referring to S617 to S620 of FIG. 22. More specifically, the relay device 30A3, the relay device 30A1, and the allocating device 20A each update information regarding the allocation of the relay device 30 to the communication device 10 to reflect the change in allocation.

When the relay device 30A1 restarts the relay function at S728, the relay device 30A1 sends notification indicating that the relay function is restarted to the allocating device 20A at S729.

S734 to S737 are performed in a substantially similar manner as described above referring to S624 to S627 of FIG. 22 to reflect the change in allocation of the relay device 30 to the communication device 10.

When the notification indicating that the relay function is restarted is received at S729, at S730, the allocating device 20A sends notification ("replacement end notification") to the management device 40, which indicates that operation of transferring the work to be performed by the relay device 30A1 to the relay device 30A3 ends.

When the replacement end notification is received, at S731, the management device 40 sends the request for canceling the request "Y", which is registered at S723, to the relay device 30A1.

At S732, the management device 40 refers to the management information regarding the requests that have been transmitted but not processed to extract an unprocessed request that is addressed to the communication device 10 through the relay device 30A3, in a substantially similar manner as described above referring to S692 of FIG. 24.

At S633, the management device 40 sends a request for canceling the unprocessed request, to the relay device 30A3, in a substantially similar manner as described above referring to S693 of FIG. 24.

Through performing the operation of FIGS. 25A to 25C, even when the relay device 30 stops its relay function, any unprocessed request addressed to the communication device 10, which is pooled at the relay device 30 that stops the relay function, is transferred to the communication device 10 through another relay device 30 that is newly assigned. Further, any unprocessed request that is pooled at the relay device 30 that stops the relay function is cancelled after it is transferred to the communication device 10 through the newly assigned relay device 30, based on determination whether a response to the request is received at the management device 40. Accordingly, even when the allocation of the relay device 30 changes, the communication system is able to process the request issued by the management device 40 smoothly, while suppressing an error in processing the request.

In the above-described example, it is assumed that the relay device 30A1 is able to send notification to the allocating device 20 before the relay function is stopped. Alternatively, even when the relay device 30A1 is not able to send notification before the relay function is stopped, the allocating device 20A determines that the relay function of the relay device 30A1 does not function when the usage information is not received from the relay device 30A1 for a predetermined time period.

In any one of the above-described examples referring to FIGS. 18 to 25, information regarding the currently selected communication method ma be stored in the memory at any desired device in association with the information indicating the association between the communication device 10 and the relay device 30.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

FIG. 26 illustrates a configuration of a communication system according to an example embodiment of the present invention. In alternative to providing the allocating device 20 for each of the protocols A and B, the allocating device 20 may be provided, which is capable of managing the relay devices 30 that communicate using various communication methods. More specifically, in this example illustrated in FIG. 26, the allocating device 20 manages allocation for the relay devices 30A1 to 30A3 and 30B1 to 30B3. In such case, the communication device 10 accesses the allocating device 20 irrespective of a type of communication protocol selected by the communication device 10.

In one example, the allocating device 20 of the communication system of FIG. 26 obtains information regarding the communication method that is compatible with each of the relay devices 30. When a request for assigning the relay device 30 with information indicating a selected communication method is received, the allocating device 20 assigns the relay device 30 capable of communicating using the selected communication method to the communication device 10. In another example, the allocation device 20 of the communication system of FIG. 26 further obtains information regarding the processing load on each one of the relay devices 30. When a request for assigning the relay device 30 with information indicating a selected communication method is received, the allocating device 20 assigns the relay device 30 capable of communicating using the selected communication method and having a low processing load to the communication device 10.

Further, a configuration of any one of the communication systems of FIGS. 1, 18, and 26, a structure of each of the devices in the communication systems of any one of FIGS. 1, 18, and 26, a specific operation to be performed by each device in any one of the communication systems of FIGS. 1, 18, and 26, or a data format of data to be processed by each device in any one of the communication systems of FIGS. 1, 18, and 26, are not limited to the above-described examples.

For example, any one of the communication device, the allocating device, the relay device, and the management device in the communication system may have a structure capable of performing at least one of the above-described operations of FIGS. 7 to 25.

In the above-described examples, it is assumed that the communication device 10 is implemented by an image forming apparatus. Alternatively, the communication device 10 may be implemented by any other electronic device provided with the function of communicating through the network. Examples of the communication device include, but not limited to, a network based home appliance device, a vending machine, a medical equipment, an electric power supply device, an air condition system, a utility meter system for gas, water, or electricity, an automobile, an aircraft, or any device provided with a processor such as a general-purpose computer.

Further, in the above-described example, any one of the communication system of FIGS. 1, 18, and 26 functions as a remote management system. Alternatively, any desired one of the above-described functions or operations may be implemented by a communication system without the remote management capability. For example, one of the relay devices may be located within the local network in which the communication device 10 subjected for management by the management device 40 is provided.

Further, as described above, any one of the above-described and other methods of the present invention may be embodied in the form of a computer program stored in any kind of storage medium. Examples of storage mediums include, but are not limited to, flexible disk, hard disk, optical discs such as CD-ROM, magneto-optical discs, magnetic tapes, nonvolatile memory cards, SRAM, EEPROM, ROM (read-only-memory), etc. Alternatively, the computer program may be previously stored in a memory, such as a ROM or a HDD, of a computer. Alternatively, such program may be downloaded from any storage device or any storage medium through the network.

When the program is read from the memory for execution by a processor of the computer, the program causes the processor to function as any one of the above-described communication device, allocating device, relay device, and management device. Further, the processor may be implemented by any desired number of processors, which may be distributed over the network.

For example, in the above-described example, it is assumed that operation of assigning a relay device to the communication device 10 is performed by the allocating device 20. Alternatively, any one of the operations performed by the allocating device 20 may be performed by a plurality of modules, units, or devices in the relay system M.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a communication system including a plurality of first communication devices, a second communication device, a plurality of relay devices each capable of relaying communication between at least one of the first communication devices and the second communication device, and an allocating device that allocates one of the relay devices to at least one the first communication devices. The first communication device includes: communicating means capable of communicating with the second communication device using one of a plurality of communication methods; first storing means for storing first address information in association with each one of the plurality of communication methods; selecting means for selecting one of the plurality of communication methods as a communication method to be used for communication with the second communication device; first communication control means for sending a request to the allocating device specified by the first address information associated with the selected one of the plurality of communication methods; second storing means for storing second address information received from the allocating device in response to the request; and second communication control means for communicating a relay device indicated by the second address information stored in the second storing means to start communication with the second communication device using the selected communication method.

For example, the communicating means of the first communication device corresponds to the communication I/F 13. The first storing means and the second storing means each correspond to the memory 12, which functions as the set data 106 operating in cooperation with the SDK application 105. The selecting means corresponds to the CPU 11 and the display 14, which function as the UI control module 110. The first communication control means and the second communication control means each correspond to the communication I/F 13 operating under control of the CPU 11.

The second communication device includes communicating means for communicating with at least one of the plurality of relay devices. For example, the communicating means corresponds to the communication I/F 13.

The allocating device includes destination notifying means for selecting one of the plurality of relay devices as the relay device to relay communications for the first communication device using the selected communication method when the request is received from the first communication control means of the first communication device, and sending address information of the selected relay device as the second address information to the communication device.

For example, the destination notifying means corresponds to the CPU 11, which may be implemented by the allocating function of the device management and allocation module 305 of the relay device 30, or the allocating function of the allocating device 20.

The relay devices each include first communicating means for communicating with the first communication device using one of the communication methods available to the first communication devices; second communicating means for communicating with the second communication device; relaying means for transmitting data addressed to the second communication device that is received from the first communication device through the first communicating means, to the second communication device through the second communicating means, and transmitting data addressed to the first communication device that is received from the second communication device through the second communicating means, to the first communication device through the first communicating means.

For example, the first communication means corresponds to the communication I/F 13, which functions as the center communication server module 303. The second communicating means corresponds to the communication I/F 13, which functions as the center communication client module 302 or the center communication server module 303. The relaying means corresponds to the relay function of the device management and allocation module 305 or the relay device 30, which may be implemented by the CPU 11 operating in cooperation with the communication I/F 13.

In the above-described communication system, the communicating means of the second communication device communicates with each one of the relay devices using a predetermined communication method common to the plurality of relay devices. The second communicating means of the relay device communicates with the second communication device using the predetermined communication standard. The relaying means of the relay device converts a data format of the data addressed to the second communication device that is received from the first communication device through the first communication means to a data format compatible with the predetermined communication method, and transmits the data having the converted data format to the second communication device through the second communication means. The relaying means of the relay device converts a data format of the data addressed to the first communication device that is received from the second communication device through the second communication means to a data format compatible with the selected communication method, and transmits the data having the converted data format to the first communication device through the first communication means.

In the above-described communication system, the destination notifying means of the allocating device selects one or more of the plurality of relay devices other than the selected relay device as a replacement relay device, and sends address information of the replacement relay device as third address information to the first communication device. The second storing means of the first communication device stores the third address information. The second communication control means of the first communication device communicates with the replacement relay device specified by the third address information, when an error is detected while communicating with the selected relay device using the selected communication method.

In the above-described communication system, the first communication control means of the first communication device includes means for notifying the allocating device of information indicating one or more communication methods that are available to the first communication device in communicating with the second communication device. The destination notifying means of the allocating device selects one or more relay devices capable of communicating with the first communication device using a communication method different from the selected communication method of the selected relay device specified by the second address information, based on the information indicating the communication methods, as the replacement relay device. The destination notifying means further sends information regarding a communication method to be used by the replacement relay device in addition to the third address information. The second storing means of the first communication device stores the information regarding the communication method to be used by the replacement relay device, in association with the third address information. The second communication control means of the first communication means changes the selected communication method to the communication method that is stored in association with the third address information, when the selected relay device is replaced with the replacement relay device specified by the third address information.

In the above-described communication system, the second communication control means of the first communication device tries to communicate with the selected relay device specified by the second address information, when a predetermined time period elapses after communication is started with the replacement relay device. When the second communication control means determines that the selected communication device is available for relaying communications, the second communication control means starts communicating with the selected relay device specified by the second address information.

In another example, the present invention may reside in a communication device to communicate with a counterpart communication device through a relay device. The communication device includes: communicating means capable of communicating with the counterpart communication device using one of a plurality of communication methods; first storing means for storing first address information in association with each one of the plurality of communication methods; selecting means for selecting one of the plurality of communication methods as a communication method to be used for communication with the counterpart communication device; first communication control means for sending a request to the allocating device specified by the first address information associated with the selected one of the plurality of communication methods; second storing means for storing second address information received from the allocating device in response to the request; and second communication control means for communicating a relay device specified by the second address information stored in the second storing means to start communication with the counterpart communication device using the selected communication method.

In the above-described communication device, the allocating device sends address information of a replacement relay device as third address information to the first communication device, in response to the request received from the first communication control means. The second storing means stores the third address information. The second communication control means communicates with the replacement relay device specified by the third address information, when an error is detected while communicating with the selected relay device using the selected communication method.

In the above-described communication device, the first communication control means includes means for notifying the allocating device of information indicating one or more communication methods that are available to the first communication device in communicating with the counterpart communication device. The allocating device sends information regarding one or more communication methods that are available to the first communication device but other than the selected communication method as the communication method to be used by the replacement relay device, in addition to the third address information. The second storing means stores the information regarding the communication method to be used by the replacement relay device, in association with the third address information. The second communication control means changes the selected communication method to the communication method that is stored in association with the third address information, when the selected relay device is replaced with the replacement relay device specified by the third address information.

In the above-described communication device, the second communication control means tries to communicate with the selected relay device specified by the second address information, when a predetermined time period elapses after communication is started with the replacement relay device. When the second communication control means determines that the selected communication device is available for relaying communications, the second communication control means starts communicating with the selected relay device specified by the second address information.

In the above-described communication device, the communication device is previously set so that the selected communication method to be used for communication with the counterpart communication device is not changed by any means other than the second communication control means.

In the above-described communication device, the communication device further includes means for obtaining one or more communication methods that are determined to be compatible with the counterpart communication device based on information regarding hardware resources of the communication device or a communication test result. The selecting means allows the communication device to select only from the one or more communication methods that are determined to be compatible.

In another example, the present invention may reside in a program, which causes a computer to function as any one of the above-described communication devices.

In another example, the present invention may reside in a method of controlling communications including: selecting one of a plurality of communication methods available to the communication apparatus as a selected communication method to be used for communicating with a counterpart communication apparatus; obtaining first address information specifying an allocating device associated with the selected communication method; sending a request including information indicating the selected communication method to the allocating device specified by the first address information; receiving a response including second address information specifying an assigned relay device from the allocating device, the assigned relay device being one of the plurality of relay devices that is assigned by the allocating device based on the selected communication method; and accessing the assigned relay device to start communicating with the counterpart communication apparatus via the assigned relay device.

What is claimed is:

1. A communication system, comprising:
    a first communication device configured to communicate with a second communication device via a relay device, using one of a plurality of communication methods that are available to the first communication device, each of the plurality of communication methods corresponding to a communication protocol and a data format; and
    at least one allocating device configured to assign one of a plurality of relay devices to the first communication device,
    wherein the first communication device is configured to,
        display a settings screen, which requests selection of one of the plurality of communication methods to be used for communication with the second communication apparatus, the settings screen including a communication test key,
        perform, in response to the communication test key being selected via the settings screen, a communication test to determine compatibility of the one of the plurality of communication methods selected via the settings screen,
        select, in response to the communication test determining compatibility, the one of the plurality of communication methods selected via the settings screen as a selected communication method to be used for communicating with the second communication device,
        obtain first address information specifying an allocating device associated with the selected communication method,
        send a request including information indicating the selected communication method to the allocating device specified by the first address information,
        receive a response including second address information specifying an assigned relay device from the allocating device, the assigned relay device being one of the plurality of relay devices that is assigned by the allocating device based on the selected communication method, and
        access the assigned relay device to start communication with the second communication device via the assigned relay device,
    wherein the allocating device specified by the first address information is configured to select one of the plurality of relay devices as the relay device to relay data between the first communication device and the second communication device using the selected communication method when the request is received from the first communication device, send the response including the second address information specifying the assigned relay device to the first communication device, and select, from among the plurality of relay devices, a replacement relay device to replace the assigned relay device, in response to one of receiving a selection of another communication method different from the selected communication method and detecting an error, and
    wherein the allocating device is configured to assign the assigned relay device based on a determination of whether a protocol and a data format of the request are compatible with a protocol and a data format of the relay device.

2. The communication system of claim 1, further comprising:
    the plurality of relay devices including the assigned relay device, the assigned relay device being configured to,
    transmit data addressed to the second communication device that is received from the first communication device using the selected communication method, to the second communication device, and
    transmit data addressed to the first communication device that is received from the second communication device, to the first communication device.

3. The communication system of claim 2, further comprising:
    the second communication device configured to communicate with the first communication device via the assigned relay device using a predetermined communication method, the predetermined communication method being commonly used by each one of the plurality of relay devices in communicating with the second communication device.

4. The communication system of claim 3, wherein
    when a data format of the data addressed to the second communication device differs from a data format specified by the predetermined communication method, the relay device is further configured to convert the data addressed to the second communication device to have the data format specified by the predetermined communication method, before transmitting the data addressed to the second communication device to the second communication device, and
    when the data format of the data addressed to the first communication device differs from a data format specified by the selected communication method, the relay device is further configured to convert the data addressed to the first communication device to have the data format specified by the selected communication method, before transmitting the data addressed to the first communication device to the first communication device.

5. The communication system of claim 4, wherein the allocating device is further configured to,
    send third address information specifying the replacement relay device to the first communication device, and
    when the error is detected while the first communication device communicates with the assigned relay device using the selected communication method, the first communication device accesses the replacement relay device using the third address information to request the replacement relay device to relay data with the second communication device.

6. The communication system of claim 5, wherein the allocating device selects the replacement relay device that is configured to communicate with the first communication device using the another communication method different than the selected communication method, the allocating device is further configured to send communication method information regarding the another communication method to be used by the replacement relay device, to the first communication device, and the first communication device accesses the replacement relay device using the another communication method specified by the communication method information.

7. The communication system of claim 6, wherein the first communication device is further configured to send a request for starting communication to the assigned relay device when a predetermined time period elapses after starting communication with the replacement relay device, and when a response indicating that the assigned relay device is available for communication is received, the first communication device starts communicating with the assigned relay device using the selected communication method.

8. The communication system of claim 1, wherein the communication protocol is one of HTTPS and an email protocol, and the data format is one of SOAP, XML, and text.

9. The communication system of claim 1, wherein the communication protocol is an email protocol, and the data format is SOAP.

10. A communication apparatus, comprising:

a communication interface configured to communicate with a counterpart communication apparatus via a relay device, using one of a plurality of communication methods that are available to the communication apparatus, each of the plurality of communication methods corresponding to a communication protocol and a data format;

a memory configured to store, for each one of the plurality of communication methods, first address information specifying an allocating device that allocates one of a plurality of relay devices to the communication apparatus; and a processor configured to:

display a settings screen, which requests selection of one of the plurality of communication methods to be used for communication with the counterpart communication apparatus, the settings screen including a communication test key, perform, in response to the communication test key being selected via the settings screen, a communication test to determine compatibility of the one of the plurality of communication methods selected via the settings screen, select, in response to the communication test determining compatibility, the one of the plurality of communication methods selected via the settings screen as a selected communication method to be used for communicating with the counterpart communication apparatus, send a request including information indicating the selected communication method to an allocating device specified by the first address information being stored in association with the selected communication method, receive a response including second address information specifying an assigned relay device from the allocating device, the assigned relay device being one of the plurality of relay devices that is assigned by the allocating device based on the selected communication method, the assigned relay device being assigned by the allocating device based on a determination of whether a protocol and a data format of the request are compatible with a protocol and a data format of the relay device, store the second address information in the memory, access the assigned relay device to start communication with the counterpart communication apparatus via the assigned relay device, and access, from among the plurality of relay devices, a replacement relay device that replaces the assigned relay device, in response to one of receiving a selection of another communication method different from the selected communication method and occurrence of an error.

11. The communication apparatus of claim 10, wherein the processor is further configured to, receive third address information specifying the replacement relay device from the allocating device, the replacement relay device being selected by the allocating device based on one or more of the plurality of communication methods, and access the replacement relay device using the third address information to request the replacement relay device to relay data with the counterpart communication apparatus, when the error is detected while communicating with the assigned relay device using the selected communication method.

12. The communication apparatus of claim 11, wherein the replacement relay device is configured to communicate with the communication apparatus using the another communication method different than the selected communication method, and the processor is further configured to, receive communication method information regarding the another communication method to be used by the replacement relay device, and access the replacement relay device using the another communication method specified by the communication method information.

13. The communication apparatus of claim 12, wherein the processor is further configured to, send a request for starting communication to the assigned relay device when a predetermined time period elapses after starting communication with the replacement relay device, and when a response indicating that the assigned relay device is available for communication is received, the communication apparatus starts communicating with the assigned relay device.

14. The communication apparatus of claim 13, wherein the settings screen further requests selection of whether to allow the communication apparatus to automatically change the selected communication method.

15. The communication apparatus of claim 14, wherein the processor is further configured to, obtain information regarding a communication test result of the communication test, and cause the selected communication method to be selected only from one or more of the plurality of communication methods that are executable by the communication apparatus based on the obtained information.

16. A non-transitory recording medium storing a plurality of instructions which, when executed, cause a processor of a communication apparatus to perform a communication control method comprising:

displaying a settings screen, which requests selection of one of the plurality of communication methods to be used for communication with a counterpart communication apparatus, the settings screen including a communication test key;

performing, in response to the communication test key being selected via the settings screen, a communication test to determine compatibility of the one of the plurality of communication methods selected via the settings screen;

selecting, in response to the communication test determining compatibility, the one of a plurality of communication methods selected via the settings screen as a selected communication method to be used for communicating with the counterpart communication apparatus, each of the plurality of communication methods corresponding to a communication protocol and a data format;

obtaining first address information specifying an allocating device associated with the selected communication method;

sending a request including information indicating the selected communication method to the allocating device specified by the first address information;

receiving a response including second address information specifying an assigned relay device from the allocating device, the assigned relay device being one of the plurality of relay devices that is assigned by the allocating device based on the selected communication method, the assigned relay device being assigned by the allocating device based on a determination of whether a protocol and a data format of the request are compatible with a protocol and a data format of the relay device;

accessing the assigned relay device to start communicating with the counterpart communication apparatus via the assigned relay device; and accessing, from among the plurality of relay devices, a replacement relay device that replaces the assigned relay device, in response to one of receiving a selection of another communication method different from the selected communication method and occurrence of an error.

* * * * *